(12) United States Patent  
Lyons

(10) Patent No.: US 9,377,626 B2  
(45) Date of Patent: Jun. 28, 2016

(54) REMOTE CONTROL AUGMENTED MOTION DATA CAPTURE

(71) Applicant: Merge Labs, Inc., San Antonio, TX (US)

(72) Inventor: Franklin A. Lyons, San Antonio, TX (US)

(73) Assignee: Merge Labs, Inc., San Antonio, TX (US)

(*) Notice: Subject to any disclaimer, the term of this patent is extended or adjusted under 35 U.S.C. 154(b) by 0 days.

(21) Appl. No.: 14/625,602

(22) Filed: Feb. 18, 2015

(65) Prior Publication Data

US 2015/0235426 A1 Aug. 20, 2015

Related U.S. Application Data

(60) Provisional application No. 61/941,294, filed on Feb. 18, 2014, provisional application No. 62/060,996, filed on Oct. 7, 2014.

(51) Int. Cl.
*G09G 5/00* (2006.01)
*G02B 27/01* (2006.01)
(Continued)

(52) U.S. Cl.
CPC .......... *G02B 27/0172* (2013.01); *G02B 27/017* (2013.01); *G02B 27/0176* (2013.01); *G06F 1/163* (2013.01); *G06F 3/012* (2013.01); *G06F 3/03545* (2013.01); *G06F 3/044* (2013.01); *G06T 19/006* (2013.01); *G02B 2027/0178* (2013.01); *G02B 2027/0187* (2013.01); *G02B 2027/0198* (2013.01)

(58) Field of Classification Search
CPC ....... G09G 3/003; G09G 3/20; G09G 3/2085; G09G 3/2088; G02B 27/0172; G02B 27/0176; G02B 2027/0181; G02B 2027/0185
USPC ......... 345/7, 8, 156, 161, 173, 184, 620, 625, 345/633, 661; 359/630, 631; 348/36, 77, 348/207; 349/13
See application file for complete search history.

(56) References Cited

U.S. PATENT DOCUMENTS 4,707,863 A 11/1987 McNeal
5,128,671 A 7/1992 Thomas, Jr.
(Continued)

OTHER PUBLICATIONS

Ridden, Paul, "Accidentally Extraordinary Headphones Feature Capacitive Touch Controls in the Cable," gizmag.com, Feb. 25, 2013, 9 pages, http://www.gizmag.com/accidentally-extraordinary-headphones-touch-control/26394/.
(Continued)

*Primary Examiner* — Prabodh M Dharia
(74) *Attorney, Agent, or Firm* — Jonathan Pearce; Steven C. Sereboff; SoCal IP Law Group LLP

(57) ABSTRACT

A head mounted display system for use with a mobile computing device, comprises a soft main body made entirely of a soft and compressible material, the main body has a retention pocket entirely formed by the material and configured to accept and secure the mobile computing device and a lens assembly comprising two lenses configured to focus vision on respective areas of a display screen of the mobile computing device, the lens assembly held within one or more apertures formed in the main body entirely by the material, the two lenses mounted for independent movement with respect to each other, such that a split screen image may be viewed through the two lenses on the display screen.

20 Claims, 36 Drawing Sheets

(51) Int. Cl.
| | |
|---|---|
| G06F 3/0354 | (2013.01) |
| G06F 3/044 | (2006.01) |
| G06F 1/16 | (2006.01) |
| G06F 3/01 | (2006.01) |
| G06T 19/00 | (2011.01) |

(56) References Cited

U.S. PATENT DOCUMENTS

| | | | |
|---|---|---|---|
| 5,422,684 | A | 6/1995 | Keller |
| 5,440,326 | A | 8/1995 | Quinn |
| 5,495,576 | A | 2/1996 | Ritchey |
| 5,696,521 | A | 12/1997 | Robinson et al. |
| 5,991,085 | A * | 11/1999 | Rallison ............... G02B 27/017 345/8 |
| 6,038,707 | A | 3/2000 | Ryden et al. |
| 6,067,192 | A | 5/2000 | Lichtenfield et al. |
| 6,073,034 | A * | 6/2000 | Jacobsen ............. G02B 25/002 345/102 |
| 6,144,762 | A * | 11/2000 | Brooks ......................... 382/154 |
| 6,150,998 | A | 11/2000 | Travers et al. |
| 6,234,446 | B1 | 5/2001 | Patterson |
| 6,400,364 | B1 * | 6/2002 | Akisada et al. ............... 345/427 |
| 6,665,885 | B2 | 12/2003 | Masumoto |
| 6,809,759 | B1 * | 10/2004 | Chiang ............... H04N 5/23293 348/211.2 |
| 7,002,551 | B2 | 2/2006 | Azuma et al. |
| 7,158,118 | B2 | 1/2007 | Liberty |
| 7,173,604 | B2 | 2/2007 | Marvit et al. |
| 7,239,301 | B2 | 7/2007 | Liberty et al. |
| 7,414,611 | B2 | 8/2008 | Liberty |
| 7,489,298 | B2 | 2/2009 | Liberty et al. |
| 7,542,210 | B2 | 6/2009 | Chirieleison, Sr. |
| 7,667,962 | B2 | 2/2010 | Mullen |
| 8,072,424 | B2 | 12/2011 | Liberty |
| 8,137,195 | B2 | 3/2012 | Penzias |
| 8,180,411 | B2 | 5/2012 | Skagmo et al. |
| 8,212,859 | B2 | 7/2012 | Tang et al. |
| 8,237,657 | B2 | 8/2012 | Liberty et al. |
| 8,549,415 | B2 | 10/2013 | Tang |
| 8,581,841 | B2 | 11/2013 | Simpkins et al. |
| 8,605,008 | B1 | 12/2013 | Prest et al. |
| 8,723,699 | B2 | 5/2014 | Ivanov et al. |
| 8,758,021 | B2 * | 6/2014 | Takahashi ..................... 434/262 |
| 8,766,917 | B2 | 7/2014 | Liberty et al. |
| 8,795,079 | B2 | 8/2014 | Penzias, III |
| 8,831,255 | B2 | 9/2014 | Crawford et al. |
| 8,881,316 | B2 | 11/2014 | Reyes et al. |
| 8,928,635 | B2 | 1/2015 | Harley et al. |
| 8,957,835 | B2 | 2/2015 | Hoellwarth |
| 9,063,351 | B1 * | 6/2015 | Ho et al. |
| 2004/0008157 | A1 | 1/2004 | Brubaker et al. ................. 345/8 |
| 2006/0103590 | A1 * | 5/2006 | Divon ...................... G02B 27/01 345/7 |
| 2007/0263125 | A1 * | 11/2007 | Ootsuki ............... G02B 27/017 348/571 |
| 2008/0015017 | A1 | 1/2008 | Ashida et al. |
| 2008/0024594 | A1 * | 1/2008 | Ritchey ........................... 348/36 |
| 2009/0073084 | A1 * | 3/2009 | Mullen ................. G06F 1/1624 345/8 |
| 2010/0079356 | A1 * | 4/2010 | Hoellwarth ........................ 345/8 |
| 2011/0194029 | A1 * | 8/2011 | Herrmann et al. ............ 348/569 |
| 2011/0261452 | A1 | 10/2011 | Kory |
| 2011/0304577 | A1 | 12/2011 | Brown et al. |
| 2012/0068914 | A1 * | 3/2012 | Jacobsen ................ G06F 1/163 345/8 |
| 2012/0069131 | A1 * | 3/2012 | Abelow ............... G06Q 10/067 348/14.01 |
| 2012/0116548 | A1 * | 5/2012 | Goree .................. A61B 5/1118 700/90 |
| 2012/0122574 | A1 * | 5/2012 | Fitzpatrick .............. G06T 13/40 463/31 |
| 2013/0063550 | A1 * | 3/2013 | Ritchey .................. G03B 37/00 348/36 |
| 2013/0093788 | A1 * | 4/2013 | Liu et al. ....................... 345/633 |
| 2013/0128022 | A1 * | 5/2013 | Bose ..................... A63F 13/211 348/77 |
| 2013/0174205 | A1 * | 7/2013 | Jacobsen .......... H04N 21/43637 725/81 |
| 2013/0335573 | A1 | 12/2013 | Forutanpour et al. |
| 2014/0098009 | A1 * | 4/2014 | Prest .................. G02B 27/0176 345/8 |
| 2014/0152531 | A1 * | 6/2014 | Murray ................. G06F 1/1632 345/8 |
| 2014/0159995 | A1 * | 6/2014 | Adams et al. ...................... 345/8 |
| 2014/0218269 | A1 * | 8/2014 | Cazalet ............. G02B 27/0176 345/8 |
| 2014/0282224 | A1 * | 9/2014 | Pedley ................. G06F 3/0485 715/784 |
| 2014/0347390 | A1 * | 11/2014 | Poulos et al. .................. 345/633 |
| 2014/0368412 | A1 * | 12/2014 | Jacobsen ............. G02B 27/017 345/8 |
| 2015/0234189 | A1 * | 8/2015 | Lyons ................ G02B 27/0172 345/174 |
| 2015/0234192 | A1 * | 8/2015 | Lyons ................ G02B 27/0172 345/8 |
| 2015/0235426 | A1 * | 8/2015 | Lyons ................ G02B 27/0172 345/8 |

OTHER PUBLICATIONS

Timework Corporation, "The Google Cardboard Kit," Google Cardboard, Jan. 22, 2015, 2 pages, http://google-cardboard.com/.
Seifert, et al., "Hands-on with Google and Mattel's View-Master of the Future," The Verge, Feb. 13, 2015, 7 pages, http://www.theverge.com/2015/2/13/8033189/mattel-google-cardboard-view-master-hands-on.
Jabra, "Jabra Intelligent Headset—for Developers," Jabra, Jan. 22, 2015, 9 pages, http://www.jabra.com/products/bluetooth/jabra_intelligent_headset/jabra_intelligent.
Russell, Kyle, "Leap Motion Launches VR Headset Mount for its Hand-Tracking Controller," TechCrunch, Aug. 28, 2014, 6 pages, http://techcrunch.com/2014/08/28/leap-motion-launches-vr-headset-mount-for-its-motion-controller/.
Steed, Anthony and Julier, Simon "Design and Implementation of an Immersive Virtual Reality System Based on a Smartphone Platform", IEEE 2013 Symposium on 3D User Interfaces (3DUI); Mar. 16-17, 2013; pp. 43-46 (4 pages).
Starr, Michelle "VrAse Turns Your Smartphone Into VR Goggles" CNET Website; Sep. 2, 2013 (6 pages).
McMill, Ian; "DIY 3D Head-Mounted-Display Using Your Smartphone" Website: instructables; 2013 (7 pages).
Hutter, M., "DIY 3D Virtual Reality Goggles," http://www.hutter1.net/puzzles/3dvrglass.htm, Jan. 21, 2014, pp. 1-7.
World Intellectual Property Organization, International Search Report and Written Opinion for International Application No. PCT/US2015/16445, mail date Jul. 14, 2015, pp. 1-25.

* cited by examiner

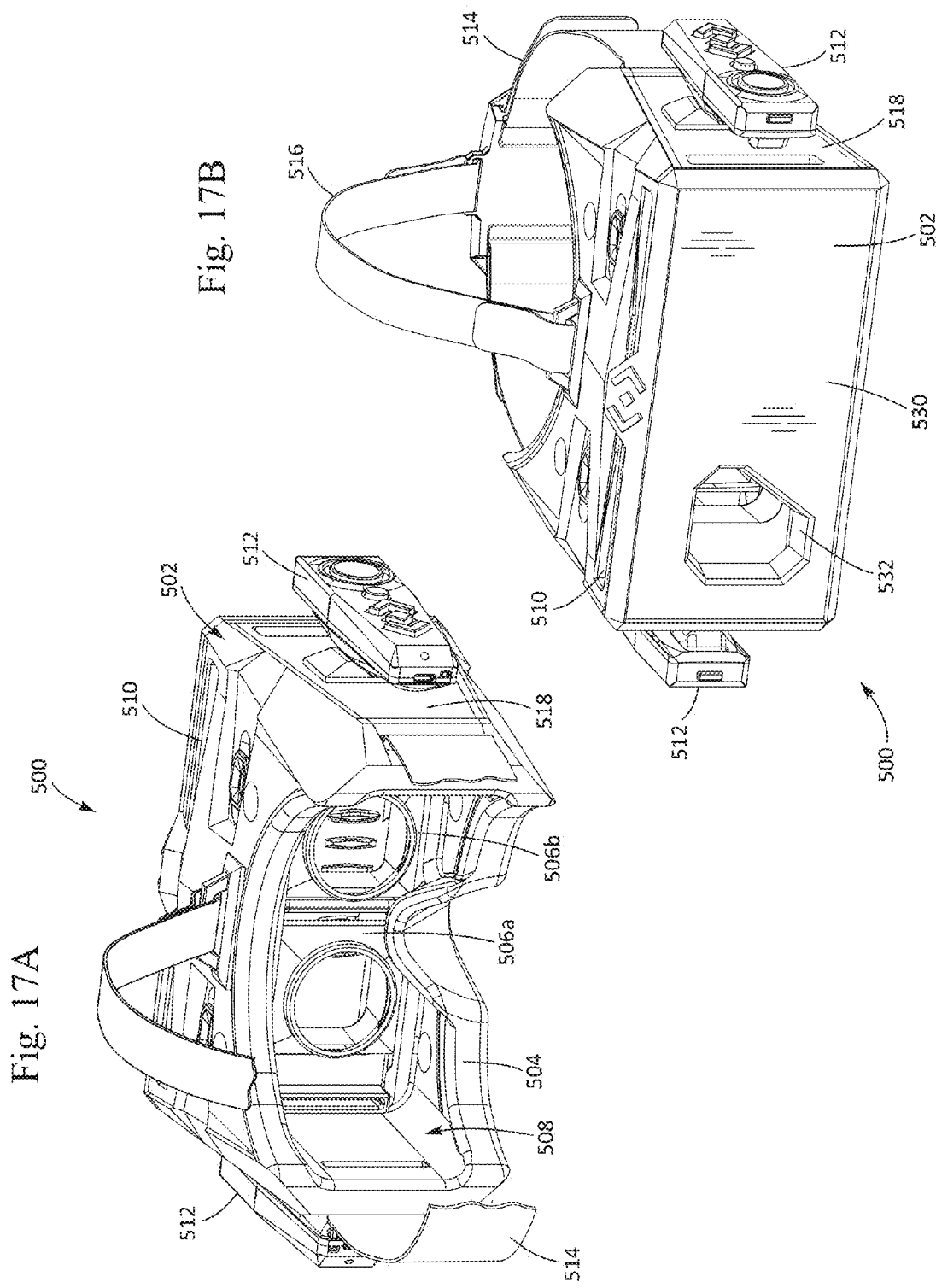

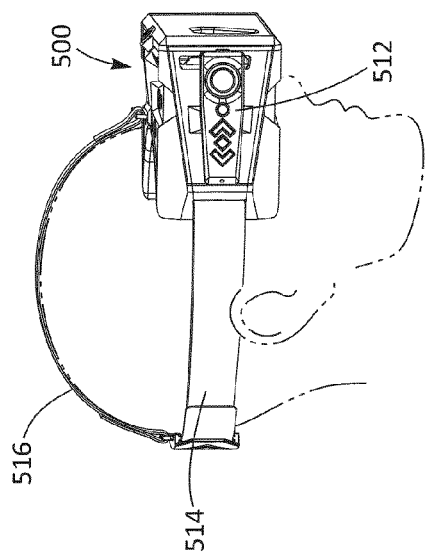
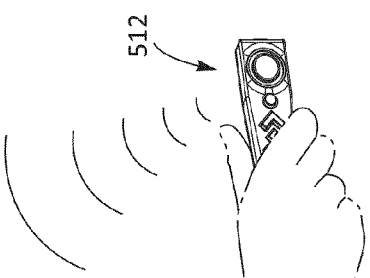
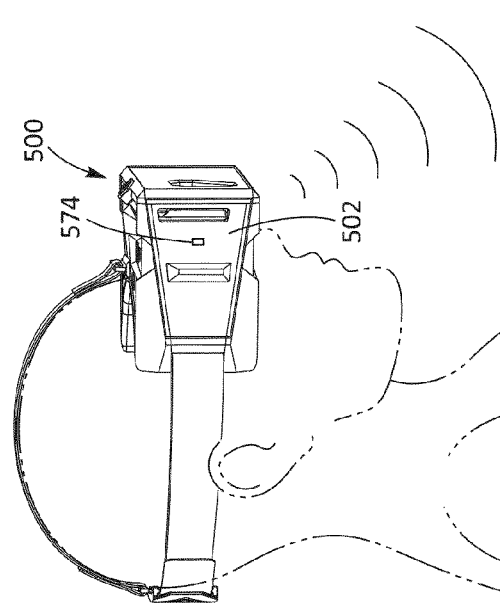
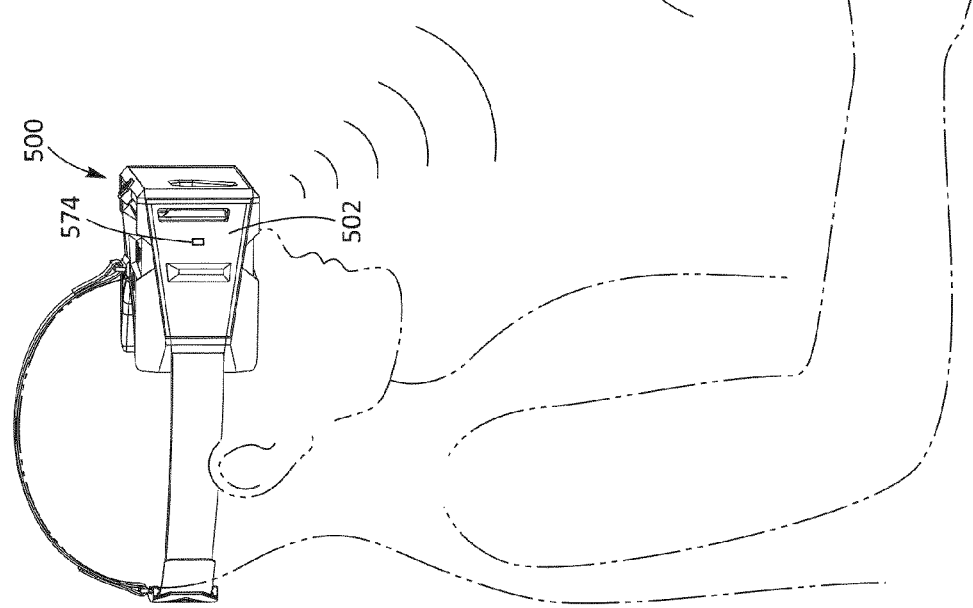
Fig. 18A
Fig. 18B

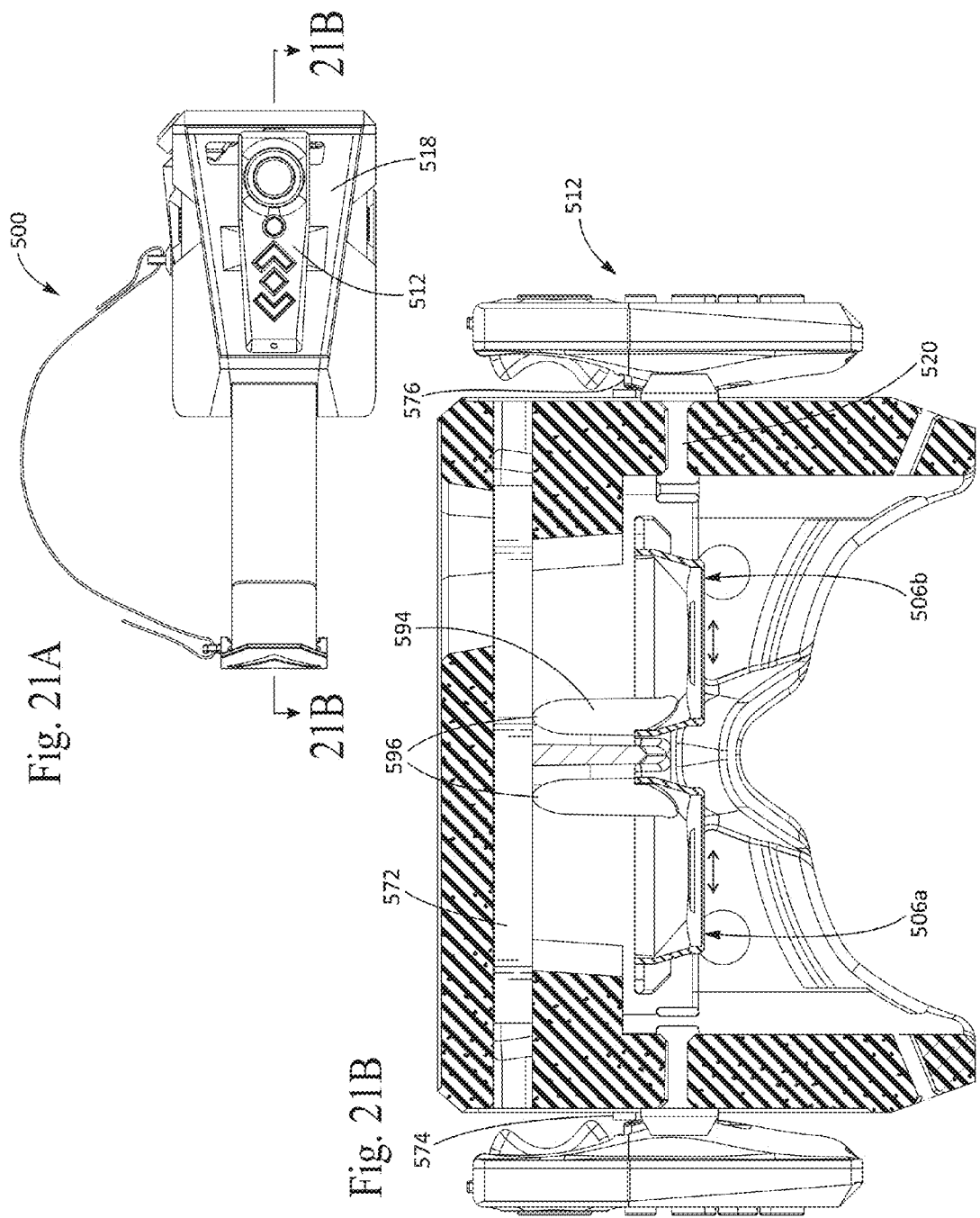

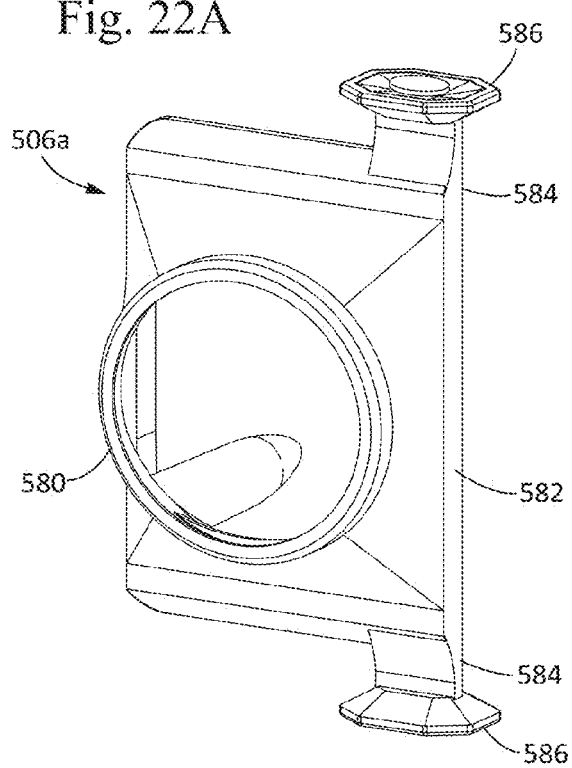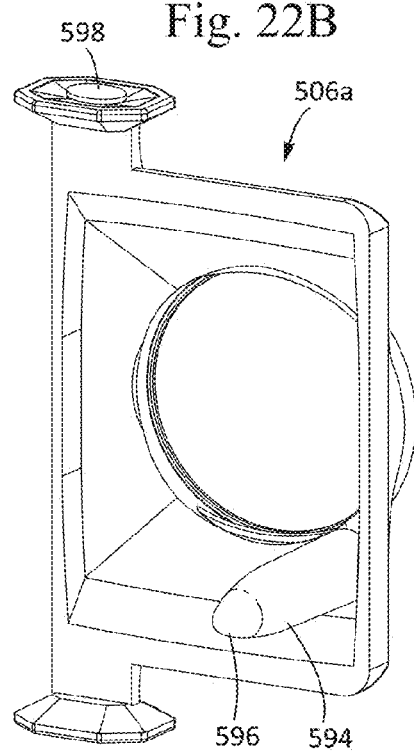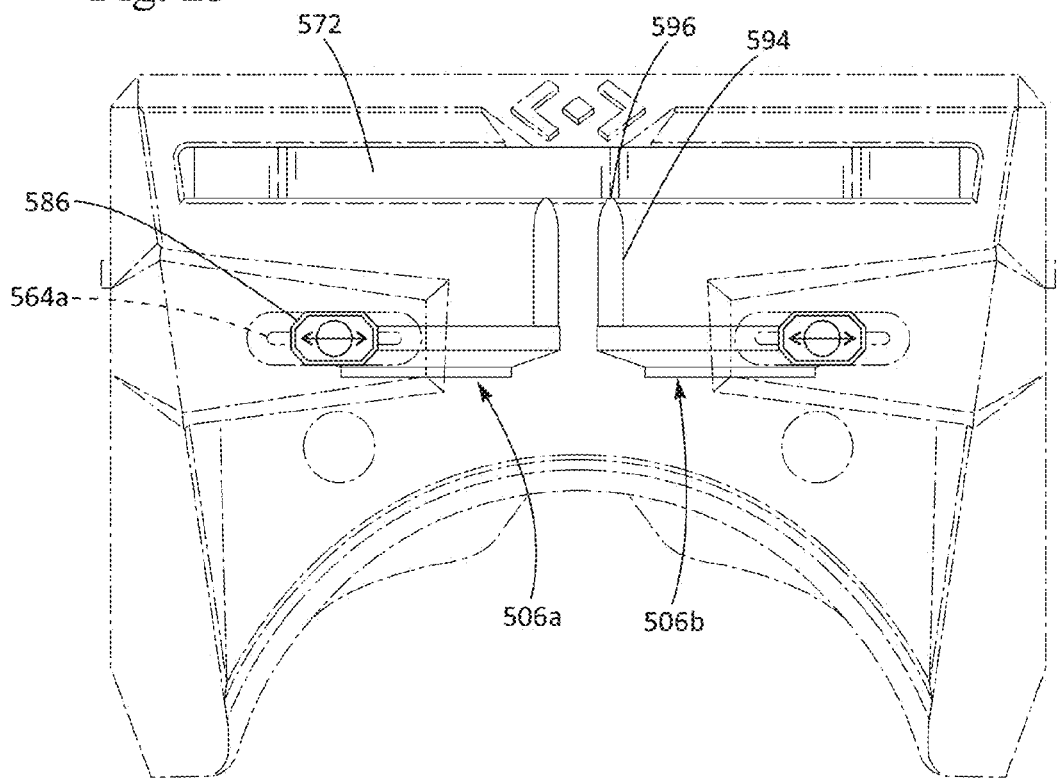

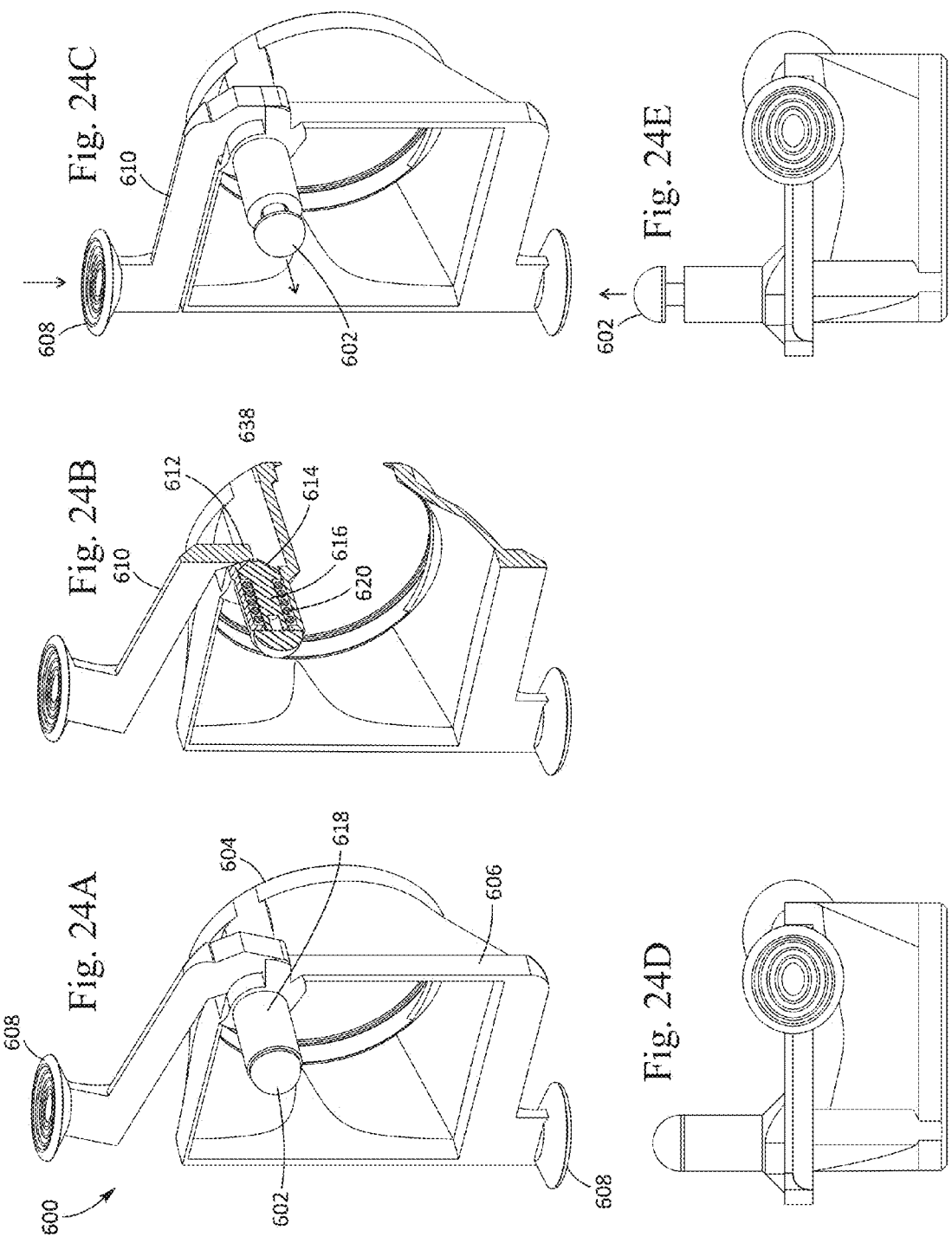

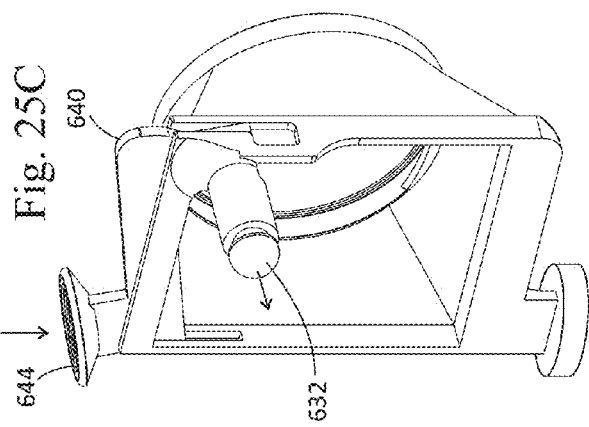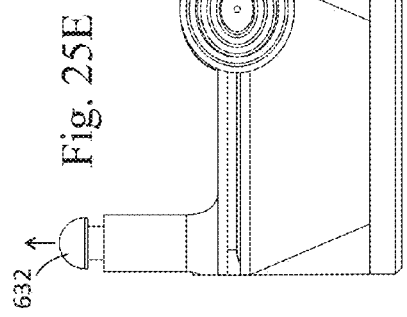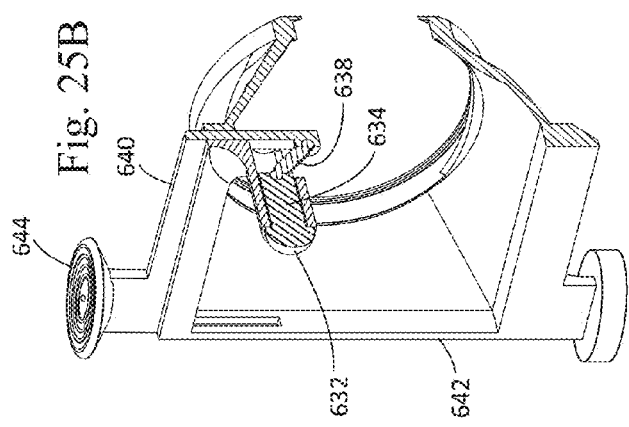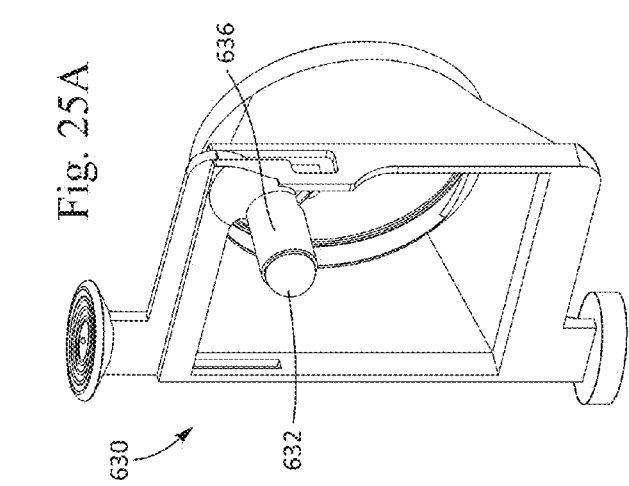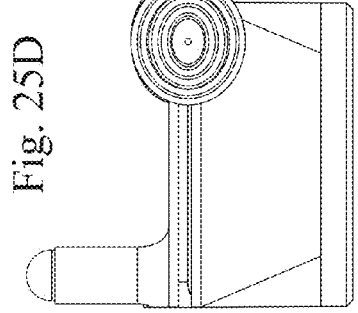

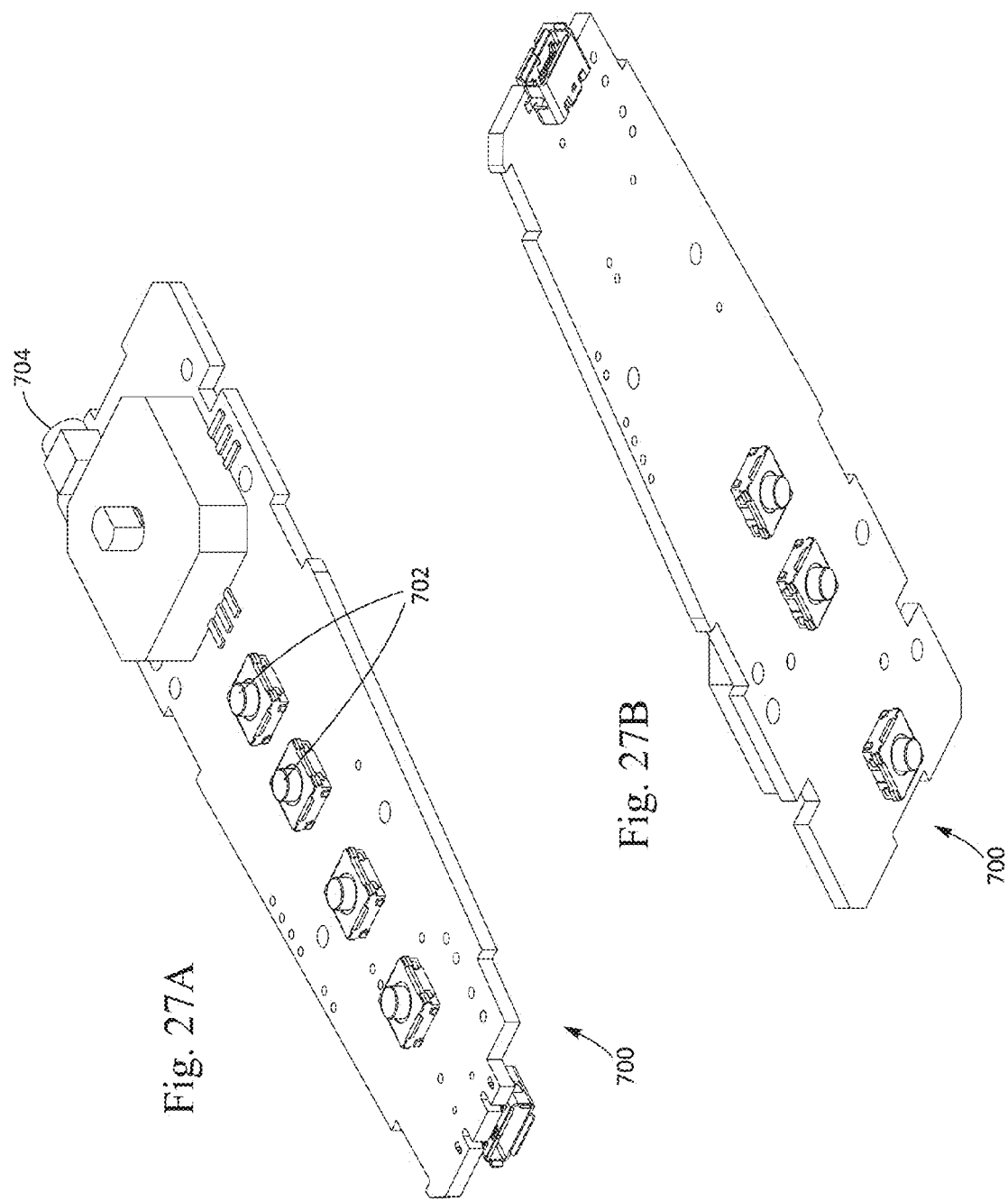

REMOTE CONTROL AUGMENTED MOTION DATA CAPTURE

REFERENCE TO RELATED APPLICATIONS

The present application claims priority under 35 U.S.C. §119 to U.S. Provisional Application Ser. No. 62/060,996, filed Oct. 7, 2014, and 61/941,294, filed Feb. 18, 2014, both entitled "Mobile Virtual and Augmented Reality System and Use," the contents of which are expressly incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates generally to wearable computers, and more specifically to goggles which receive a mobile computing device such as a smartphone to provide a mobile virtual and augmented reality system, whereby a user can experience and control virtual reality (VR), augmented reality (AR), and stereoscopic experiences, such as three dimensional (3D) and 360° movies and computer games.

Any discussion of the prior art throughout this specification should in no way be considered as an admission that such prior art is publically known or forms part of common general knowledge in the field.

In the 1960s, Ivan Sutherland presented a virtual 3D world to users using an early vector cathode ray tube (CRT) head mounted display. Tracking was performed by a set of either mechanical or ultrasonic sensors. A general purpose computer processed the tracking data, while a special purpose graphics processor made the appropriate perspective transforms on scene data. Sutherland wrote, "No available general-purpose computer would be fast enough to become intimately involved in the perspective computations required for dynamic perspective display."

Since that time, the graphics hardware industry has grown and matured. With the rise of the video game industry, there is now a commoditized marketplace for high performance graphics chipsets. Such chipsets enable almost any general-purpose computer to run 3D game engines and allow these machines to "intimately" participate in real-time perspective display. These chipsets are now in mobile computing devices, such as current smartphones, bringing 3D game engines to these smaller devices.

Head mounted displays (HMDs) have provided gateways into various augmented and virtual realities, and have been used in many industries in addition to gaming as a means of allowing hands free and immersive viewing of computer generated and filmed (e.g., 360° cameras) content. However, these displays were typically manufactured in low volumes, were built for a customer base of researchers and niche application developers, and cost thousands, if not tens of thousands, of dollars. There have been some steps towards commodity virtual reality displays for gaming, such as the Nintendo Virtual Boy™, but these products have been commercially unsuccessful. A variety of relatively low cost mobile HMDs (MHMDs) have been available in the $1000 and lower price point, beginning with models such as the Sony Glasstron™, Virtual I/O iGlasses™, and continuing with some models today.

There is a need for a more ergonomic and user-friendly system for MHMDs that leverage the sophistication and capabilities of current mobile computing devices.

BRIEF DESCRIPTION OF THE DRAWINGS

Various embodiments of the invention are described below with reference to the accompanying diagrammatic drawings, in which:

FIGS. 17A and 17B are perspective views of a further embodiment of the mobile head mounted display (MHMD) goggles of the present application;

FIGS. 18A and 18B show a person wearing the MHMD goggles of FIGS. 17A and 17B in two different modes of operation;

FIGS. 20A and 20B are front and rear perspective views, respectively,

FIGS. 20C and 20D are front and rear elevational views, respectively,

FIG. 20E is a top plan view,

FIG. 20F is a sectional view looking forward through a mobile computing device retention slot and taken along angled lines 20E-20F in FIG. 20E, FIG. 20G is an alternative sectional view looking forward through a mobile computing device retention slot and taken along angled lines 20E-20F in FIG. 20E, while FIG. 20H shows a smartphone centered within the retention slot by compressible bumpers, FIG. 20I is a bottom plan view, FIG. 20J is a right side elevation view (the left side being identical in this embodiment), FIG. 20K is a vertical sectional view taken along line 20K-20K in FIG. 20E, and FIG. 20L is a vertical sectional view taken along line 20K-20K in FIG. 20E showing an upper retention ridge of the retention slot;

FIG. 21A is a side elevation view of the MHMD goggles of FIGS. 17A and 17B, and FIG. 21B is a horizontal sectional view through the goggles taken along line 21B-21B of FIG. 21A;

FIGS. 22A and 22B are front and rear perspective views of exemplary lens assemblies for use in the MHMD goggles of FIGS. 17A and 17B;

FIG. 23 is a top elevation view of the main body of the MHMD goggles of FIGS. 17A and 17B shown in phantom illustrating movement of the lens assemblies therein relative to a mobile computing device;

FIGS. 24A-24E are perspective and top plan views of an alternative lens assembly with a movable stylus for use in the MHMD goggles of FIGS. 17A and 17B;

FIGS. 25A-25E are perspective and top plan views of a further alternative lens assembly with a movable stylus for use in the MHMD goggles of FIGS. 17A and 17B;

FIGS. 27A and 27B are top and bottom perspective views, respectively, of an exemplary circuit board for using the remote control of FIGS. 26A and 26B;

DETAILED DESCRIPTION

The present application provides an ergonomic and user-friendly head mounted display for producing virtual reality (VR), augmented reality (AR), and stereoscopic experiences, such as three dimensional (3D) and 360° movies and games. The head mounted display includes soft goggles that conform to a wearer's face and include a slot for receiving and retaining a mobile computing device, such as a smartphone. A pair of lenses adjustably mounted within the goggles provide a stereoscopic image of the display of the smartphone within the goggles. One or two remote controls may be mounted to the goggles for additional functionality.

The term "head mounted display" or HMD refers to any apparatus that can be mounted on the head to provide the wearer a personal viewing experience. Illustrated embodiments include goggles that are strapped around the back of the head and have a main body which receives a mobile computing device therein. Although a HMD can be relatively cumbersome, each of the HMDs described herein are relatively lightweight and portable, and thus are referred to as mobile head mounted displays, or MHMDs.

The term "mobile computing device" refers to a portable unit with an internal processor/memory and a display screen, such as a smartphone. Mobile computing devices can be smartphones, cellular telephones, tablet computers, netbooks, notebooks, personal data assistants (PDAs), multimedia Internet enabled cellular telephones, and similar personal electronic devices that include a programmable processor/memory and display screen. Such mobile computing devices are typically configured to communicate with a mobile bandwidth provider or wireless communication network and have a web browser. Many mobile computing devices also include a rear-facing camera which provides additional functionality when coupled with the MHMDs of the present application.

Figure 1:
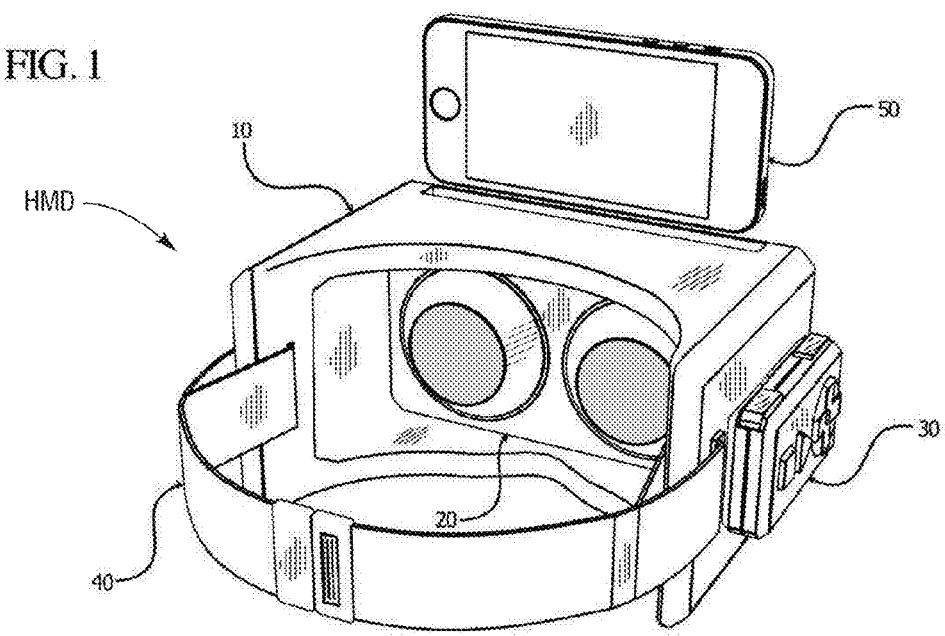
FIG. 1 is a rear perspective view of head mounted display goggles in accordance with one embodiment of the invention with a mobile computing device poised to be received therein.
Figure 2:
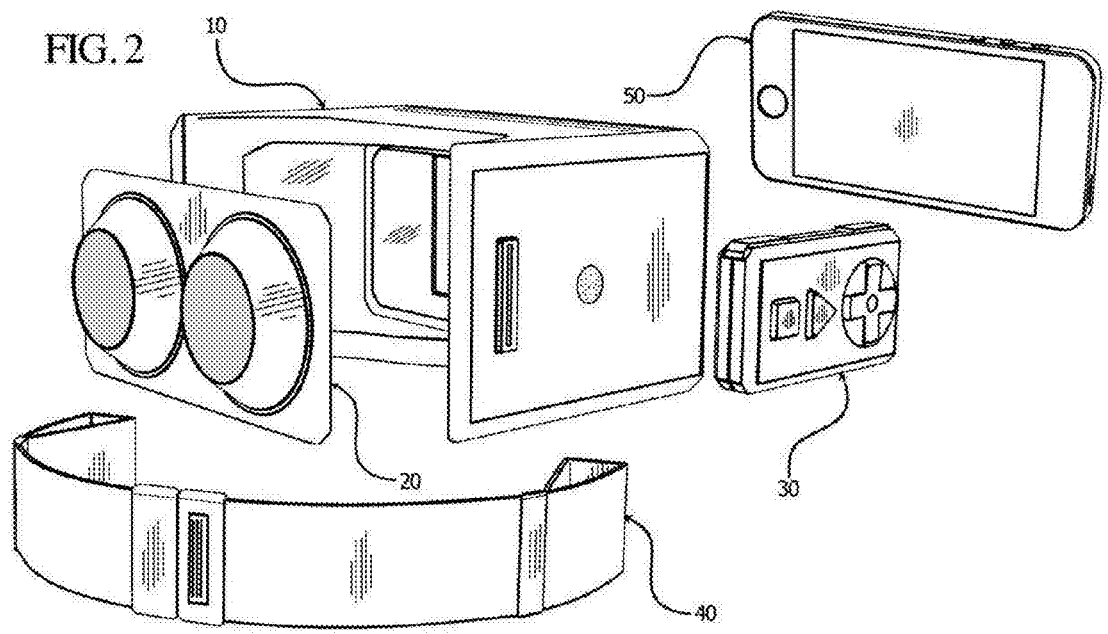
FIG. 2 is an exploded perspective view of components of the goggles shown in FIG. 1.

In the exemplary head mounted display HMD shown in FIGS. 1 and 2, a main body 10 may be fitted with a lens assembly 20, a strap 40 which securely attached the main body to the user's head, a re-attachable remote controller 30, and an external mobile computing device 50 to be secured in the main body 10. The main body 10 as disclosed herein is easily adapted to fit any of a number of mobile computing device 50 shapes and sizes, such as, but not limited to, the iPhone5™, the iPod Touch™, the Samsung Galaxy4™, the Nokia 920™, or any other handheld visual media players.

Figure 3A:
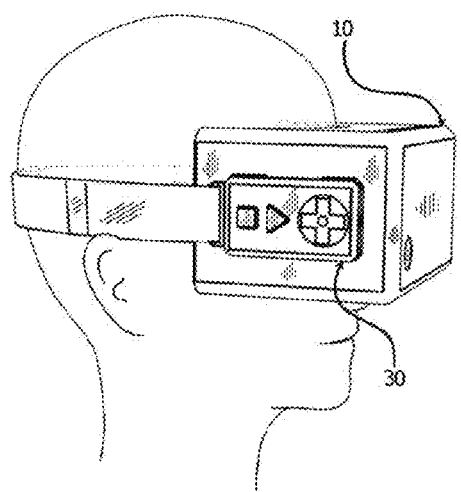
FIG. 3a is a perspective view of the goggles shown in FIG. 1 fitted on a person.
Figure 3B:
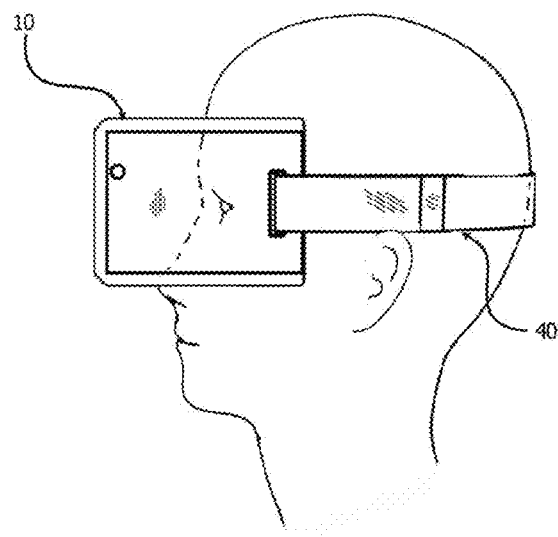
FIG. 3b is a side view of the goggles shown in FIG. 1 fitted on a person.

As noted, a strap 40 may be used to securely attach the main body to the user's head, as illustrated in FIG. 3a and FIG. 3b; however, other or additional means and methods may be used, such as various items and techniques that are readily available for other goggles- and glasses-type products which may be applied to the main body 10. For example, the main body 10 could be incorporated into a helmet-like device which is secured to the top of the head without a strap.

Figure 4A:
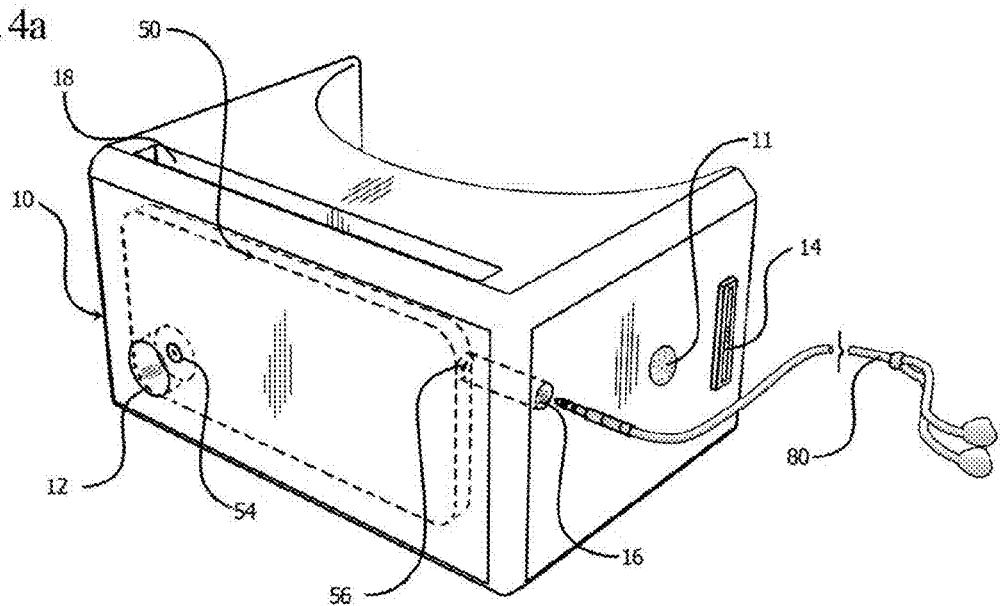
FIG. 4a is a perspective view of one embodiment of the goggles shown in FIG. 1 illustrating exemplary functional design features.
Figure 5:
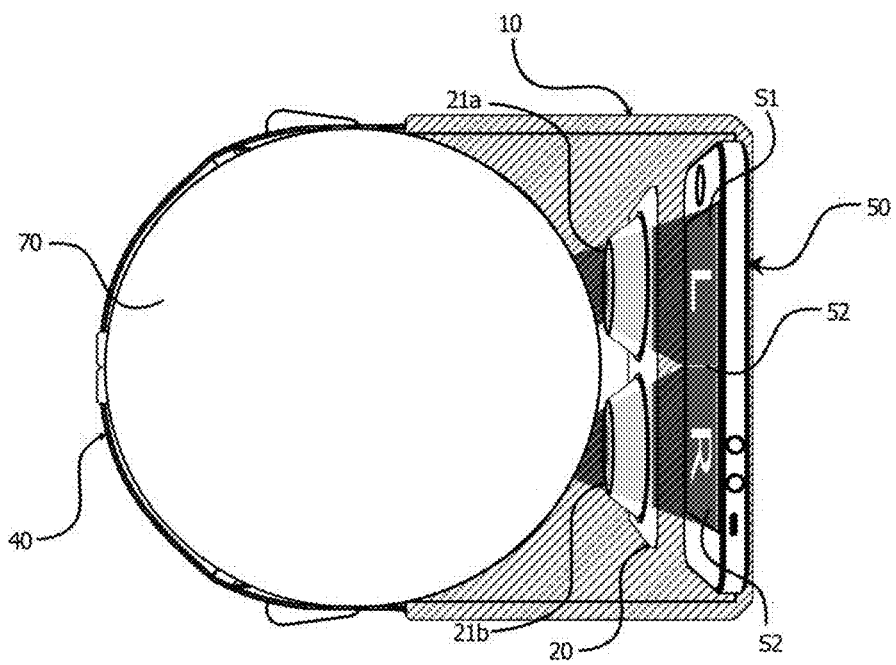
FIG. 5 is a top down view of one embodiment of the goggles shown in FIG. 1 fitted on a person and illustrating stereoscopic viewing achieved through the lenses.

The exemplary mobile computing device 50 as seen in FIGS. 4a and 5 includes a central processing unit (CPU) (not shown), a screen 52, a back facing camera 54, and wireless communication functionality (not shown), and may be capable of running applications for use with the system. In some embodiments, an audio port 56, such as shown in FIG. 4a, may be included, whereby audio signals may be communicated with the system. The mobile computing device 50 may incorporate one or more gyroscopes, gravitometers, magnetometers and similar sensors that may be relied upon, at least in part, in determining the orientation and movement of the overall MHMD. In some embodiments, the mobile computing device 50 may be a third party component that is required for use of the system, but is not provided by or with the system. This keeps cost down for the system by leveraging the user's current technology (e.g., the user's mobile computing device).

FIG. 4a illustrates a perspective view of one embodiment of the exemplary goggles shown in FIG. 1 illustrating exemplary functional design features. As may be seen, a main body 10 is shown that has a compartment 18, which is sized to fit and secure a mobile computing device 50. The main body 10 is hollowed out to allow the securely fitted mobile computing device 50 screen 52 to be visible from the back side of (i.e., from behind) the main body 10, as seen in section in FIG. 5. When a user puts the main body 10 over his or her head using the strap 40, the display screen 52 is visible within the hollow interior of the body. In the embodiment of FIG. 4a, the main body 10 has holes 16 and 12 that allow access to the device's various ports and components while the device is secured within the main body 10. In the particular embodiment shown, hole 12 allows the mobile computing device's 50 camera 54 to be fully utilized, and hole 16 allows access to the mobile computing device's 50 audio port 56 to allow the attachment of external audio peripherals such as headphones 80, although it should be noted that in other embodiments, other numbers, sizes, and positions of holes may be implemented as desired. For example, small vent holes may be provided to help prevent fogging of lenses and the display screen 52 within the main body 10.

As also indicated, in the exemplary embodiment shown, the main body 10 has a Velcro™ element 11 to allow the re-attachment of the remote controller 30 as shown in FIG. 1. Of course, in other embodiments, the use of Velcro™ to re-attach the remote controller can be replaced (or augmented) with any of various alternative attachment methods or means, such as clip 39 shown in FIG. 8b, positioned in a similar place or in different location(s) on the main body 10 or strap 40 as shown in FIG. 1. In the exemplary embodiment of FIG. 4a, the main body 10 has reinforced slots 14 to allow the attachment of the strap 40 to the main body 10 as shown in FIG. 1; however, the method of attachment of the strap 30 can be accomplished by any of various other methods of attachment, such as, but not limited to, sewn-in, glue, snaps, hooks, tabs, or Velcro® magnetics, among others.

Figure 4B:
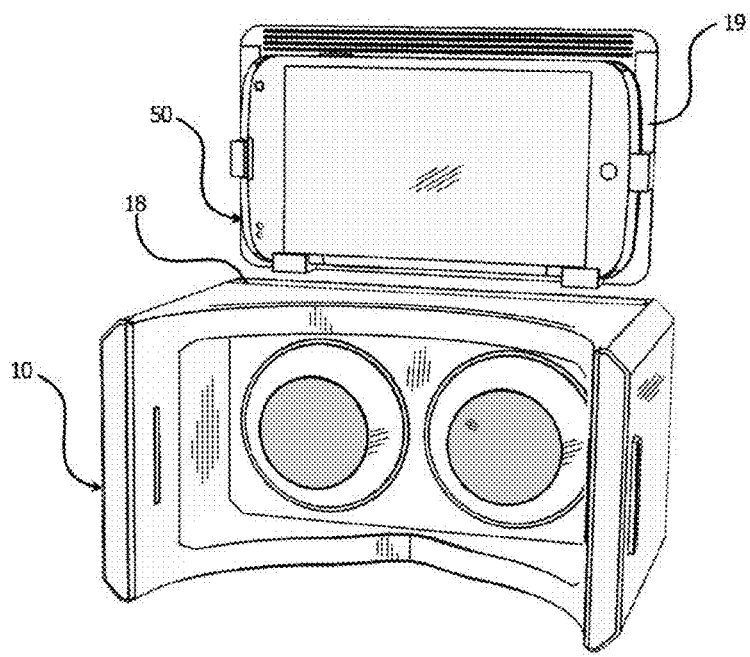
FIG. 4b is a perspective view of one embodiment of the goggles shown in FIG. 1 illustrating use of an external frame to secure and position the mobile computing device.

FIG. 4b is a perspective view of one embodiment of the exemplary apparatus shown in FIG. 1 illustrating exemplary use of an external mobile computing device frame 19 to secure and position the mobile computing device. The mobile computing device 50 can be fitted into the mobile computing device frame 19 so as to allow the main body 10 to receive mobile computing devices of different sizes. In other words, use of the common frame 19 may allow any of various sized mobile computing devices to be used as desired, and the shape of receptacle within the main body 10 reliably receives the common frame 19.

Figure 4C:
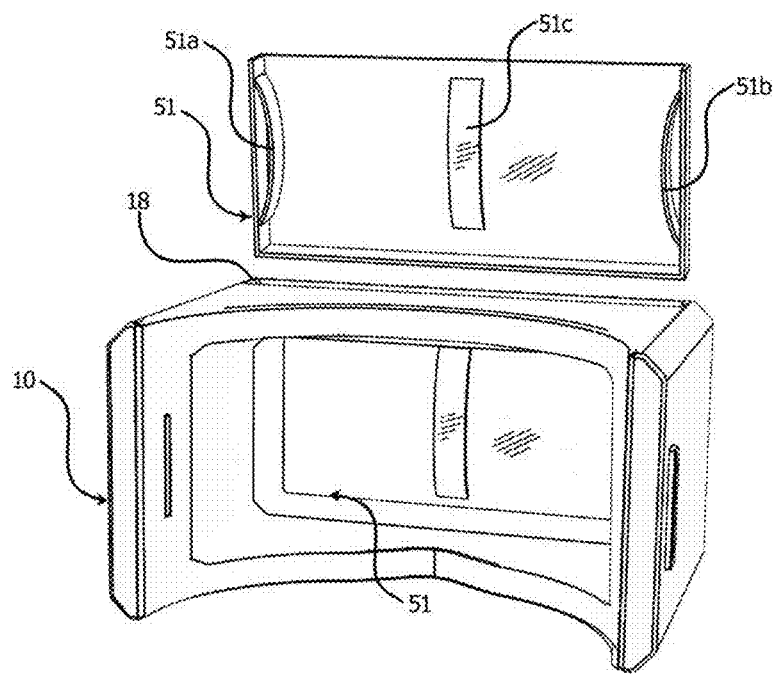
FIG. 4c is a perspective view of one embodiment of the goggles shown in FIG. 1 illustrating use of an internal frame to secure and position the mobile computing device.

FIG. 4c is a perspective view of one embodiment of the exemplary apparatus shown in FIG. 1 illustrating use of an internal frame 51 to secure and position the mobile computing device. "Internal" is means that the frame 51 is designed to reside within the main body 10. The mobile computing device may be inserted into the internal frame 51. The internal frame 51 may be rigid and a known shape which aids in centering and leveling within the foam body. Alternatively, the internal frame 51 is somewhat less compressible than the rest of the main body 10 so as to better center and level the mobile computing device, but is somewhat flexible so as not to detract from the otherwise soft and flexible main body. The "internal" frame 51 is shown in FIG. 4c both outside the body 10 to illustrate its configuration and inside the body in its normal placement. The use of an internal frame 51 may allow for incorporation, e.g., attachment or insertion, of mobile computing devices of different sizes while properly positioning the device within the main body of the MHMD. In some embodiments, the use of spring tension parts (e.g., leaf springs) of the internal frame 51a, 51b, and 51c may securely fit the mobile computing device (not shown) into the main body.

Additional or alternative mechanisms as the frames 50, 51 are envisioned that allow for similar functionality, such as, for example, the use of an internal frame that operates as a toaster-like mechanism to allow the mobile computing device to be inserted into the main body and click into place, wherein another push allows the device to be released. Furthermore, one or more internal frames may be provided, such as one to define a pocket to retain the mobile computing device and another to define channels within which are mounted the lens assembly 20.

Figure 6:
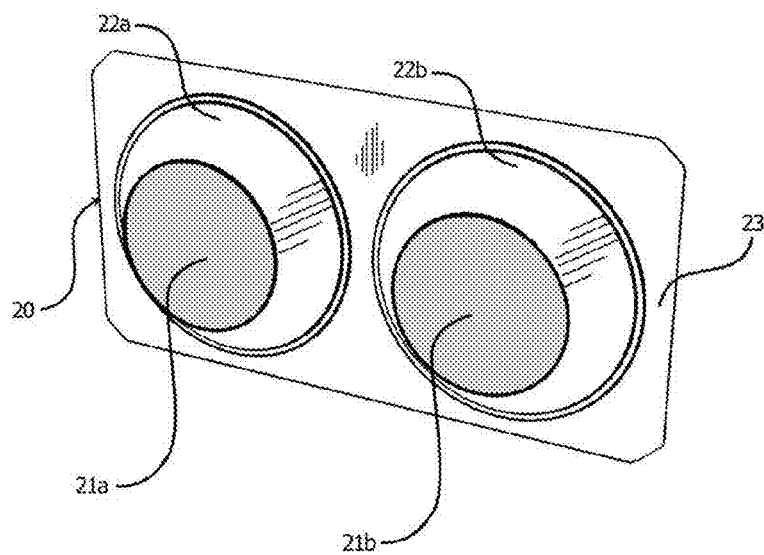
FIG. 6 is a perspective view of an exemplary lens assembly for the goggles shown in FIGS. 1 and 2.

FIG. 6 is a perspective view of an exemplary lens assembly 20 shown in FIGS. 1 and 2, according to one embodiment. As indicated, lens assembly 20 contains two lenses shown in FIG. 6 as elements 21a and 21b. In some embodiments, the lenses may be fixed in lens housings, exemplary embodiments of which are illustrated in FIGS. 1 and 2. As also indicated in FIG. 6, the lens housing are desirably attached to a lens assembly base 23.

The lens assembly is located between the user 70 and mobile computing device screen 52, as illustrated in FIG. 5, which is a horizontal sectional view of one embodiment of the exemplary apparatus shown in FIG. 1 fitted on a person and illustrating stereoscopic viewing achieved via the lenses. As may be seen, the main body 10 is worn with the user's eyes aligned with the lenses 21a and 21b so that the user 70 can look through the lens to view the mobile computing device screen 52. Each lens, e.g., of lenses 21a and 21b, may focus the user's vision S1 or S2 on a discrete (or respective) area of the mobile computing device screen L or R (left or right). Properly centering the user's vision through the lenses is particularly important in virtual reality applications where simulation of natural vision in an artificially-generated world requires images of a known distance apart to be simultaneously presented to a user's eyes in order to properly appear as "real" images.

The image on mobile computing device screen L is the left portion of the stereoscopic image, while mobile computing device screen R is the right portion of the stereoscopic image. Video content which is stereoscopic may be downloaded to the mobile computing device 50 to allow a person to perceive the images through the lenses 21a, 21b as one single three-dimensional image. Alternatively, stereoscopic display software or apps may be downloaded to the mobile computing device 50 and used to convert any single image into one which is stereoscopic. Stereoscopic viewing allows creation of virtual reality (VR), augmented reality (AR), 360 video, as well as 3D video.

Figure 7A:
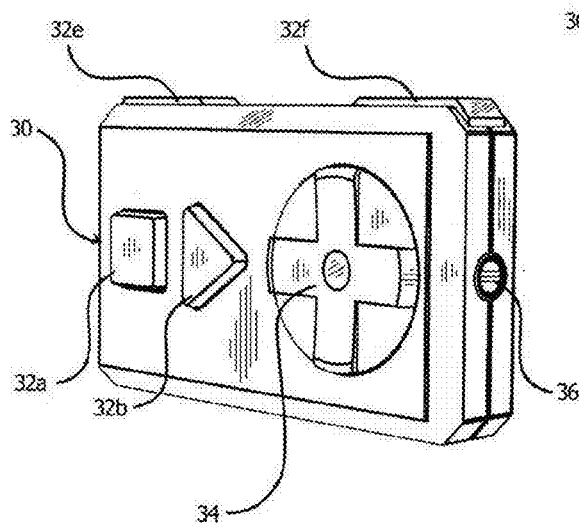
FIG. 7a and FIG. 7b are perspective views of an exemplary remote controller for use with the goggles shown in FIG. 1.
Figure 7B:
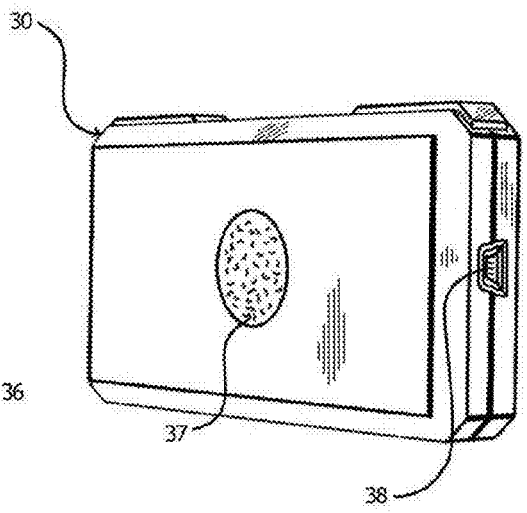
Figure 8A:
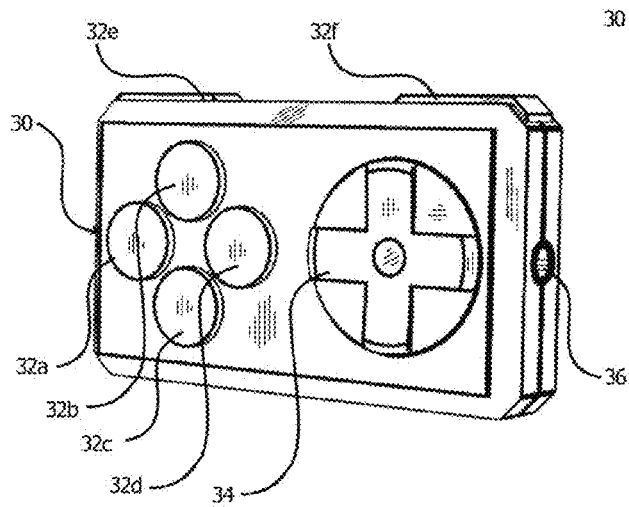
FIG. 8a and FIG. 8b are perspective views of an alternative remote controller for use with the goggles shown in FIG. 1.
Figure 8B:
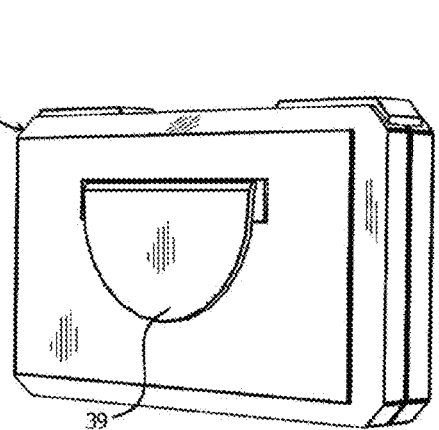

FIGS. 7a and 7b are perspective views of exemplary remote controllers such as shown in FIG. 1, and FIGS. 8a and 8b are perspective views of alternative remote controllers. In some embodiments, the remote controller 30 as illustrated in FIG. 7a, FIG. 7b, FIG. 8a, and FIG. 8b, receives input from the user 70 (not shown) and communicates the input to the mobile computing device 50 (not shown). While in some embodiments, wired means may be used to communicate between the remote controller and the mobile computing device, wireless communication is preferred. For example, in some embodiments, a near-field wireless communication protocol, such as Bluetooth, may be employed as a means to communicate to the mobile computing device 50; however WIFI is also considered as an alternative means of communication. More generally, in various embodiments, any wireless (or wired) communication means or protocols may be used as desired.

In the case of a wireless connection, the application running on the mobile computing device 50 may use a method of detecting one or more controllers and determining if the application can or should connect to the controllers based on the distance from the mobile device 50 using the signal strength of the remote controller. Alternatively, physical interaction with between the mobile computing device (or HMD) and a controller (e.g. pressing or holding down a button) may signal that they should attempt to communicate with one another. In addition the application running on the device may connect to multiple controllers and provide distinct functionality to each controller connected. In addition the application running on the mobile device 50 may provide a means of storing a record of controllers connected so that the system can ignore other controllers if needed, e.g., may be configured to store such a record in the memory of the mobile device 50.

Figure 8C:
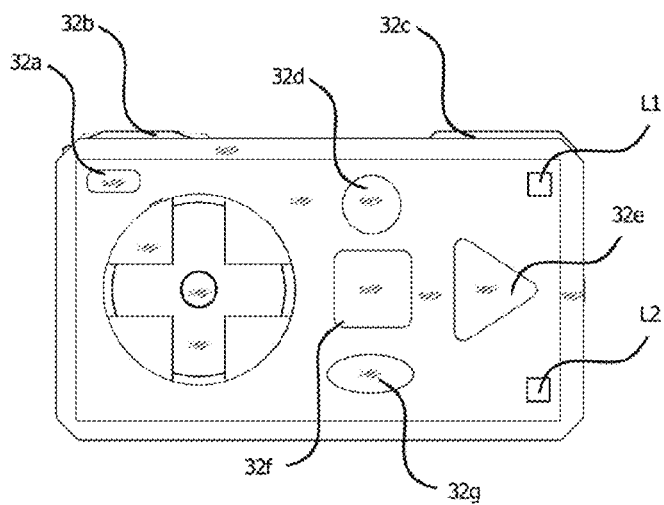
FIG. 8c is a plan view of a control face of a still further alternative remote controller for use with the goggles shown in FIG. 1.

FIG. 8a and FIG. 8b illustrate an embodiment in which the remote controller 30 comprises one or more buttons 32a-32f and/or one or more directional pads 34. In some embodiments, when the user 70 presses on one or more of the buttons 32a-32f or directional pad 34, the remote controller, e.g., a circuit board (not shown) included therein, may send a signal to the mobile computing device 50 corresponding to the button, direction, and/or possibly pressure. FIG. 8c illustrates an embodiment that incorporates the use of distinct shapes for the buttons 32a-32g as a means of allowing the user to feel for the button and determine the specific button by shape without looking. The remote controller may also include a dedicated button that provides a specific function regardless of the application being run, such as, for example, displaying the user's camera feed on the mobile device.

In addition, in some embodiments, the remote controller 30 may be equipped with one or more motion sensing elements, e.g., one or more sensors for detecting movement, acceleration, orientation, and so forth, referred to herein generally as "motion detection." Thus, for example, in some embodiments, the remote controller may include one or more motion detection chip(s), e.g., 9-axis motion detection chips, although other numbers of motion-related axes may be used as desired. The remote controller 30 may communicate its current motion state (which may include orientation) to the mobile computing device 50 according to some specified criteria, e.g., at a specified frequency, e.g., one or more times per second, or when the motion state changes, e.g., by a specified amount. When the remote controller 30 is attached to the main body 10, the application running on the mobile device 50 may be able to determine the starting position and orientation of the remote controller 30 in relation to the main body 10 or mobile device 50. This information may be used to track the position and orientation of the remote controller with greater accuracy. When the motion data from the remote controller 30 is used in a simulation that uses a human armature, the motion can be computationally mapped to the constraints of the human form, thus providing a method of using the remote controller 30 as a virtual hand and gesture device with high accuracy in terms of the relation to the user's own hand.

Figure 9A:
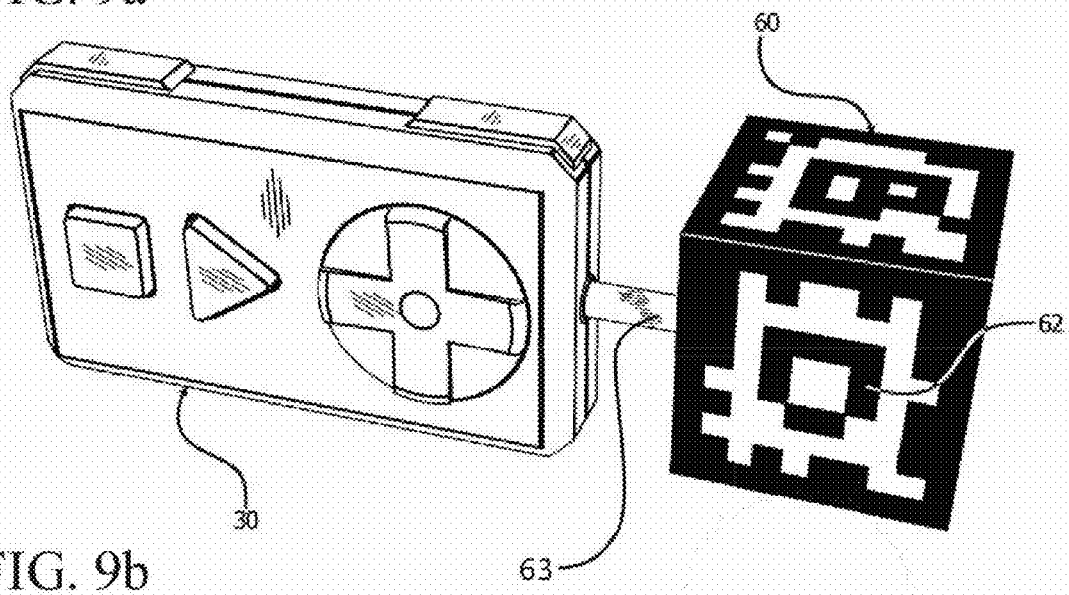
FIG. 9a is a perspective view of one embodiment of a remote controller illustrating use of a remote controller accessory attachment port to attach a fiducial marker accessory.
Figure 9B:
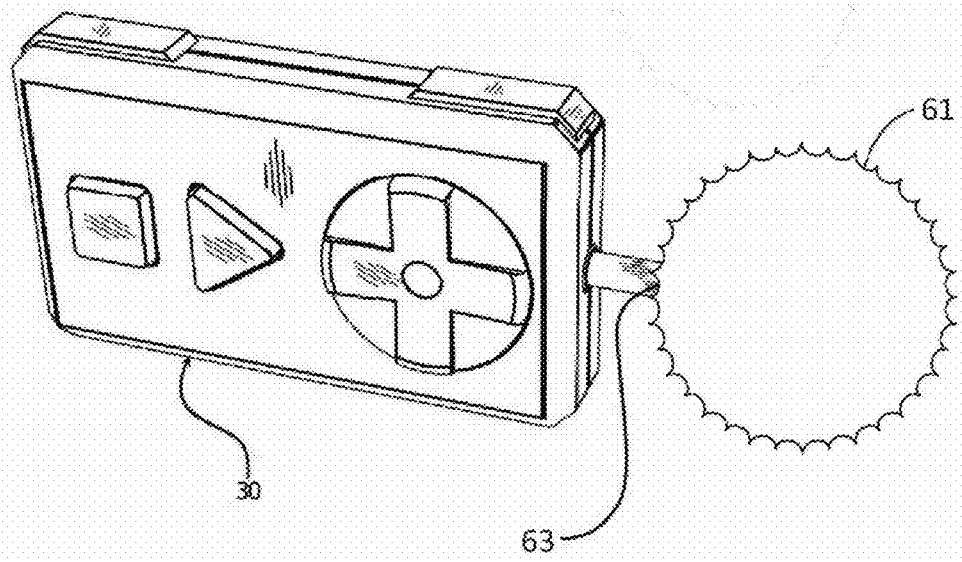
FIG. 9b shows the same view with a lighted ball in place of the fiducial marker.
Figure 9C:
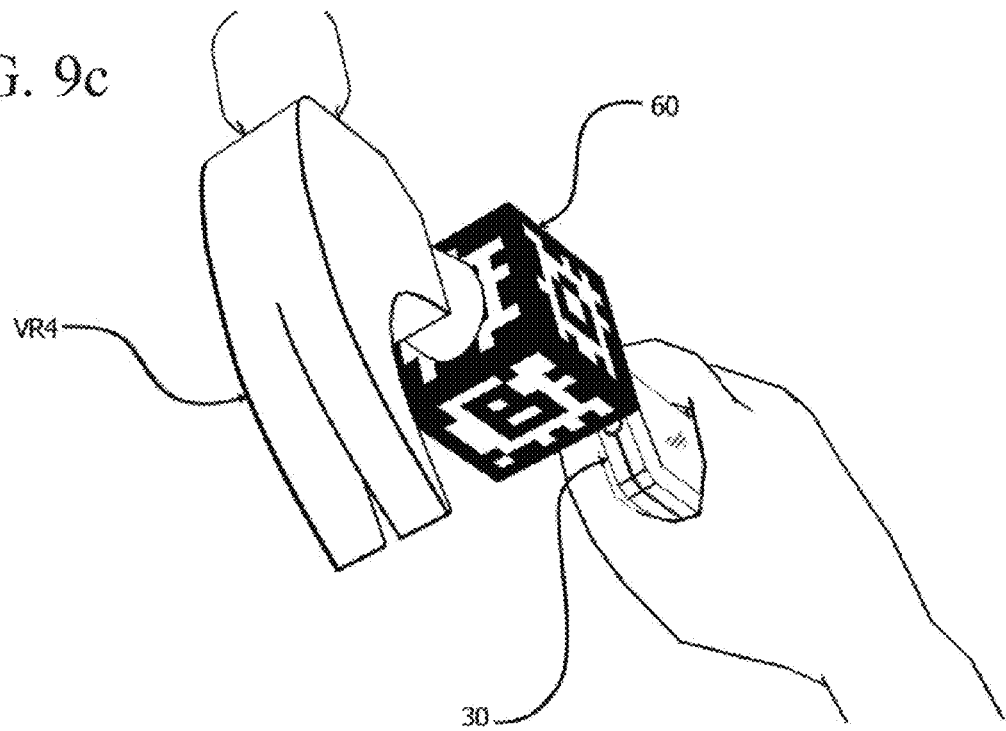
FIG. 9c is a first person view of one embodiment of a remote controller illustrating the use of the fiducial markers on a remote controller accessory to attach a virtual object.
Figure 9D:
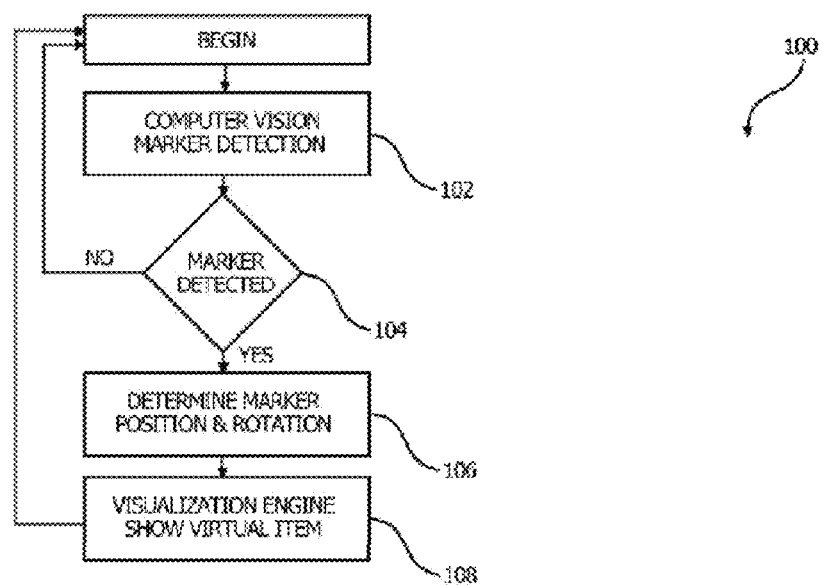
FIG. 9d is a flow diagram describing one embodiment of a marker detection process.

FIG. 8c illustrates two lights L1 and L2 that can be used in place of fiducial markers and in conjunction with the mobile device's camera 54 (not shown) and computer vision algorithms to detect the relative position of the remote controller 30 and the mobile devices 50 as diagramed in FIG. 9d. In some embodiments, a peripheral attachment port 36 as illustrated in FIG. 8a may allow for additional extensions to be added to the remote controller 30. Peripheral attachments may be ornamental in nature for the purpose of representing (or indicating) a real world tool to a user, such as a hammer or ax, or may be functional, such as when used as a fiducial marker 60, as shown in FIG. 9a.

When using a fiducial marker 60, the mobile computing device's camera 54 (see FIG. 4a) may then capture the fiducial marker 60 for use in or by an application on the mobile computing device 50. In this regard, the fiducial marker 60 may feature different patterns 62 on multiple faces which may be read via a camera or an infrared detector, for example, to convey both location (in relative space, based upon size of the marker) and rotational information (based upon the specific marker(s) visible and their angle) about the controller 30. FIG. 9b shows the same view of the remote controller 30 but with a lighted ball 61 in place of the fiducial marker 60. The peripheral attachment port 36 seen in FIG. 8a may be a common jack (e.g., AUX input jack) for interchanging identical stems 63 of the fiducial marker 60 and lighted ball 61. The main difference between the use of the lighted ball 61 and the fiducial marker 60 is the method of detection (e.g., marker based vs. blob based).

FIG. 9c discloses a first person perspective of the same fiducial marker from FIG. 9a interposed (through augmented reality software) with a hammer head. Using the fiducial markers, the MHMD can combine virtual and real objects from a user's perspective such that "swinging" the controller (marked with the fiducial markers) appears as though the user is swinging a hammer. This may be used to provide interactive elements to a game or augmented reality environment.

This process is illustrated in FIG. 9d. After beginning, the computer vision marker detection process 102 is used to search for and, if present, to detect fiducial markers. If a marker is not detected at 104, then the process ends (by beginning again in search of the next marker).

If a marker is detected, then the marker's position and rotation are detected at 106. Because each face of the fiducial marker (each, a marker in themselves) is distinct, the computer vision software can determine the distance (relative position to the MHMD camera) and, thus the location in free space, and the rotation based upon the angle of the markers presented to the camera.

Next, the visualization engine (e.g. virtual reality or augmented realty software) provides a real-time stream of data (either game data for VR applications or a video captured by the MHMD camera for augmented reality) to the wearer with a "virtual" item interspersed within that data as oriented, located, and rotated by the user based upon the fiducial marker data observed.

Figure 10A:
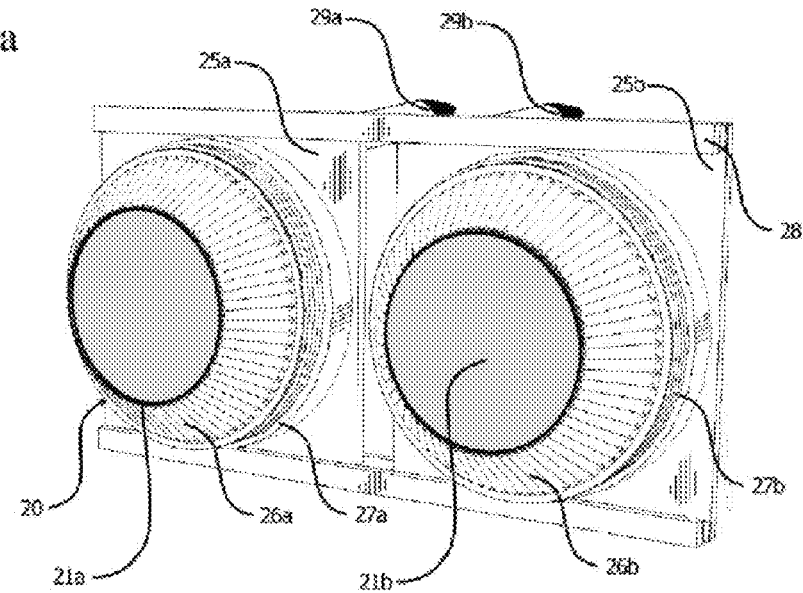
FIG. 10a is a perspective view of an exemplary embodiment of the lens assembly for the goggles shown in FIGS. 1 and 2.

The lens assembly 20 as illustrated in FIG. 6 is one exemplary embodiment of the lens assembly; however more complicated assemblies that allow for adjustments of the individual lens positions such as illustrated in FIG. 10a are also contemplated. FIG. 10a illustrates a lens assembly 20 with two lens assembly horizontal adjustment pieces 25a and 25b with interlocking ridges, shown in FIG. 10b as elements 25a1 and 25b1. The two lens assembly horizontal adjustment pieces 25a and 25b fit into the lens assembly frame 28 and, as illustrated in FIG. 10c, may interlock with the lens assembly frames interlocking ridges 28g, allowing for horizontal adjustment of the lens assembly horizontal adjustment pieces 25a and 25b and secure fit. It is also envisioned that in some embodiments, the lens assembly frame mechanics may be formed out of the foam body 10 without the need of a separate lens assembly frame 28.

Figure 10B:
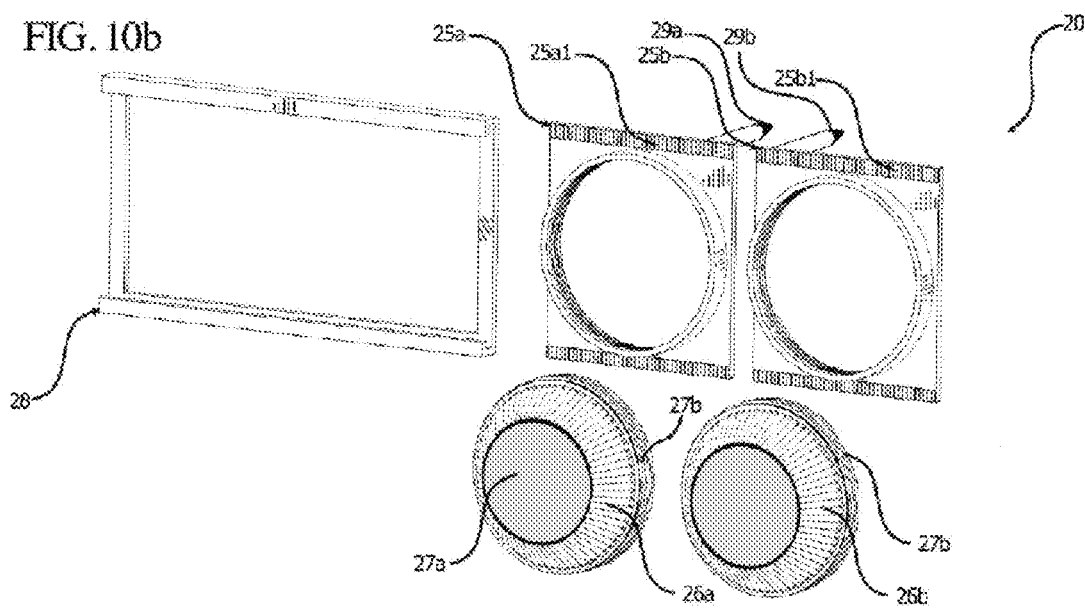
FIG. 10b is an exploded view of the lens assembly of FIG. 10a showing mechanical components of the assembly.
Figure 10C:
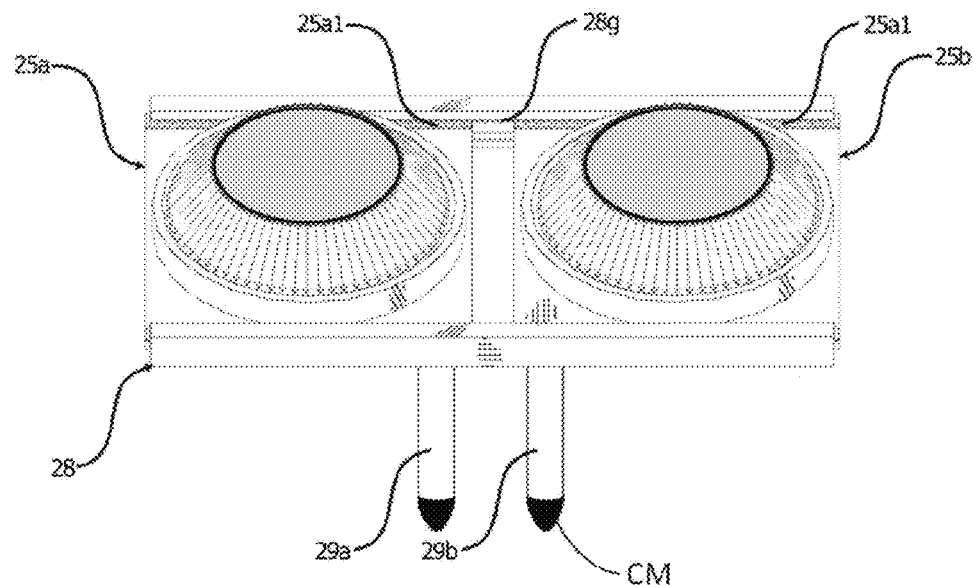
FIG. 10c is a perspective view of the lens assembly of FIG. 10a showing a mechanical slide and lock system as well as a pair of styluses extending therefrom.
Figure 10D:
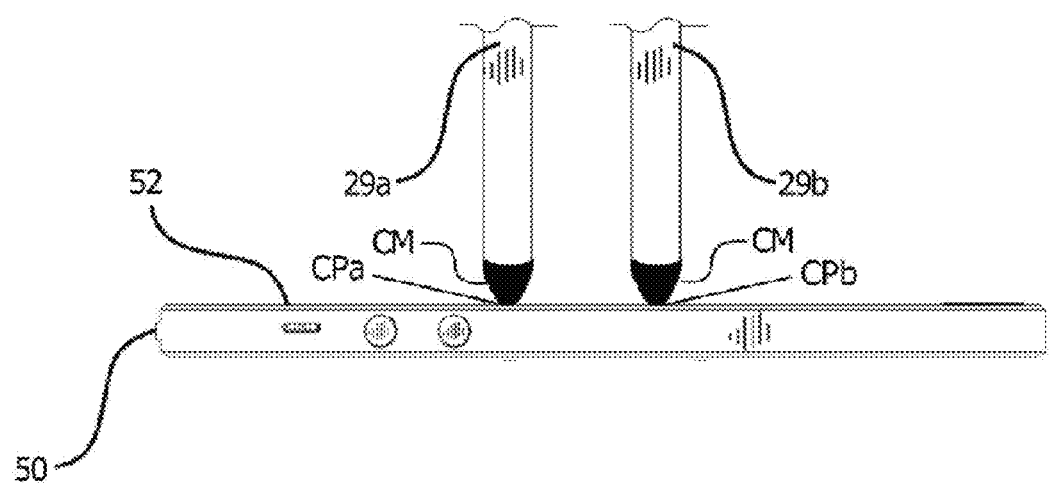
FIG. 10d illustrates exemplary use of the styluses along with conductive material to create corresponding contact points on the mobile device screen.
Figure 10E:
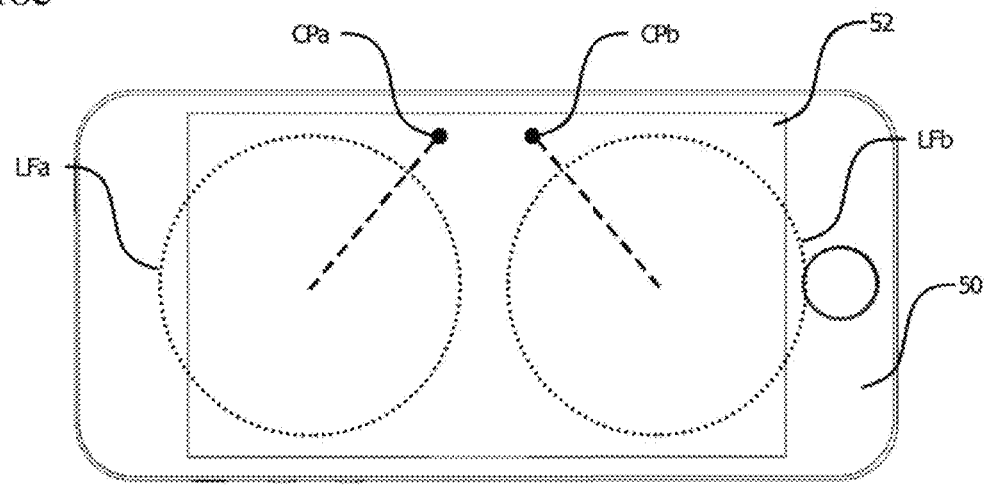
FIG. 10e illustrates the relationship of the contact points CP with the lens fulcrums.

FIGS. 10a and 10b shows an exemplary embodiment in which the lens eye pieces 26a and 26b screw into the horizontal adjustment pieces 25a and 25b to allow rotational adjustment on the z axis. FIG. 10c shows one embodiment of lens styluses 29a and 29b with conductive material CM on the tips. FIG. 10d illustrates exemplary use of the styluses 29a and 29b along with the conductive material CM to create corresponding contact points CPa and CPb on the mobile device screen 52. FIG. 10e illustrates the relationship of the contact points CP and the lens fulcrum.

Figure 10F:
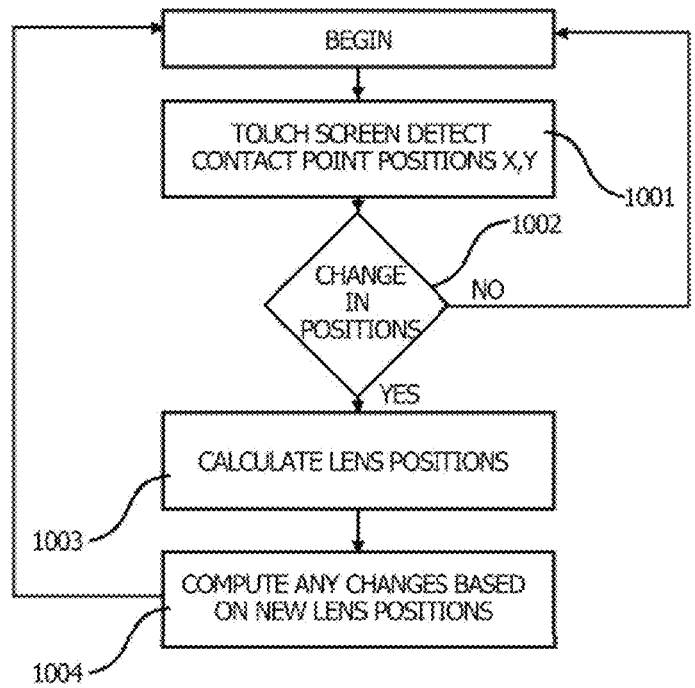
FIG. 10f is a flowchart diagram of a method for determining the position of contact points and computing changes in software based on the positions.

FIG. 10f describes the process of determining the contact points CPa and CPb and computing any changes in software based on the positions, according to one embodiment. The points CPa and CPb may be fixed, based upon the design of the lens assembly, such that when the styluses 29a and 29b touch the mobile device screen 52, virtual reality, augmented reality or, more basically, VR or virtual reality driver software may derive the interpupillary distance between the two eyes.

As mentioned above, the interpupillary distance is useful for properly presenting virtual reality or augmented reality environments to a wearer of the MHMD.

Because the distance from CPa or CPb to the center of each respective lens 21a and 21b is known, the IPD may be derived therefrom. The conductive material, thus, provides a contact point with substantial accuracy (e.g. typing on a capacitive mobile device screen) to enable the mobile device screen 52 to be adequately calibrated based upon the IPD derived therefrom.

Here, as shown in FIG. 10f, the process begins with detection by the touch screen of (x,y) coordinate positions of the stylus on the mobile device screen 52 at 1001. Capacitive touchscreens typical in most modern mobile devices are capable of simultaneous detection of multiple touches, so this process may take place once for each lens 21a, 21b, or may take place simultaneously for both.

If the position is unchanged from the last known position (or a beginning default position) at 1002, then the process returns to the beginning to await a change. If the position is changed at 1002, then a new lens position is calculated at 1003 based upon the known distance (and angle) of the center of the respective lens 21a, 21b, and the (x,y) location of the stylus.

Finally, the virtual reality or augmented reality software (or driver) re-computes any changes to the data displayed on the mobile computing device screen 52 at 1004. This may mean that the images shown on the mobile computing device screen 52 should be shown further apart or closer together or with a larger "black" or "darkened" gap between the two images in order to ensure that the images presented properly converge to a user wearing the MHMD given the updated (IPD). Failure to do so may make a wearer cross-eyed, give a wearer headaches, cause a wearer to feel dizzy, or otherwise degrade the experience of the MHMD wearer.

The capability to dynamically detect these positions is necessary in the present application because there is no standardized hardware (or IPD) being employed. In situations in which a single screen size is used for all software (i.e. the Oculus VR, Inc., Oculus Rift headset) then the IPD may be pre-set (as it was in the first version of the RIFT) regardless of the wearer. Without adjusting for IPD, the focal point of the wearer may be incorrectly calibrated relative to the images being displayed.

Here, in a situation in which the lenses 21a and 21b are moveable for the comfort of the wearer, determining the IPD is an important part of providing a quality experience to the user. The introduction of variable screen sizes, because many different types and sizes of mobile devices may be used in the present MHMD, only complicates things further.

Other methods for calculating IPD may also be employed including, incorporating a set of "wheels" or "gears" to enable the lenses to be dynamically moved by a wearer, while set within an MHMD, while simultaneously tracking the specific rotation of those wheels or gears such that IPD may derived from the current orientation of the wheels or gears. Similarly, a backwards-facing camera (including one built into a mobile device 50 that faces the same direction as the mobile computing device screen 52 may be capable, in conjunction with suitable software, of detecting the location of one or both lenses 21a, 21b based upon fiducial markers, visual markers or other elements interposed on the face of any lens assembly 20.

Figure 11A:
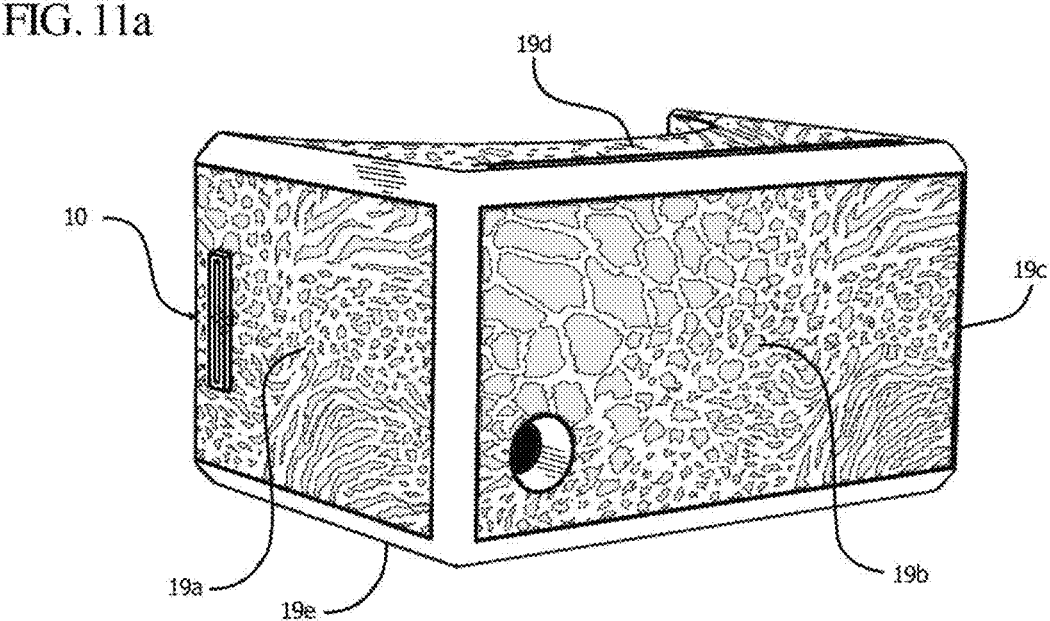
FIG. 11a is a perspective view of an MHMD illustrating one embodiment of a fiducial pattern embedded into the visual appearance.

Turning to FIG. 11a, the main body 10 may be printed or formed with a visual pattern that allows the main body to be identified as a fiducial marker, as shown in elements 19a-19e. The use of a printed pattern is a preferred method; however, other methods and means that allow for computer vision detection, such as the use of decals, or a 3D software representation (e.g., model) of the main body 10 or any component of the system or the system's physical form as a whole, are also contemplated. Exemplary methods of use of patterns on the main body 10 will be described below with reference to FIGS. 11b-11d.

Figure 12:
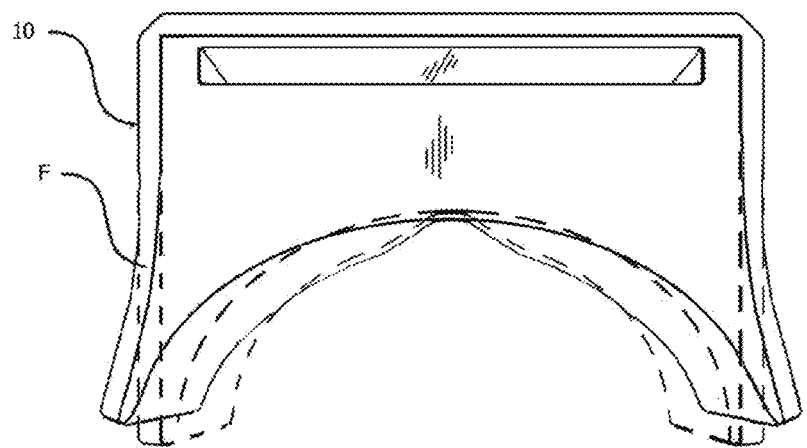
FIG. 12 illustrates functional application of foam material for a main body of the MHMD.

Preferably, the main body 10 may be entirely or primarily formed from a durable foam material. This material provides flexibility, especially to flex inward for smaller heads and spread apart for larger heads, as illustrated in FIG. 12, and may be light-weight compared to typical solid construction materials, e.g., plastics or metals. The material may allow for a snug fit for a large range of head sizes, providing a one-size-fits-all solution. In addition, the durable foam may also provide for comfort as it is worn by the user by allowing the main body 10 to adapt to the facial shape of the user and distribute pressure caused by the weight of the system. Further, the density of the material may allow for stability of the overall structure and the various components. That is, the foam unibody 10 has the ability to absorb impacts, torsional and compressive forces that might be harmful to something with a rigid structure. Indeed, the mass of the unibody 10 adds suitable rigidity. Also, the use of a foam material may allow for a simplified construction process (manufacture) as compared to constructions that use hard structural frames for support in addition to a soft material for comfort, e.g., a foam pad interposed between a hard structural frame and the user's face/head. The foam material can be formulated with antimicrobial chemicals, which may provide better hygiene than other materials. The use of closed cell foam or any foam with a (e.g., non-permeable) skin permits easy cleaning and thus provides additional hygienic benefits in comparison to other materials.

The use of foam material to construct the main body (and/or other portions of the apparatus) may allow one or more of the components described above to be omitted or replaced, where the foam material itself provides the functionality of the omitted components. Said another way, the foam construction may provide the functionality described above with respect to one or more of these components, and so the component as a separate piece of the apparatus may be omitted. Said in yet another way, the components and/or their functionality may be implemented by the foam material construction, e.g., of the main body, thus rendering the use of separate and distinct components for these functions unnecessary.

For example, the use of foam material allows for the omission or replacement of (separate) external frame 19 as described in FIG. 4b. That is, the foam material as part of the main body 10 is constructed to secure and position the mobile computing device 50 as described in FIG. 4b either with or without the internal frame.

As another example, the use of foam material allows for the omission or replacement of (separate) components 51a, 51b and 51c of the internal frame 51, as described in FIG. 4c. In other words, the foam material as part of the main body 10 may be constructed to secure and position the mobile computing device 50, as described in FIG. 4c.

As yet a further example, the use of foam material allows for the omission or replacement of (separate) components of the lens frame 28, as described in FIG. 10c. In other words, the foam material (as part of the main body 10) may be constructed in such a way as to provide the functionality of the components 28 and 28g described in FIG. 10c as features of the main body 10, i.e., providing equivalent functional capabilities to allow horizontal adjustments of the lens assembly horizontal adjustment pieces 25a and 25b and secure fit.

The main body 10 may have a unibody construction, i.e., the main body may be a single piece of foam material.

Note that other materials such as rubber, plastic, or combination of materials and structure such as an interior frame wrapped with less dense foam covered in a fabric mesh, may also be used as desired.

Exemplary Method of Use

The user 70 may run (execute) a system compatible application on the mobile computing device 50. In some embodiments, once the application has loaded and following any set-up steps required by the application, the user may insert the mobile computing device 50 into the slot 18 of the main body 10, or into the mobile computing device frame 19 and then into the slot 18 of the main body, or otherwise incorporate the mobile computing device into the system. The user may then affix the system to his/her head by positioning the main body 10 in front of their eyes, much like wearing a pair of goggles or glasses. The user may then position the strap 40 around their head so that the main body 10 is secured to the user's head. The user may now see the mobile computing device 50 (or more specifically, the screen thereof) through the lens assembly 20, where the lens assembly may allow each eye to see only a discrete (respective) portion of the mobile computing device screen 52, which allows for a 3D or stereoscopic viewing experience. Alternatively, the user may don the main body, then insert or attach the mobile computing device.

Depending on the application, the user may use the remote controller 30 to interact with the application via controller motion and/or button presses. The remote controller 30 may send information to the mobile computing device 50, which may expose (or communicate) the information to the (system compatible) application, where the information may be programmatically used to interact with the application. The types of applications envisioned include augmented reality, virtual reality, and 3D media type applications; however the use of the system for other types of applications is contemplated and expected, and dependent on the application.

For example, in one exemplary case of a virtual reality application, the user may be (virtually) placed in a virtual environment where the application may display a stereoscopic image of the virtual environment onto the mobile computing device screen 52. In the case where the mobile computing device contains motion sensors, the movement of the device may be interpreted in the virtual world as controlling a virtual camera mimicking or tracking the motion of the user's head. This may allow the user to see into the virtual world and look around as if the user were actually there.

In cases of computer vision applications, the device camera 54 may be used to identify fiducial markers. For example, the application running on the device may utilize computer vision to "see" (and recognize) a fiducial marker of or on a viewed item in the camera video feed. Once a fiducial marker is detected, a virtual object may be displayed on top of (or overlaid on) the stereoscopic video, to the effect that the virtual object is presented in the real world at scale, rotation, and position, relative to the user. The user may then interact with the object with the remote controller 30 or through movement.

The user may fit the remote controller 30 with a fiducial marker 60 to allow detection of the remote controller in the camera field of view (FOV). FIG. 9b shows an exemplary attachment of a virtual object VR4, in this case a hammer, to the remote controller 30, where the virtual object appears in the rendered 3D scene (but isn't actually present in the real world).

Figure 11B:
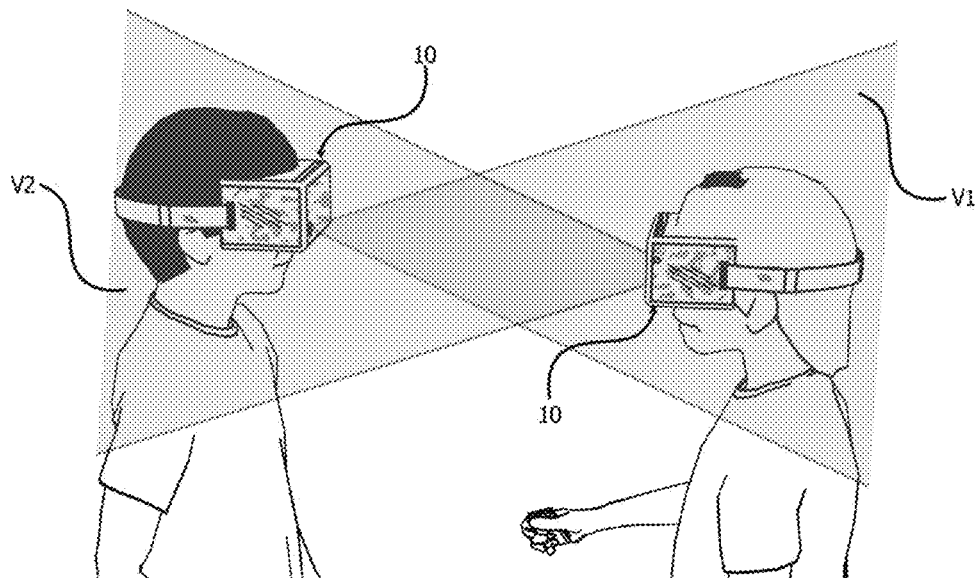
FIG. 11b illustrates using computer vision to detect the MHMD and display virtual information, in this case an avatar.
Figure 11C:
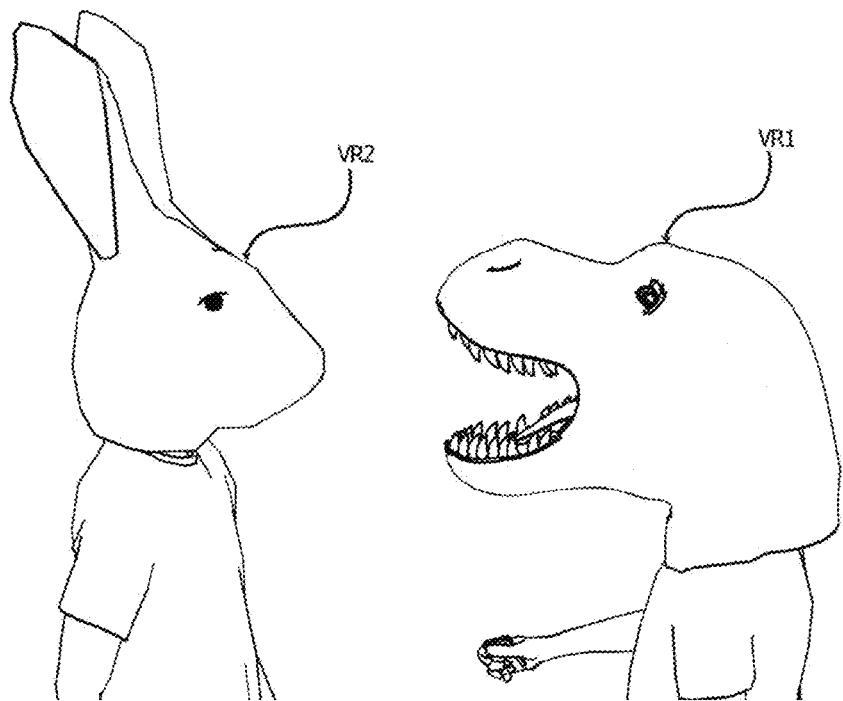
FIG. 11c illustrates placement of virtual objects based on detection of the MHMD.
Figure 11D:
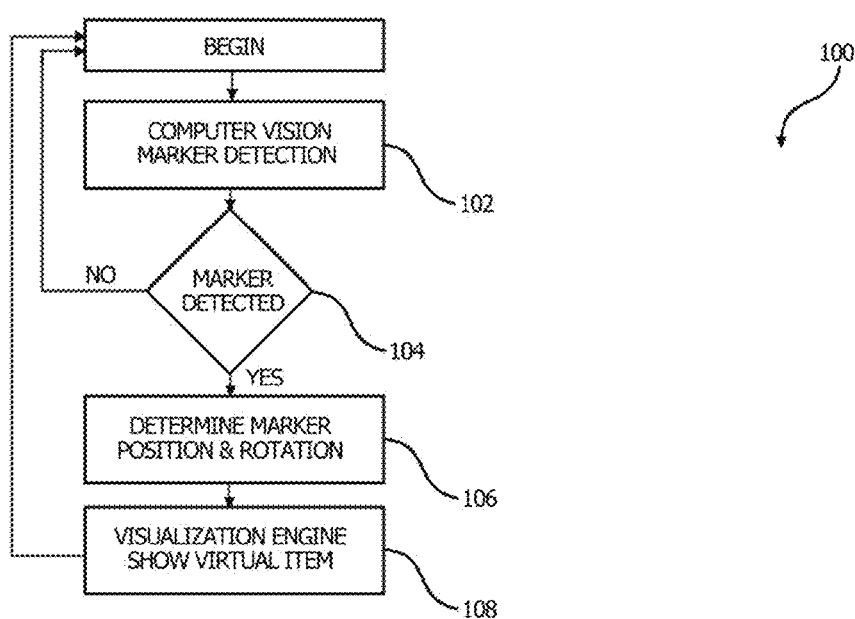
FIG. 11d is a flow diagram describing detection of a marker and placement of a virtual object.

The main body 10 may be used as, or configured with, a fiducial marker. FIG. 11a illustrates an embodiment in which the sides of the main body 10 are designed or provided with individual textures 19a-19e that may act or function as a cubical marker allowing the main body to be detected from multiple angles. As indicated in FIG. 11b, when users view instances of the MHMD via respective views V1 and V2, e.g., from a separate device capable of detecting the textures, the main body textures may be used to place virtual objects on or near the main MHMD (instance) in virtual or augmented space, as illustrated in FIG. 11c by respective views VR1 and VR2. More particularly, virtual dinosaur (VR1) and rabbit (VR2) masks are generated by the processor within the mobile computing device 50 in one MHMD and placed over the other MHMD as a presumed object. The ability to track the exterior surfaces of the respective bodies 10 enables each MHMD to move the respective masks in the same manner that the corresponding person moves their head. In one method, summarized in the flowchart of FIG. 11d, a computer attempts to visually detect a marker in step 102. If a marker is detected in step 104, its position and rotation are determined in step 106. Finally, a visualization engine is used to show the virtual item in step 108.

Figure 14A:
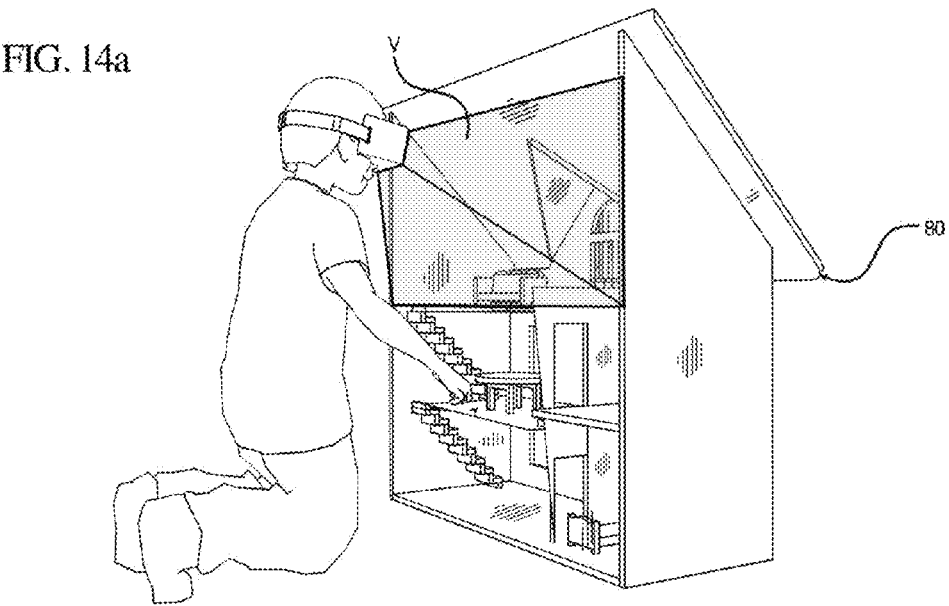
FIG. 14a illustrates computer vision detection of a known object using the MHMD.
Figure 14B:
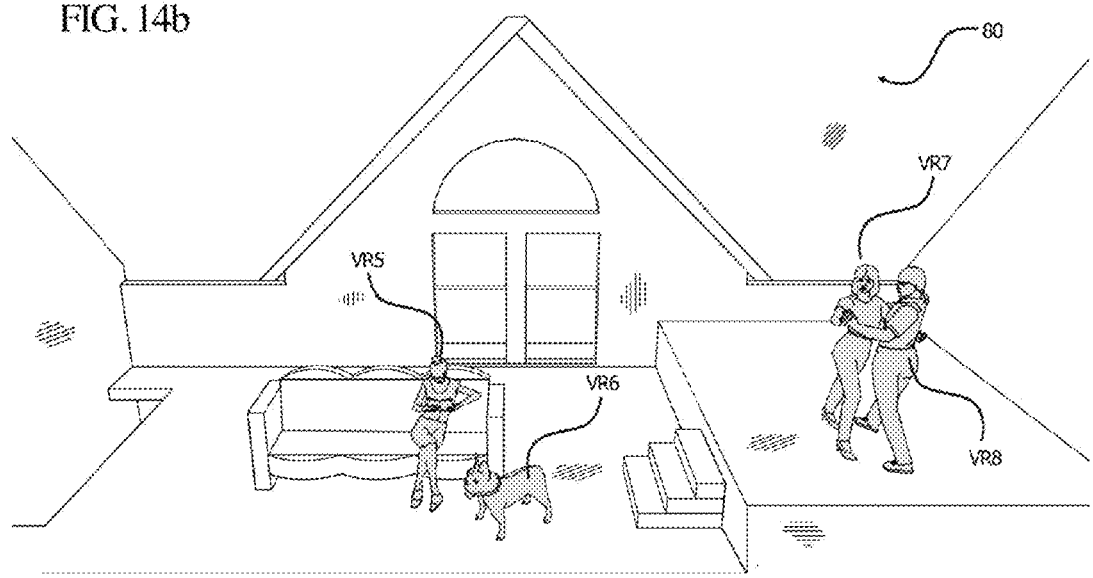
FIG. 14b is a first person view illustrating virtual objects being placed in relation to a known object.

In some embodiments, toys or other physical objects may be used as markers. FIG. 14a shows the user looking at a physical object 80, in this case a dollhouse. In one exemplary embodiment, the computer vision algorithms running in the application may be pre-programmed with the physical object 80 shape, and virtual objects VR5-VR8 may then be positioned and interact with a 3D representation of the object, as indicated in FIG. 14b. These virtual objects VR5-VR8 can be placed accurately into the device video feed, merging the virtual and physical spaces known as augmented reality, as illustrated in FIG. 14b. The user may then use the various features of the system to interact with the augmented reality experience. Furthermore, given the pliable nature of the foam material as well as its durability and ability to protect the mobile computing device, the headset is well-suited to be used in a play environment along with other toy items, even those that might be accidentally collide with the goggles. This is a distinct advantage over prior MHMD goggles for more active users since the rigid plastic cases may break or not provide adequate cushioning for the user's head.

Figure 14C:
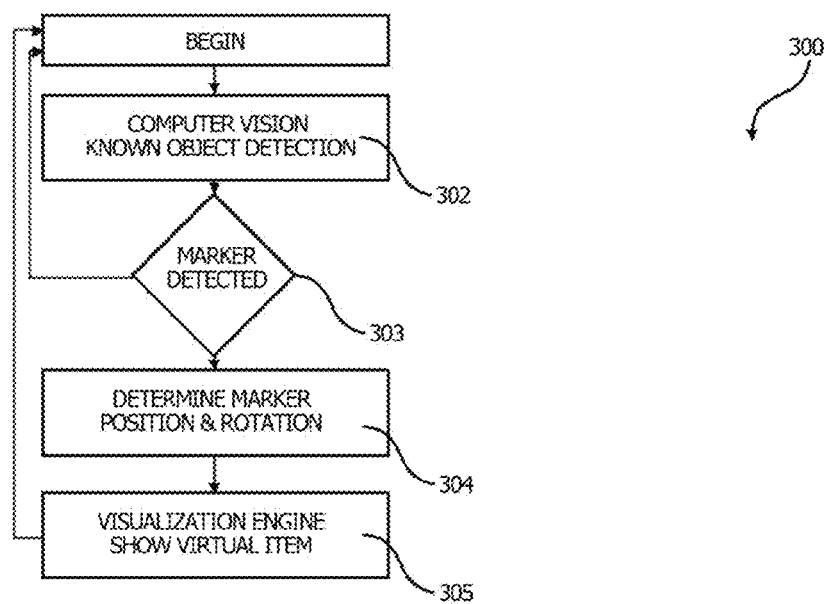
FIG. 14c is a flow diagram of a method for detection of a physical object and placement of a virtual object.

FIG. 14c is a flow diagram of an exemplary method 300 for detection of a physical object and placement of a virtual object, according to one embodiment. As FIG. 14c shows, once the method begins, and a known object is detected in step 302 via computer vision (by the application running on the mobile computing system), if a (fiducial) marker is detected in step 303, the method may determine the marker's position and rotation (orientation) in step 304, and in step 305 a corresponding virtual item may be displayed or shown by a virtualization engine, e.g., of the application.

Computer vision algorithms running on or in the application may make use of point clouds or natural features detection to determine the position, location, and/or size of objects in the physical world, and the user may move or position themselves relative to these objects.

Figure 15A:
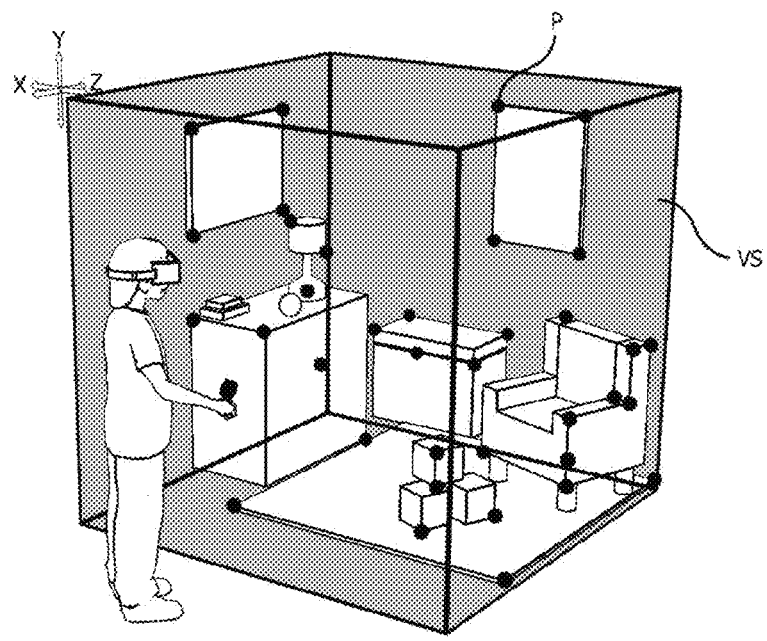
FIG. 15a is a perspective view illustrating use of point clouds to determine user perspective and scale of physical environments.
Figure 15B:
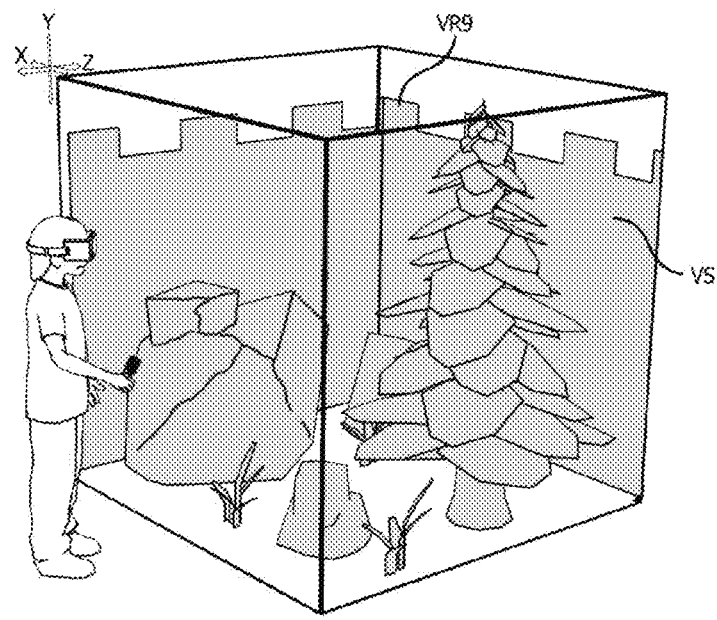
FIG. 15b is a perspective view illustrating a virtual environment placed onto a physical environment based on point cloud data.
Figure 15C:
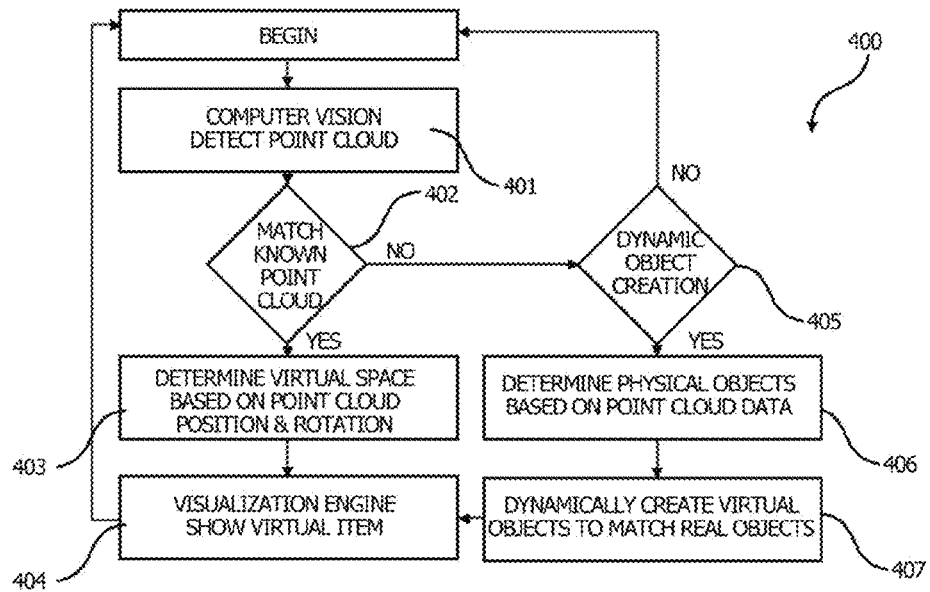
FIG. 15c is a flow diagram of a method for using point cloud data to display a virtual environment.

FIGS. 15a-15c are directed to use of point clouds. More specifically, FIG. 15a is a perspective view illustrating use of point clouds to determine user perspective and scale of physical environments, according to one embodiment. FIG. 15a shows exemplary point cloud data P being captured from the mobile computing device camera, and the resulting or corresponding 3D space. If the point cloud data P matches a previous point cloud data the application may display predetermined virtual content.

FIG. 15b is a perspective view illustrating a virtual environment placed onto a physical environment based on point cloud data, according to one embodiment. As may be seen, FIG. 15b shows a virtual world or environment VR9 that fits on top of (or is overlaid on) real world objects. This may allow the user to move around the space in a virtual world where, by avoiding objects in the virtual world, the user also avoids objects in the physical world. In some embodiments, the system may allow dynamic generation of virtual content based on the point cloud data or natural features detection. For example, the application may include dynamic scene generating algorithms that use the point cloud data or natural features detection algorithms to determine the physical space and using the computed space to place virtual objects that overlay onto the physical world. One exemplary process for doing so is outlined in FIG. 15c.

FIG. 15c is a flow diagram of a method for using point cloud data to display a virtual environment, according to one embodiment. As shown, in one embodiment, in step 401 a point cloud may be detected via computer vision. In step 402, if the point cloud is identified, i.e., is a known point cloud, a virtual space may be determined based on the point cloud position and rotation (or orientation), as indicated in step 403, and a virtualization engine (e.g., included in the application) may show a virtual item accordingly, as indicated in step 404.

If, on the other hand, the point cloud is not known (in step 402), then as indicated in step 405, if dynamic object creation is not implemented or enabled, the method may return to the beginning, as shown. Alternatively, if dynamic object creation is implemented or enabled, then in step 406 corresponding physical objects may be determined, and virtual objects matching the real (physical) objects may be dynamically generated, as indicated in step 407.

Figure 16C:
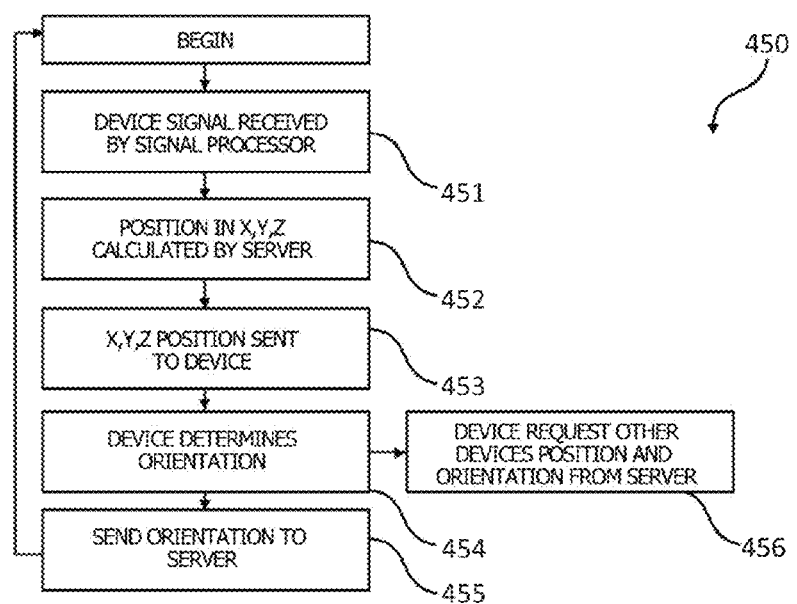
FIG. 16c is a flow diagram of a method for interaction between mobile computing devices and a signal processing server.
Figure 16A:
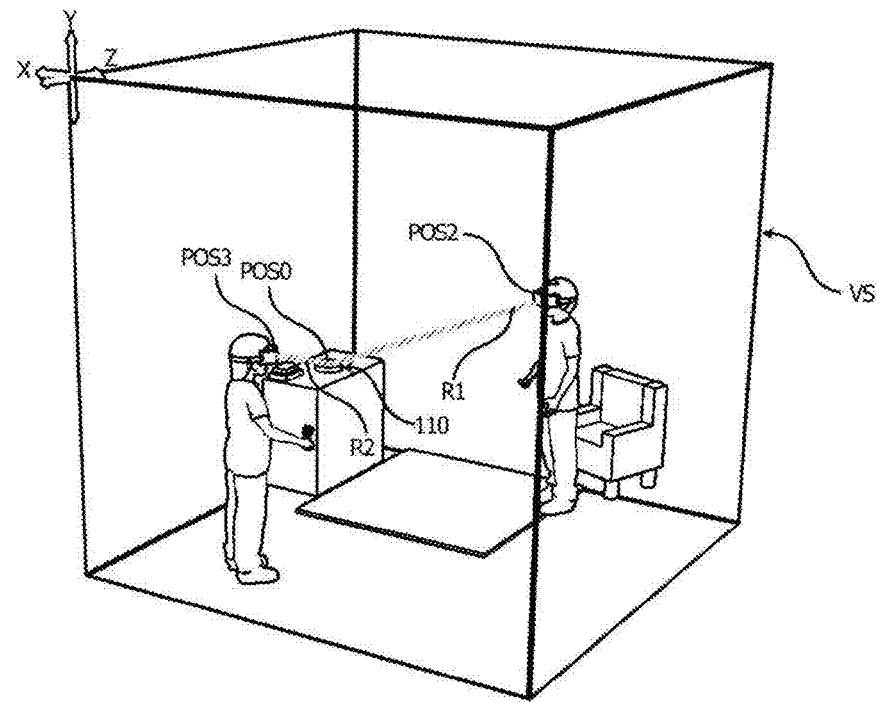
FIG. 16a is a perspective view illustrating interaction between mobile computing devices and a signal processing server.
Figure 16B:
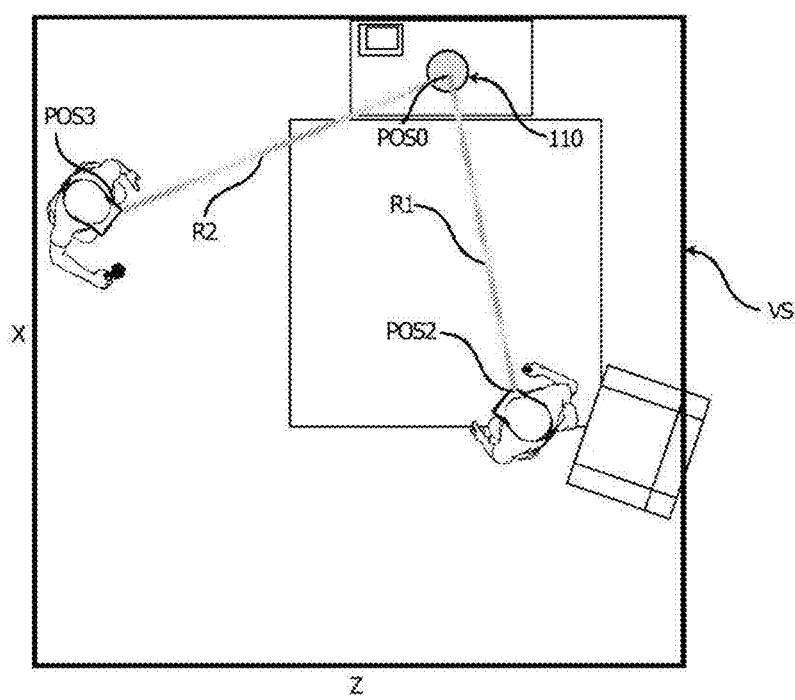
FIG. 16b is a top view illustrating interaction between mobile computing devices and a signal processing server.

Radio signals may be used for relative or absolute positioning among MHMDs. FIGS. 16a-16c are directed to the use of a signal processing server that may be used to implement this functionality. FIG. 16a is a perspective view illustrating interaction between mobile computing devices and a signal processing server 110, and FIG. 16b is a top view illustrating interaction between the mobile computing devices and signal processing server 110. The use of a signal processing server 110 as shown in FIG. 16a and FIG. 16b may allow positional tracking of multiple users, labeled POS0, POS1, and POS3 in the Figures. The mobile computing device may add orientation data to the position data to get an accurate location, orientation, and movement of the user or multiple users in virtual space (VS) and in real world space. If the location of the signal processing server 110 has a known position in 3D space the user's position may be determined, and a virtual world or virtual object may be placed accurately with respect to the user. If the position of the signal processing server is not known, the position of the user may be known (or determined) relative to the signal processing server and to other users, but possibly not in the real world space. In some embodiments, the mobile computing device may operate as a signal processing server, or multiple devices may be used to determine relative or absolute positioning. The locations of multiple users and the signal processing server 110 may be shared in a multiplayer experience allowing movement, interaction, and manipulation of the virtual space together. It is contemplated that any use of positional data used by the system may also be used in a multiple user scenario where location data of environmental feature locations and/or user positional and orientation data may be shared via a network. The result provides, by way of using additional sensors and systems, a more robust global spatial awareness that can be shared among the individual users.

FIG. 16c is a flow diagram 450 of a method for interaction between mobile computing devices and a signal processing server to determine relative position and orientation. As FIG. 16c shows, in one embodiment, in step 451, a device signal may be received by a signal processor. In step 452, a position may be calculated, e.g., in x, y, z, space/coordinates, and in step 453, the position may be sent to the device, which may determine an orientation, as indicated in step 454, and may send the orientation to a server, as per step 455. Additionally, after the orientation is determined in step 454, the device may request one or more other devices' positions and orientations from the server, as indicated in step 456.

In the use case of viewing 3D media, the user may load media content or an application that displays the media in a side by side format (e.g., in a stereoscopic format). The user may then view the media through the lens assembly 20 and may optionally use headphones 80, thus creating a 3D media experience.

Additionally, many more experiences are contemplated that do not fall under one of the above categories. The use of the mobile computing device 50 features not mentioned herein and many features that may be available in future mobile computing devices may enable developers to create applications and experiences for the system that are not listed above.

Note that the remote controller 30 illustrated in FIG. 7a is but one embodiment, and numerous other configurations of the remote controller are contemplated that may include and utilize additional buttons and triggers and additional re-attachment methods, as indicated in FIG. 7b and FIG. 8b. Note, for example, that while in FIGS. 1, 2, and 3a, the remote controller is attached to the MHMD or the remote controller may be held in the user's hand.

Figure 13A:
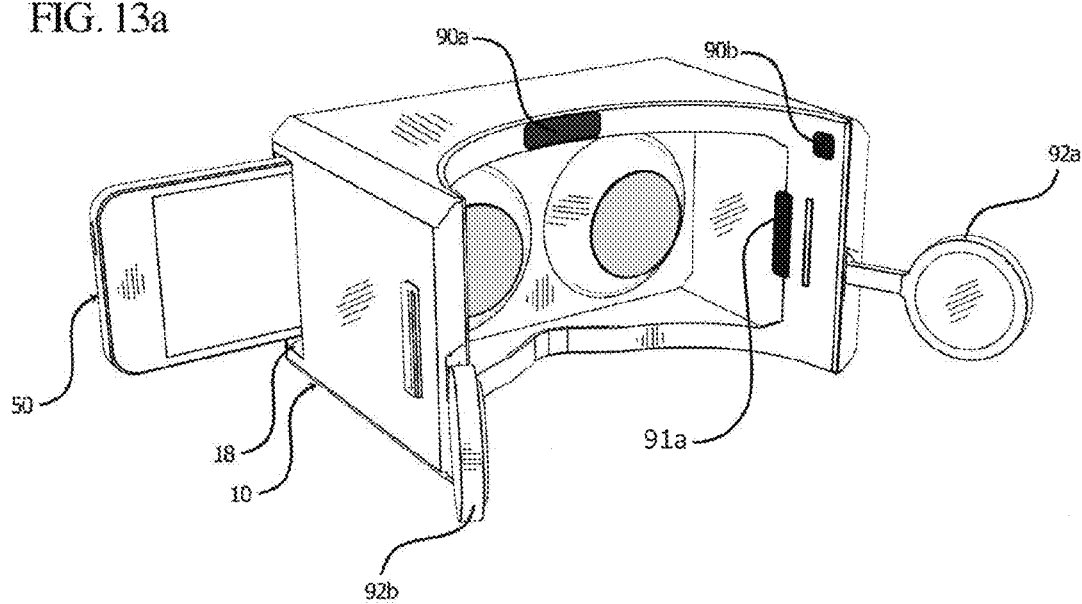
FIG. 13a illustrates an embodiment of the MHMD that includes additional electronic components as well as a side slot for inserting a mobile computing device.
Figure 13B:
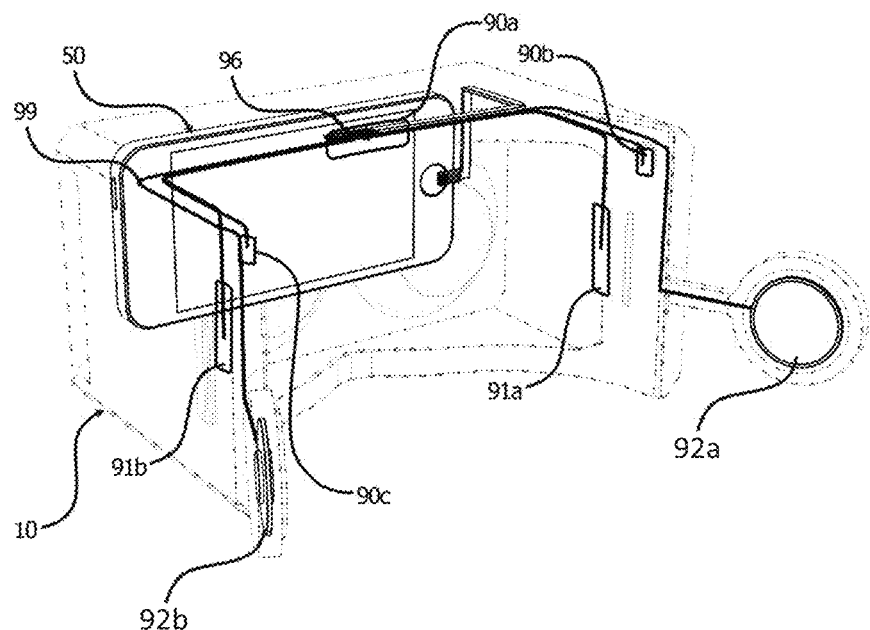
FIG. 13b illustrates exemplary electrical components of an alternate embodiment of the MHMD with the main body in phantom.

FIG. 13a and FIG. 13b show an alternative example of the main body integrated with electronic components. In this example, the components illustrated are heart rate monitors 91a and 91b, EEG sensors 90a, 90b, and 90c, stereo speakers 92a and 92b, and a circuit board with microcontrollers 96 and wiring 99. The mobile computing device 50 may be used to interface with the various components via a devices data input, audio port, or wireless communication, as desired. The electronic components may receive power from a battery (not shown) integrated into the main body 10, or by using power from the mobile computing device 10.

As an alternative, FIG. 13a shows an alternative in which the mobile computing device 50 is inserted into slot 18 on the side of the main body 10. Other ways of inserting or attaching the mobile computing device 50 to or in the main body may include separate pieces of construction of the main body that allow for mobile computing devices with a range of sizes and form factors to be inserted and secured into the main body. And as described previously, FIGS. 4b and 4c illustrate the use of frames 19 and 51 to secure the mobile computing device 50 for inserting into a slot 18 of the main body 10.

FIGS. 17A and 17B show another example of a mobile head mounted display (MHMD) goggles 500 from the front and rear. As described above, the goggles 500 comprise a soft main body 502 having a generally rectangular prism shape on its front side and a concave face-contacting lip 504 on its rear side. A pair of adjustable lens assemblies 506a, 506b each having a lens 507 are mounted within a hollow interior cavity 508 of the goggles 500. An elongated vertical pocket 510 opens upward in the body 502 to permit introduction and retention of a mobile computing device (not shown) into the cavity 508. The pocket is shown as enclosed on all sides but one, but may be open from the bottom, from the back, from the face the side or other locations. Various openings, both for insertion of and for securely holding a smartphone in the pocket are envisioned. As will be described, the display screen of the mobile computing device faces to the rear, directly in front of the lens assemblies 506a, 506b. One or more remote controls 512 may be removably secured to the main body 502 for use in conjunction with the mobile computing device. Further details on the advantages of these remote controls 512 will be explained below.

As mentioned above, the type of mobile computing device may vary depending on the size of the vertical pocket 510. For example, pocket 510 may accommodate modern smartphones or maybe larger to accommodate tablet computers. The term "smartphone" will be used hereafter in place of "mobile computing device."

Figure 19:
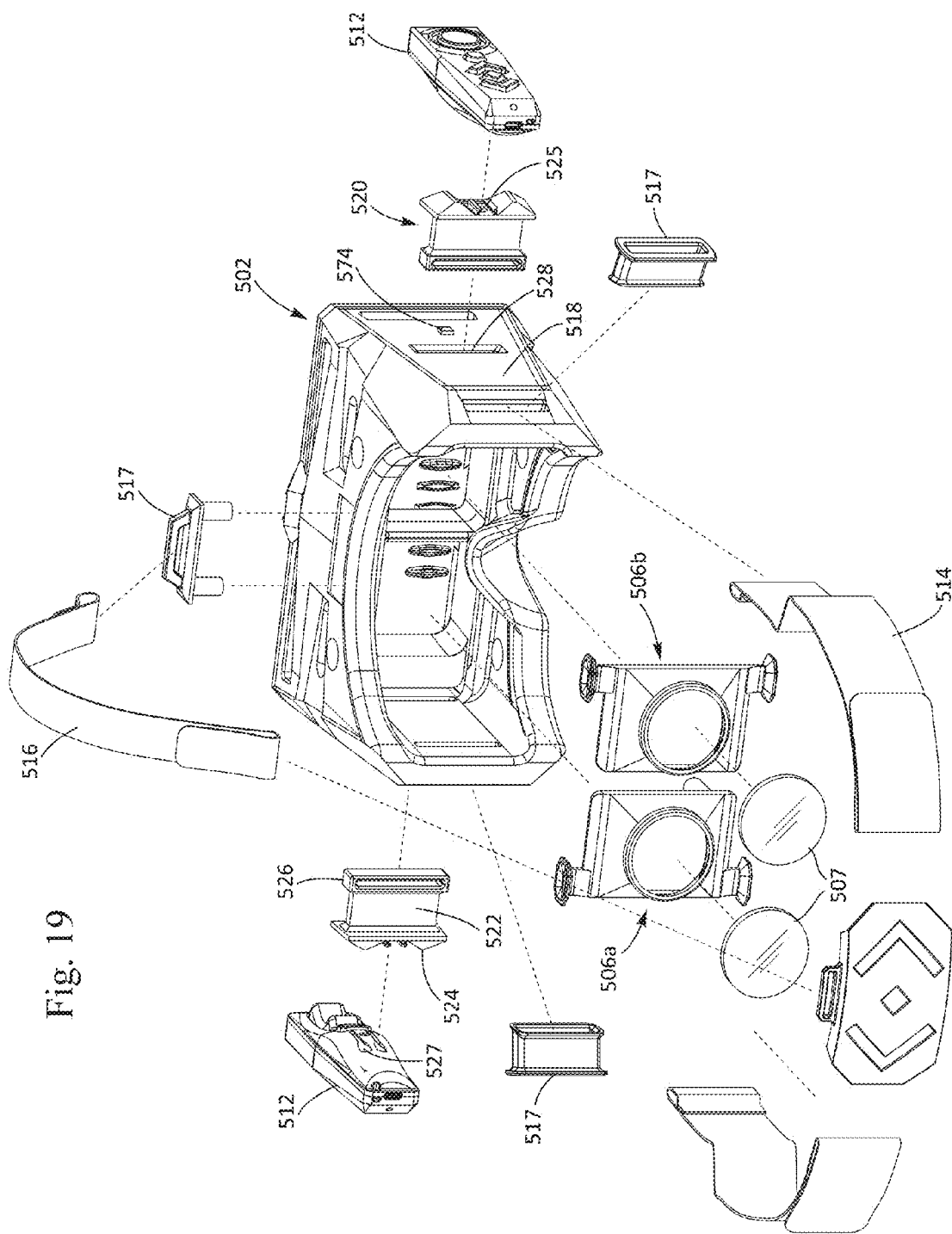
FIG. 19 is a perspective exploded view of the MHMD goggles of FIGS. 17A and 17B.

As described previously, the goggles 500 are preferably retained on a person's head using retention straps. For example, a rear strap 514 extends around the backside of a wearer's head, as seen in FIGS. 18A and 18B. An overhead strap 516 also may be provided to help prevent the goggles 500 from slipping down the user's face. Each of the straps 514, 516 are secured to grommets or reinforced inserts 517 that closely fit within channels on the sides and top of the main body 502, and are preferably adjustable for different sizes of heads. FIG. 19 shows an upper grommet 517 and two side grommets 517 exploded from the main body 502, each of which may be secured to the main body via adhesive or a simple interference fit. The grommets 517 are formed of a more rigid material than the body 502 to withstand the greater tensile forces applied thereto.

FIG. 18A shows a person wearing the MHMD goggles 500 in a first mode of operation wherein the remote controls 512 are docked on the sides of the main body 502. In this mode, the user can still manipulate control buttons on the outer face of the remote controls 512 while viewing content displayed on the smartphone.

In a second mode of operation, seen in FIG. 18B, the user has removed one of the remote controls 512 and is holding it in his or her hand. One or both of the remote controls 512 can be "undocked" in this manner and used in various contexts, as has been explained above and will be described further below.

With reference back to the perspective views of FIGS. 17A and 17B, and also the exploded view of FIG. 19, the remote controls 512 desirably attached to side walls 518 of the main body 502 using docking clips 520. In FIG. 19, the two remote controls 512 are shown exploded to either side of the main body 502 along with the docking clips 520. Each of the docking clips 520 has a central neck portion 522 in between an outer clip portion 524 and an inner anchor portion 526, both of which are enlarged with respect to the neck portion.

Because of the softness and pliability of the material of the main body 502, the inner anchor portions 526 of each of the docking clips 520 can be pushed through vertical slots 528 formed in the side walls 518 until the anchor portions are past the slots and within the interior cavity 508 of the main body 502. That is, the narrow neck portion 522 has a horizontal length that is substantially the same as the thickness of the side walls 518 such that the clips 520 are held firmly with respect to the main body 502. This is seen best in the horizontal section view of FIG. 21B. Although not shown in great detail, the outer clip portion 524 include attachment structure 525 that mates with corresponding attachment structure 527 provided on the bottom faces of the remote controls 512 (see also FIG. 26B). The mating attachment structures permit easy docking and undocking of the remote controls 512. For example, the attachment structure 525 on the clips 520 may be T-shaped so as to slide into and be captured by slots 527 that include a large entry opening and smaller retention segment. In this way the controllers 512 are simply slid on and off of the sides of the goggles 500, and held by friction.

The docking clips 520 may be clips of another form entirely or may use other attachment structures. For example, in place of the docking clips 520 Velcro®, adhesive pads, locking mechanisms, latches, grommets, magnets and other, similar, attachment structures may be used. The use of docking clips 520 is only the preferred option. Still further, a concave depression shaped like the back face of the remote control 512 may be formed in one or both side walls 518 of the main body so as to closely receive the remote and reduce its outward profile extending outside of the soft body. This latter solution helps reduce movement of the remote control 512 relative to the main body, thus reducing the chance of detachment from head movement.

FIG. 17B illustrates a generally flat vertical front wall 530 of the main body 502 having a window 532 on its right side (the directions left and right being as perceived by a wearer of the goggles 500). As mentioned, a smartphone may be inserted into the vertical pocket 510 so that its display screen is visible in the interior of the goggles 500. Many such devices have rear facing camera lenses, and thus the window 532 provides an opening for these lenses. Accordingly, a wearer of the goggles 500 can initiate real-time video through the smartphone to be seen on the internal display, for use in an augmented reality (AR) program, for example.

FIGS. 20A-20L are various orthogonal and sectional views of a soft main body 502 of the MHMD goggles 500. The main body 502 has a shape and is made of a soft material so as to result in a number of distinct advantages over prior MHMD goggles. Primarily, the main body 502 is made of a soft foam which will flex to fit different shapes and sizes of face, making it easier to fit universally, and more comfortable in the process. The softness of the main body 502 an "approachable" aesthetic, which is important to inducing people to put such an HMD on their face in the first place. Indeed, the soft foam permits the entire main body 502 to be compressed down to a very small profile. The use of these goggles 500 in environments such as public arcades and other places where the goggles may be loaned or rented out means that their ergonomic qualities are magnified. That is, if the general public perceives the goggles as comfortable and easy to move around in, they are more likely to pay a return visit and share their experience with others. Moreover, by inserting one's smartphone into the vertical retention pocket 510 is surrounded by a soft, cushion-like material of the main body 502 which provides significant shock-absorbing protection if the goggles are dropped, for example.

In this regard, the soft main body 502 is a comfortable "face feel" making it more tolerable to wear the goggles 500 for a longer period of time and enabling the entire main body 502 to conform around a wearer's face. Furthermore, a preferred foam material makes the main body 502 extremely light weight, and the weight of the other components such as the lens assemblies 506 and remotes 512 are kept down so that the goggles 500 are easy to wear for long periods of time. Preferably, the goggles 500 have a maximum weight of about 150-230 gf with the head strap and lenses (but without the remotes 512), though certain foam formulations may reduce that further.

The material of the soft main body 502 is preferably a soft flexible foam, more preferably a closed-cell foam or a so-called "Integral Skin" foam. The formulation of the foam material may vary, and includes Ethylene-vinyl acetate (EVA), Polyurethane (PU), and HE foam. Each of these alone or in various combinations may be utilized. It should be understood, however, that any material that can be molded into the shape of the main body 502 may be used, and though foam is preferred it is not the exclusive option. The main preference is the ability to mold the material into shape such that when it is molding is complete, the material is soft, impermeable, and compressible. In addition, the material may be soft to the touch, and because the entire main body 502 is formed of the material, the entire main body 502 is soft to the touch. The material may have a relatively high tensile strength to resist wear and tearing. Some prior head mounted goggles utilize separate pieces of injection-molded plastic coupled together which are brittle and, as a result, tend to break at the seams/junctions.

In a preferred embodiment, the entire main body 502 is formed of a single, homogeneous unitary foam member which may be injection molded, pour molded, or cold-form molded. The advantages of having a single unitary foam member include low manufacturing cost because there is only a single mold and no assembly of components required, and structural integrity because there is less opportunity for breakage at joints or seems between multiple different parts. The molded foam manufacturing technique accommodates complex internal shapes (e.g., slots for lens assemblies, nose bridge), and permits the inclusion of ancillary parts such as the strap anchors, either by being molded into the goggles or with the provision of shaped recesses and the like. Molding permits the interior walls to provide an appealing "face feel" and any desired texturing (to aid in grip of the face as well as comfort). The use of a foam "hunibody" also allows for distinct outer shapes to be easily produced without affecting the mechanical functionality of the main body 502, thus allowing custom physical designs of the goggles that have a distinct look and feel to be easily manufactured. Finally, multiple colors and designs may easily be incorporated into the foam, including branding or advertising on any of the generally flat outer surfaces of the main body 502.

Alternatively, the main body 502 may be formed of an inner structural "skeleton" of sorts covered by a molded soft foam. In this embodiment, an internal portion or skeleton of the main body 502 is first molded with a higher density foam, or other plastic, and then the various internal and external contours of the main body 502 are formed by molding the softer foam around the skeleton. Although there are essentially two components of this type of body 502, because they are molded together into one piece they may also be referred to as a unitary foam member. In other words, once molded there is no need for attaching pieces together to form the body 502. Still further, the aforementioned internal frames 50, 51 or other internal components may be formed by inserts of material that is less compressible than the softer foam. For instance, inserts or frames may be combined with a soft foam body to define the retention pocket 510 or channels within which the lens assemblies 506 slide.

Furthermore, the use of a closed-cell or other water-resistant foam promotes hygiene and permits the main body 502 to be easily cleaned. That is, ancillary components such as the lens assemblies 506 and the remote controls 512 may be removed and a water-resistant foam body 502 may be wiped down or even immersed in water for cleaning. Foam types that are water-resistant, at least more so than open cell foams, include closed cell foams and Integral Skin foams. The latter includes an outer substantially non-porous skin formed during the mold process against the mold surface. Other materials that have been used are incapable of being easily disassembled or tend to absorb contaminants, whereas the closed-cell foam provides an exterior barrier to such contamination. In a further embodiment, the material may be seeded or coated with an antimicrobial chemical to kill bacteria.

With reference to FIGS. 20A-20E, the various contours of the main body 502 are illustrated in greater detail. As mentioned, the front portion of the main body 502 has a generally rectangular or box shape, while the rear portion has a contoured lip 504 which fits the user's face. The side walls 518 may be generally perpendicular to the front face 530, or they be slightly tapered inward in a rearward direction. The side walls 518 terminate at a pair of temple contact members 534 whose rear edges form a part of the contoured lip 504. The lip 504 further includes an upper edge 536 for contacting the forehead of the user, a lower edge 538 that contacts the user's cheeks, and a nose bridge 540. The contoured lip 504 resembles the same features as on an underwater scuba mask, and in contacting and conforming to the face of the wearer prevents light from entering the interior cavity 508 from the rear. As was mentioned above with respect to FIG. 12, the temple contact members 534 flex in and out to fit various sized heads by virtue of the soft foam material. The rear straps 514 (FIG. 17B) preferably attach to anchor pins 542 recessed on the outside of the side walls 518, just in front of the temple contact members 534. In this way, the straps 514 can easily pull the side walls inward into contact with a smaller head. The combination of shape and material conform well to a very wide array of facial dimensions and the relatively large interior cavity 508 and ability to flex accommodates people wearing glasses. Alternatively, indents on the inner walls may be molded in to provide reliefs for eyeglass stems. The foam material absorbs movement and vibration and tends to provide a secure "anchoring" effect to keep the goggles 500 in place during head movements.

Now with reference to FIGS. 20E and 20F, advantageous retention and positioning features within the vertical pocket 510 will be described. Angled lines 20E-20F shown in FIG. 20E extend across the pocket 510 looking forward so that the features on the inside of the front wall 530 are shown in FIG. 20F. In particular, the soft foam of the main body 502 is molded to induce automatic or passive leveling and centering of the smartphone as it is being inserted into the pocket 510, regardless of size. The width of the pocket 510 may vary depending on the type and size of mobile computing device for which the goggles 500 are designed, though, as mentioned, to keep the overall size of the goggles down they are typically meant to hold and retain a smartphone. The average screen size for smartphones in 2015 is about 5 inches (12.7 cm), meaning an overall length of phone of just under 5 inches. For instance, the iPhone 6 has a screen size of 4.7 inches (11.9 cm), while the iPhone 6 Plus has a screen size of 5.5 inches (14.0 cm), and the trend is for even larger phones. An exemplary width of the vertical pocket 510 is about 5.7 inches (14.5 cm), although as mentioned above larger goggles to accommodate larger smartphones or even tablets are contemplated. Another advantage of the foam material is that the pocket 510 may stretch to accommodate phones that are slightly larger than the pocket for which the phone is originally designed.

The rear face of the front wall 530 is generally flat and vertical, but includes a pair of relatively large ramped protrusions 544 projecting rearward from into the pocket 510. These protrusions 544 are located toward the top of the pocket 510 and are largest on their outer extents so as to contact and force both ends of the smartphone inward. That is, if the device is inserted off-center, the protrusions 544 tend to center the device. Furthermore, a plurality of smaller friction bumpers or nubs 546 also project rearward from the front wall 530 into the pocket 510. These nubs 546 are generally evenly distributed in two rows at the top and the bottom of the slot, as seen in FIG. 20F, so as to apply symmetric compression forces against the smartphone and hold it in an orientation which is perpendicular to a front-rear horizontal axis through the body 502.

Figure 20A:
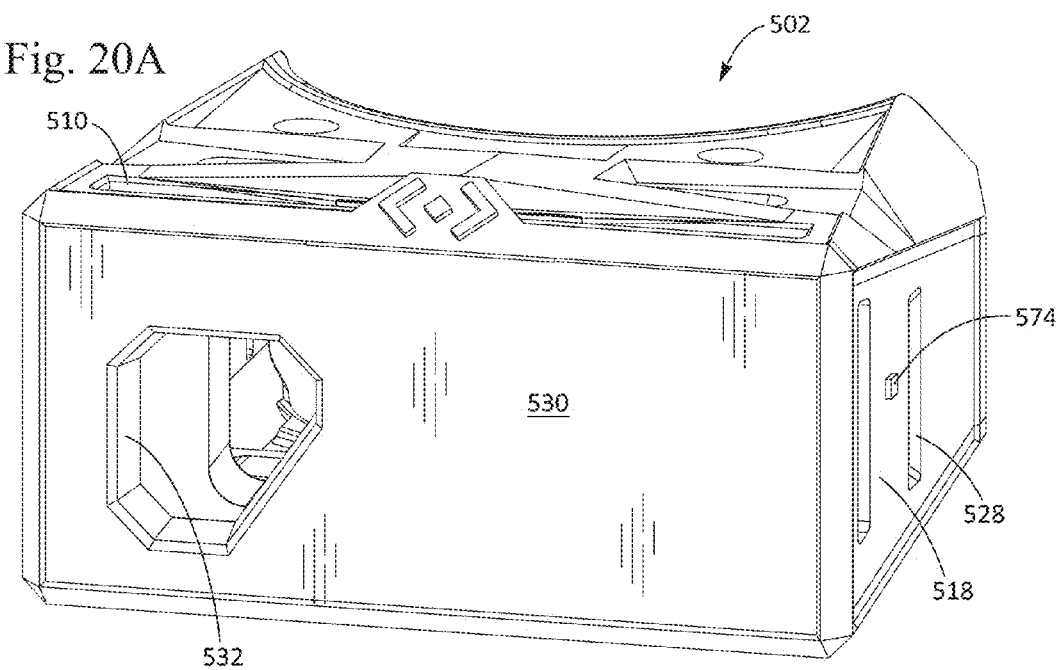
FIGS. 20A-20L are various orthogonal and sectional views of a soft main body of the MHMD goggles of FIGS. 17A and 17B, namely.
Figure 20B:
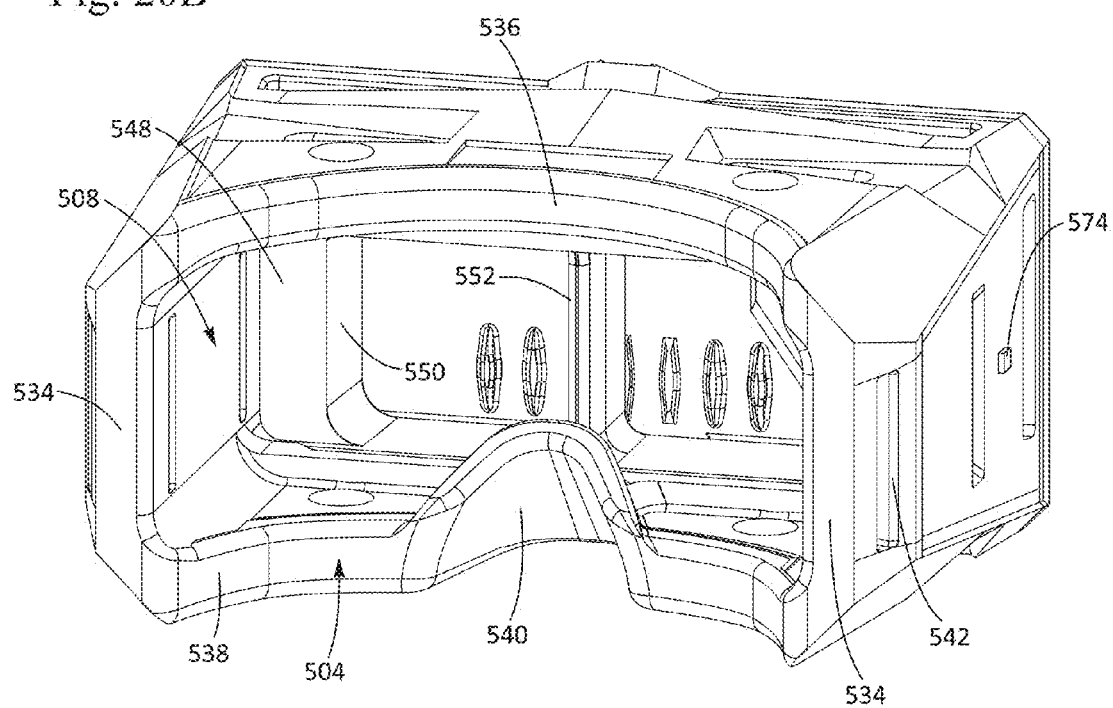
Figure 20C:
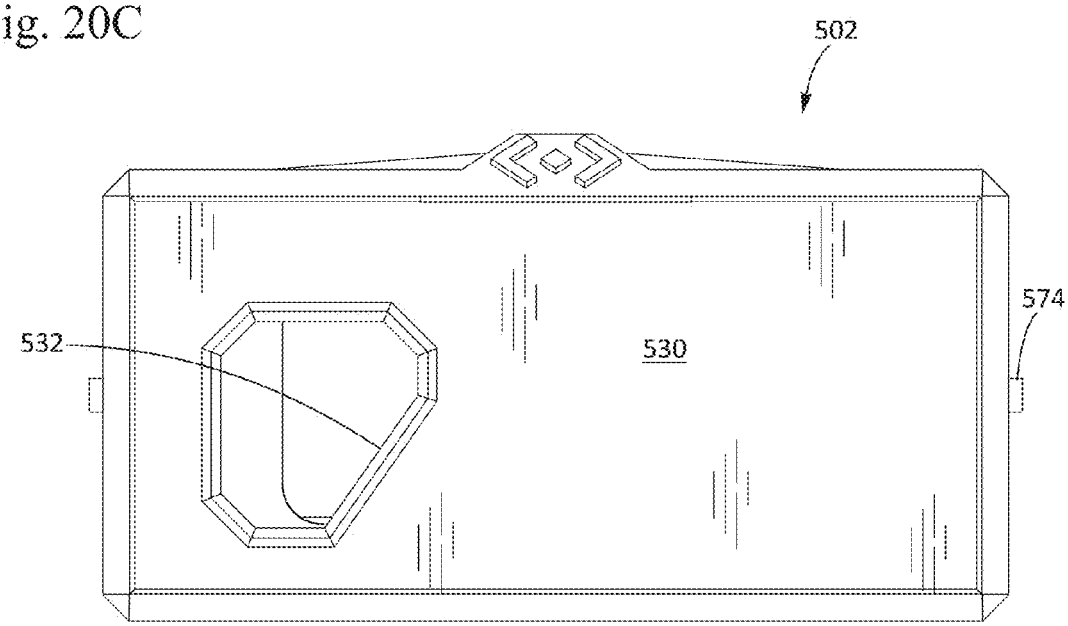
Figure 20D:
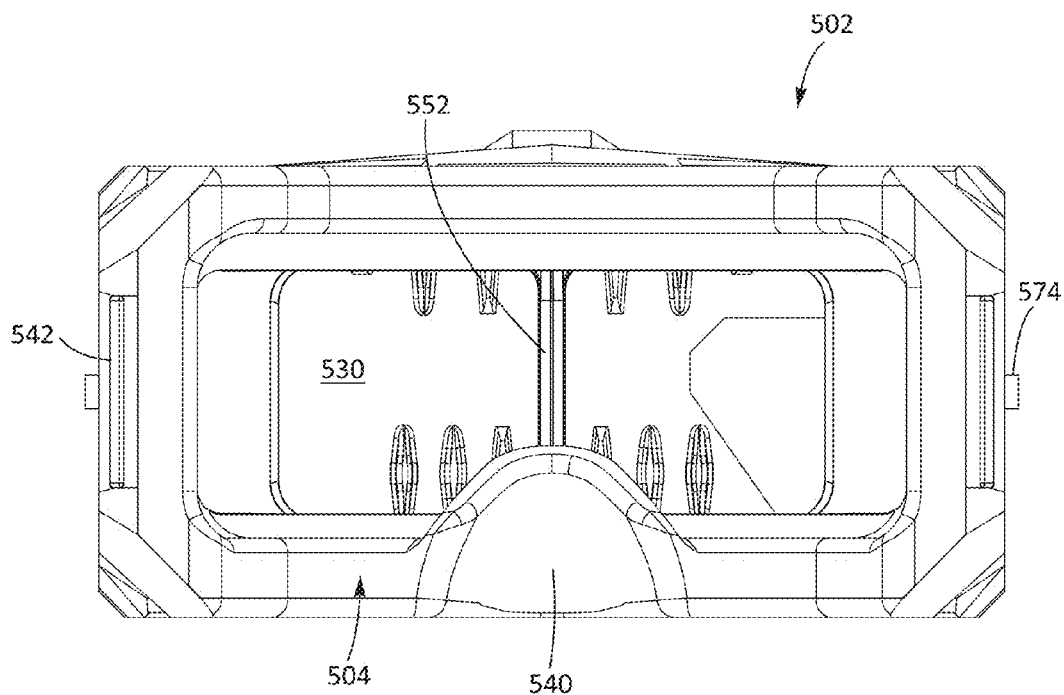
Figure 20E:
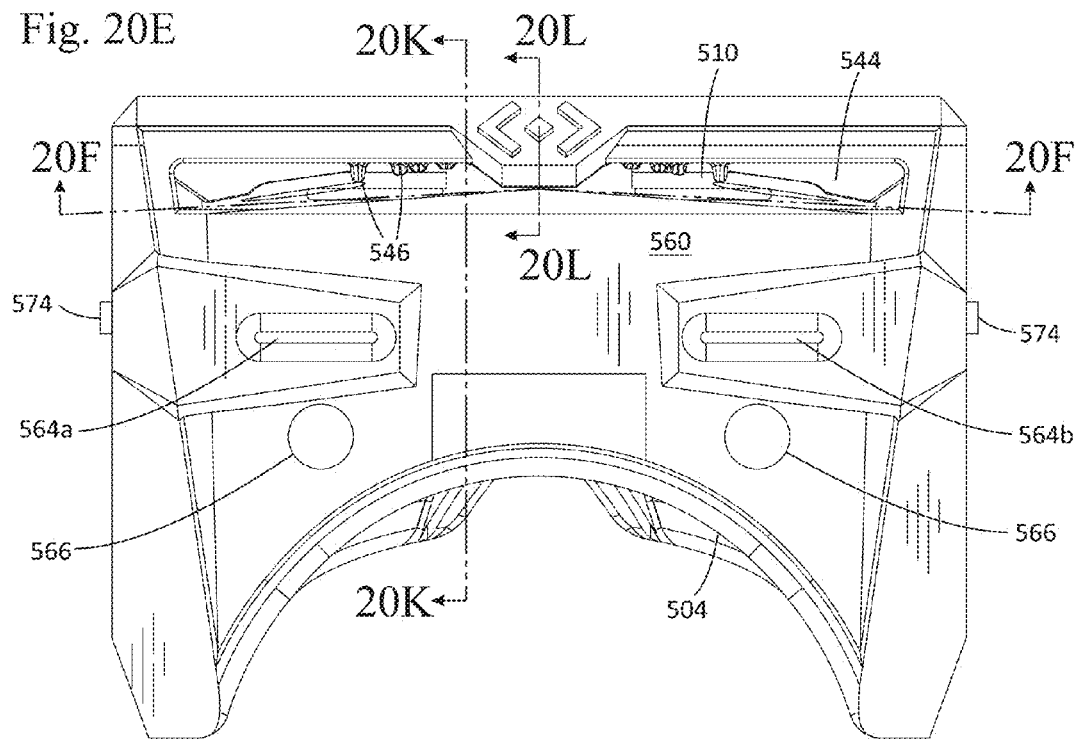
Figure 20F:
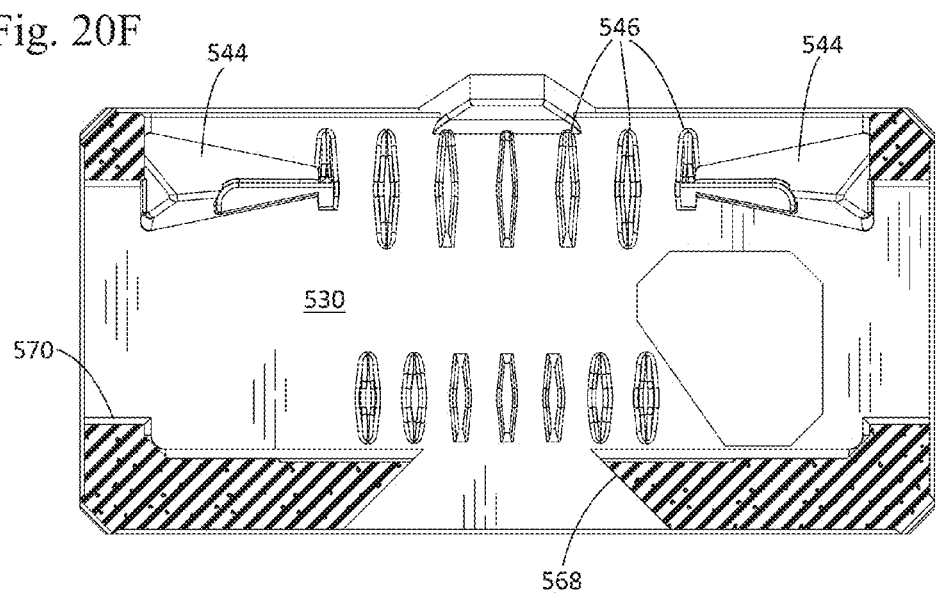
Figure 20G:
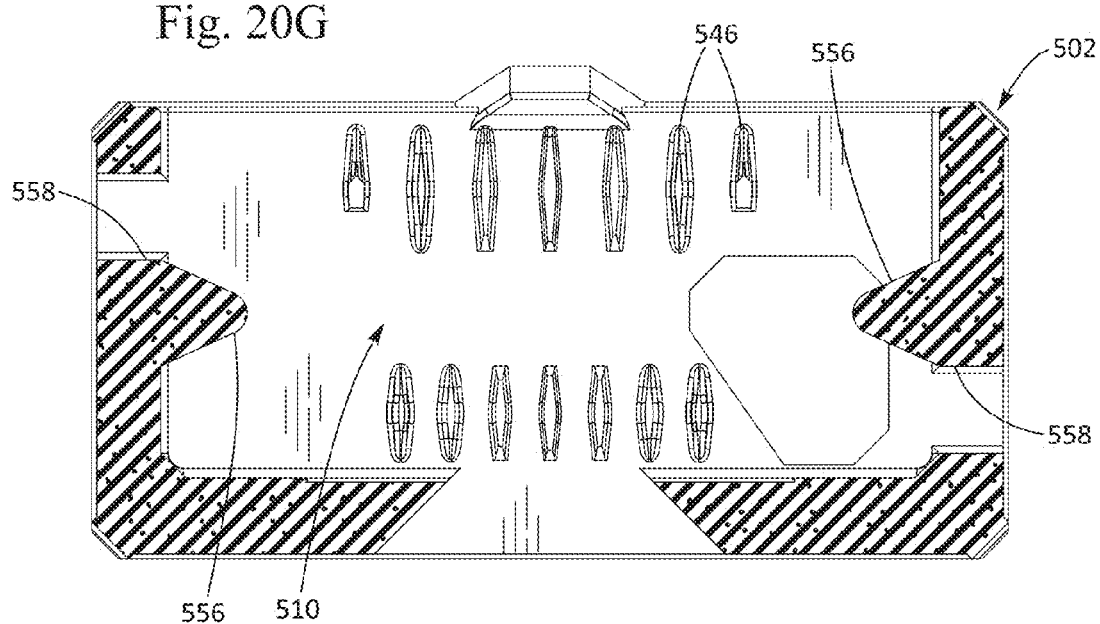
Figure 20H:
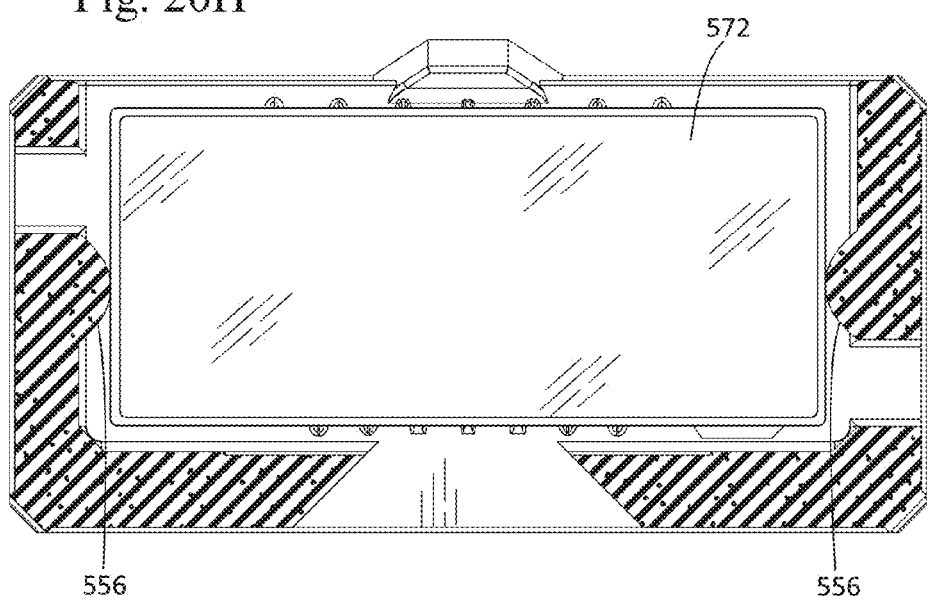
Figure 20I:
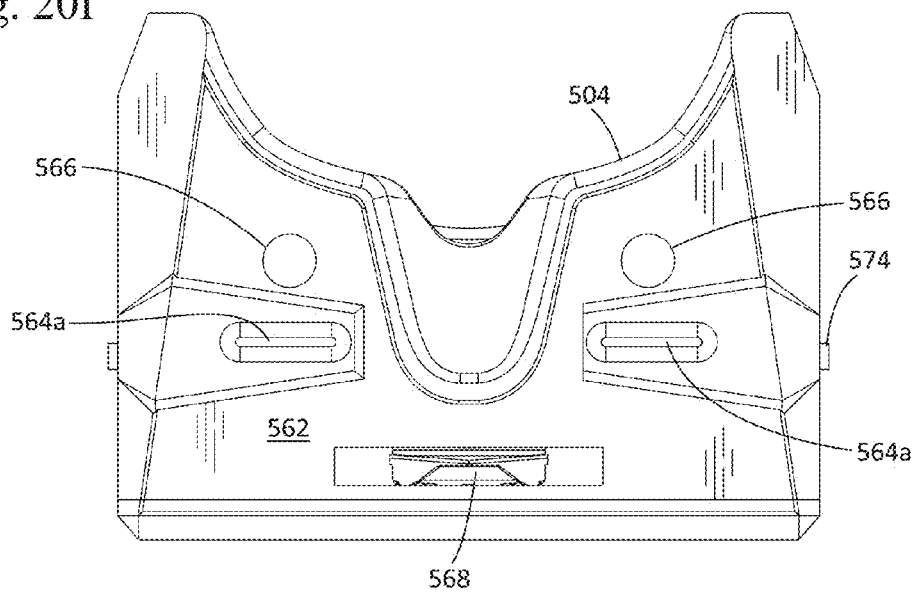
Figure 20J:
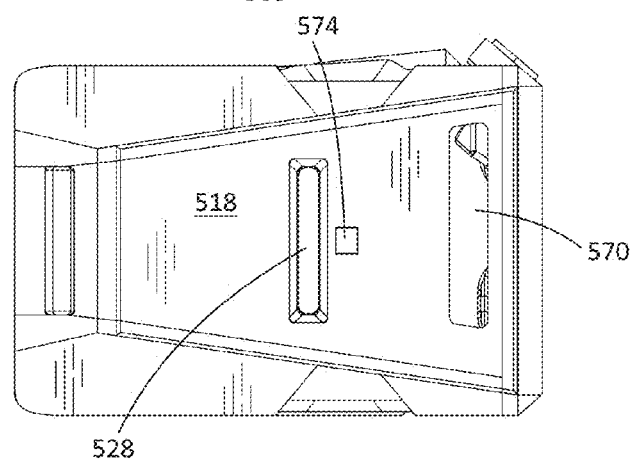
Figure 20K:
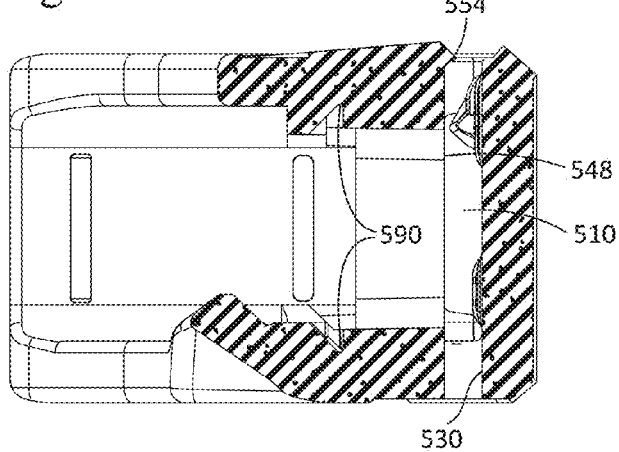

The smartphone inserts in the pocket 510 between the rear face of the front wall 530 and in front of an internal divider wall 548 that extends parallel to the front wall, and is seen best in FIGS. 20B and 20K. The divider wall 548 is not a slab, but instead includes two identical relatively large apertures 550 separated by a central partition 552 through which the lenses 507 of the lens assemblies 506 visualize the display screen of the smartphone. The divider wall 548 provides a peripheral frame oriented in a vertical plane against which abuts the front edges or bezel of the smartphone. The horizontal distance between the nubs 546 and the divider wall 548 is desirably size less than the minimum thickness of the smartphone expected to be inserted therein such that the foam nubs 546, and the divider wall 542 to a certain extent, are compressed when the device is inserted. Of course, the ramped protrusions 544 being larger than the nubs 546 are compressed against the rear face of the smartphone even more. The compression of the foam surfaces on both faces of the smartphone securely retains it within the vertical pocket 510.

Figure 20L:
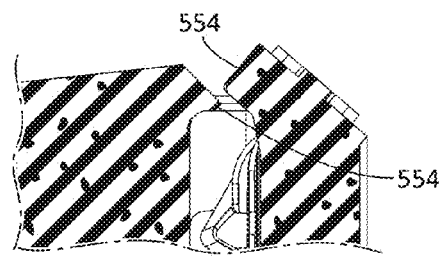

As an additional precaution to retain the smartphone within the pocket 510, a pair of inward ledges 554 are formed at the top end of the slot, as seen in FIG. 20L. These ledges 554 even overlap to a certain extent to prevent the phone from falling out when the HMD is held upside down.

FIG. 20G shows an alternative arrangement of the leveling and centering protrusions 556 extending inward into the pocket 510. Rather than being on the front wall 530, the protrusions 556 extend from each side wall 518. Since these protrusions 556 require side wall support, two small slots 558 provide access to the ends of a smartphone 572 placed within the pocket 510 for connection of audio jacks, power cords, etc. Insertion of the smartphone 572 as seen in FIG. 20H compresses the side protrusions 556 which, in turn, apply approximately equal inward force on the smartphone so that it is laterally centered in the pocket 510. Although not shown, similar protrusions or bumpers may be provided at the bottom of the slot for horizontal leveling. The friction bumpers or nubs 546 as shown in FIG. 20F are also present to maintain the phone perpendicular in the body 510.

FIG. 20E shows a top wall 560 of the main body 502, while FIG. 20I illustrates a bottom wall 562. Lens adjustment slots 564a, 564b are formed in both the top wall 560 and bottom wall 562. More particularly, a pair of vertically aligned left-side lens adjustment slots 564a are formed, one in the top wall 560 and one in the bottom wall, and a pair of vertically aligned right-side lens adjustment slots 564b are formed, one in the top wall 560 and one in the bottom wall. These slots 564 received and permit lateral adjustment the lens assemblies 506a, 506b, as will be described below. Both the top wall 560 and the bottom wall 562 each include a pair of vent holes 566 that are positioned between the slots 564 and the face-engaging lip 504 so as to help reduce humidity and fogging of the lenses 507 within the goggles 500. FIG. 20I further illustrates a narrow aperture 568 formed in the center and directly below the vertical retention pocket 510. This aperture 568 enables the user to easily push the smartphone from below out of the retention pocket 510.

FIG. 20J again shows the side wall 518 of the main body 502 having the vertical slots 528 for receiving the docking clips 520 to hold the remote controllers 512. In addition, relatively large vertical slots 570 are provided in both side walls 518 opening to the pockets 510. The vertical slots 570 provide access to the ends of the smartphone within the pocket 510 for connection of audio jacks, power cords, etc.

FIG. 21A is a side elevation view of the MHMD goggles 500, and FIG. 21B is a horizontal sectional view through the goggles showing a smartphone 572 positioned within the vertical retention pocket 510. FIG. 21B also illustrates the relative position of the two remote controllers 512 when they are docked. Once again, the somewhat I-beam shaped docking clips 520 are held within the slots 528 (FIG. 20J) in the side walls 518, and secure the remote controllers 512 in an easily detachable manner. Desirably, small bumps 574 extending outward from both side walls 518 just forward of the slots 528 contact switches 576 (FIG. 26B) on the back of each remote controller 512 to signify when the controllers are properly docked. In this manner, the precise position of the controllers 512 is calibrated whenever they are docked to the sides of the goggles 500. A more complete explanation of the capabilities of the entire MHMD goggles 500 with the controllers 512 will be provided below with respect to FIGS. 26-27.

FIG. 21B best shows the positions of the lens assemblies 506a, 506b within the goggles 500, and FIGS. 22A and 22B are front and rear perspective views of the lens assemblies. In contrast to the lens assembly 20 described above with respect to FIGS. 10a-10c, the left and right lens assemblies 506a, 506b are completely separate and do not share a common frame. Each of the lens assemblies 506a, 506b is shown without the actual lenses 507 in these views to provide greater visibility of the various components within the goggles 500. In a preferred embodiment, the lenses slightly magnify the field of view and their focus may be adjusted by rotating the lenses within circular bezels 580. The bezels 580 project to the rear from an outwardly rectangular frame 582 which has upper and lower posts 584 terminating in finger pads 586.

As seen in FIG. 17A, the lens assemblies 506a, 506b are positioned within the main body 502 of the goggles such that the rectangular frame 582 is oriented vertically and positioned just in front of the smartphone retention pocket 510. FIG. 20K illustrates inner channels 590 formed by the main body 502 including small guide walls 592 that closely surround the rectangular frames 582. The lateral width of the channels 590 is greater than the width of the rectangle frames 582 such that the lens assemblies 506a, 506b can be moved side to side. The upper and lower posts 584 are somewhat blade-like so as to fit closely within the upper and lower lens adjustment slots 564a, 564b described above with respect to FIGS. 20E and 20I. The lateral width of the adjustment slots 564a, 564b is also greater than the width of the posts 584. As discussed above with reference to FIG. 20B, the lenses may be divided from another by a central partition 552 running substantially up to the smartphone screen.

FIG. 23 is a view looking down on the main body 502 shown in phantom and illustrating the side-to-side adjustability of the independent lens assemblies 506a, 506b. The wearer need only squeeze both upper and lower finger pads 586 to slide the lens assemblies laterally. The ability to adjust the lens assemblies 506a, 506b in this manner allows a user to space them apart in an optimal manner so that the optical axes of the wearer's eyes aligns with the optical axes of the lenses. Easily adjusting the interpupillary distance (IPD) in this manner allows different users to comfortably wear the goggles in rapid succession without an extensive calibration process.

As was described above, the goggles 500 provide a system for detecting and communicating to the smartphone 572 the individual lens horizontal and vertical positions within the headset. This establishes the interpupillary distance (IPD). One means for automatically determining interpupillary distance is to take advantage of the capacitive touch features of the mobile device screen in conjunction with a stylus 594 attached to each lens assembly 506. FIGS. 22A and 22B also show an elongated stylus 594 projecting forward from the lens assembly 506. The stylus 594 preferably terminates in a rounded or bullet-shaped soft tip 596 which is designed to contact the display screen of the smartphone 572. As seen in both FIGS. 21B and 23, and in a preferred embodiment, the length of the styluses 594 is such that the tips 596 come into contact with the smartphone 572. FIG. 23 also shows the relative lateral positions of the styluses 594 to the inside of each lens assembly 506, and as seen in FIG. 22B the stylus is at the bottom of the frame 582, so as to be essentially hidden from the wearer's line of sight—generally aligned with the wearer's nose. The soft tips 596 are soft polymer or elastomeric while in another embodiment the tips are coated in a conductive paint or may use a conductive foam or any other material that provides a capacitive response to the mobile device. Positioning software provided with the goggles 500 may be incorporated into the smartphone 572 such that when the stylus tips 596 contact the screen of the smartphone 572, and the wearer signals that the correct lens position is reached, the precise position of the optical axis of the lenses within the lens assemblies 506 relative to the smartphone is communicated. Alternatively, the stylus tips 596 may constantly be in contact with the screen of the smartphone 572 such that the smartphone is constantly aware of the location of the lens assemblies 506. As discussed above with respect to FIG. 10f, this location may be used to derive the interpupillary distance (and, indeed, the location of the lenses relative to the screen).

Capacitive touch screens, such as on smartphones, have varying sensitivities, and a response may be triggered in some from a simple touch from an inanimate and non-conductive object. A conductive path is not required if the stylus material conductive properties allow for the touch response to be triggered. However, this may create a problem with buildup of charge in the material, and is may be impeded by the different sensitivities of smartphone capacitive screens. Nevertheless, this is considered a viable method of transferring touch inputs without the need of a conductive path. More commonly, an electrical current such as directly or indirectly from a user's fingertip is necessary, or at least the use of a stylus with a magnet or some form of ferrous material in its tip. The present application contemplates styluses integrated within the MHMD goggles that transmit a touch and initiate a touch response on capacitive touch screens regardless of the means. Thus, the term "touch input" encompasses all such configurations.

FIGS. 22A and 22B illustrate a button 598 provided in the center of the upper finger pad 586. The button 598 may be configured in several different ways. In one embodiment, the stylus tips 596 are positioned so as to be slightly away from the screen of the smartphone 572, and the buttons 598 initiate a mechanical linkage which pushes the stylus tips against the smartphone screen. Two different alternatives this system are shown in FIGS. 24-25. Alternatively, the buttons 598 may be constantly in contact with the screen through an electrical circuit to the tips 596 such that capacitive contact with the styluses 594 with the screen can be detected based on changes in electrical current. That is, the tips 596 remain in contact with the smartphone screen but an electrical current from the user's fingers is not transmitted until the button 586 is depressed. In either embodiment, when the user merely touches the lens assembly buttons 598, thereby generating a capacitive change through the button 598 and conductive stylus 594 to the tips 596 and to the screen, the device touch input is registered. In the system described, two touch inputs provided by the two styluses 594 are used, but it is envisioned that four or more touch inputs could achieved by the addition of additional styluses and corresponding buttons.

FIGS. 24A-24E illustrate a first alternative lens assembly 600 with a movable stylus tip 602 for use in any of the MHMD goggles described herein. As before, a bezel 604 mounts within a frame 606 sized to slide laterally within a main body of the goggles described herein. A pair of upper and lower finger pads 608 allow a user to displace the lens assembly 600 laterally within the main body, again as described above. The upper finger pad 608 mounts on the end of a pivoting lever 610 which has an angled cam surface 612 close to its pivot point (not shown). The cam surface 612 contacts and acts on a proximal arrow-shaped end 614 of a shaft 616 positioned to slide axially within the stylus tube 618. A compression spring 620 positioned within the interior of the stylus tube 618 biases the shaft 616 in a proximal direction toward the cam surface 612. In this respect, the distal end of the stylus tube 618 is closed except for a narrow aperture through which extends a reduced diameter portion of the shaft 616. The stylus tip 602 attaches to a distal end of the shaft 616 outside of the stylus tube 618. As seen in FIGS. 24C and 24E, when the wearer depresses the finger pad 608, the angled cam surface 612 forces the arrow-shaped shaft end 614 distally which displaces the stylus tip 602 against the smartphone screen. Because of a conductive path extending between the stylus tip 602 and the finger pad 608, this registers a touch to the smartphone screen. It should be understood that the movable finger pad 608 (or, actuator) could be either on the top or bottom of the respective lens assembly 600.

FIGS. 25A-25E show a further alternative lens assembly 630 with a movable stylus tip 632 for use in the MHMD goggles described herein. As seen in FIG. 25B, the stylus tip 632 resides on the distal end of a shaft 634 positioned to slide axially within a stylus tube 636. A linkage arm 638 pivotally attached at the proximal end of the shaft 634 is also pivotally attached to a lever arm 640. The lever arm 640 is mounted to pivot within a frame 642, and has one of the finger pads 644 on an end opposite the pivot point (not shown). A spring or other type of return mechanism (not shown) is preferably included to maintain the equilibrium position of the lever arm 640, as seen in FIGS. 25A and 25B. When the wearer depresses the finger pad 644, as seen in FIGS. 25C and 25E, the lever arm 640 raises up the end of the linkage arm 638 to which it is connected, thus forcing the shaft 634 and stylus tip 632 distally into contact with the smartphone screen. Once again, a conductive path from the stylus tip 632 to the finger pad 644 translates this movement into a touch on the capacitive smartphone screen.

FIGS. 24 and 25 show the position of the styluses to the inside and top edge of each lens assembly, as opposed to at the bottom as in FIG. 22B. Again, the styluses are essentially hidden from the wearer's line of sight—generally outside of their peripheral vision.

The significance of touching the smartphone screen can be to locate the lens assembly 600, thus setting the IPD distance. Alternatively, the ability to touch the smartphone screen can be utilized as a, button, switch or prompt to make a decision with regard to software running in the smartphone. For example, the first time a wearer puts on the goggles, the smartphone may initiate an IPD calibration, wherein the wearer positions the lens assemblies 600 to his or her specification and initiates the stylus touch. Subsequently, the smartphone software may require inputs which can be translated through the stylus touch. For example, a number of YES or NO options can be presented to the wearer, wherein one touch means YES and two touches means NO (or a right side touch means YES and a left side touch means NO). Of course, there are numerous other possibilities of such communication. Furthermore, as mentioned above, there may be more than one pair of touch styluses provided for the goggles which may allow for one dedicated pair (which may or may not be in constant contact with the screen of an inserted smartphone) for IPD calibration and one or more other pairs for communicating decisions. Indeed, the use of two or more inputs greatly enhances the user experience, much as a two button mouse is greatly superior to a single button mouse for interacting with a computer.

Figure 26A:
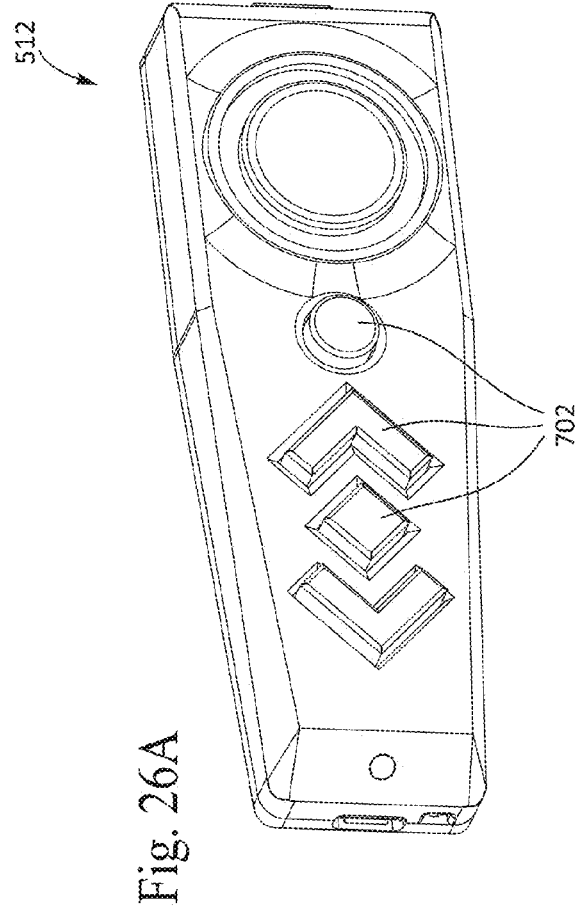
FIGS. 26A and 26B are front and rear perspective views, respectively, of an exemplary remote control for use with the MHMD goggles of FIGS. 17A and 17B.
Figure 26B:
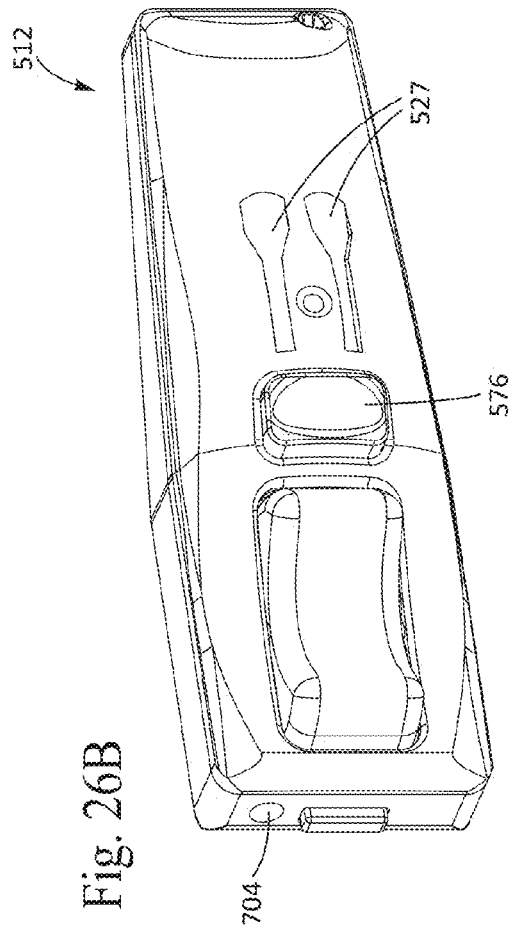

FIGS. 26A and 26B are front and rear perspective views, respectively, of an exemplary remote controllers 512 for use with the MHMD goggles 500, while FIGS. 27A and 27B illustrate exemplary circuit boards 700 therein. As has been explained above, the exemplary MHMD goggles 500 desirably include one or more remote controllers 512 detachably secured to an external surface of the main body 502. The remote controllers 512 include internal motion sensors (not shown) and control buttons 702, as well as a microprocessor (not shown) configured to communicatively couple to the smartphone 572. It should be understood that "control buttons" refers to any type of devices manipulable by a user, such as buttons, sliders, triggers, rotating rings or wheels, and joysticks, whether physical or virtual (i.e., touch screens). Furthermore, a camera lens 704 may be provided on a front end of the remote controllers 512.

As was described above, the remote controllers 512 may include one or more 9-axis motion detection chip(s), although other numbers of motion-related axes may be used as desired. The remote controllers 512 may communicate its current motion state (which may include orientation) to the smartphone 572 at a specified frequency, e.g., one or more times per second, or when the motion state changes, e.g., by a specified amount.

The ability to attach and detach as well as positionally dock the controllers 572 to the main body 502 enables the user to easily keep track of the controller. While docked to the side of the main body 502, the controllers 512 can also be used in situations where the user would not need to utilize the full features of the controller, as depicted in FIG. 18A, such as watching a 3D or spherical movie and using the control buttons 702 of the controller to play, pause or generally control the experience. Preferably, each of the control buttons 702 is relatively large and has a distinct shape from the other control buttons so that the user can easily recognize and distinguish between them.

Furthermore, once the remote controllers 512 are docked onto the known position on the sides of the goggle main body 502, the system can then use the motion data from the controllers to track the user's head while it is in motion. When docked, software on the smartphone 572 knows the orientation of the remote controller 512 based upon the docking configuration (e.g. the remote controller 512 only docks in one position on the goggles). The data generated by the remote controller 512 may be provided in place of or in addition to data derived directly by a smartphone.

In addition, the docking mechanism can mechanically activate the headtracking mode on the controller. For example, the bumps 574 on the sides of the goggle, under or near the docking clips 520 may depress the docking switches 576 (see FIG. 21B). Of course, the bumps 574 represent "docking features" that may be formed by the main body 502 or by inserts therein, numerous possible configurations of which are contemplated. For instance, the bumps may be relatively rigid plastic inserts that are not compressible like the soft body 502. When this occurs, software operating on the remote controller 512 and/or smartphone 572 may automatically recognize that the remote control 512 has been docked with the goggles. In one embodiment the docking mechanism presses the switch 576 on the controller when the controller is in the dock allowing the controller to recognize that it is docked and take appropriate actions such as communicating its docked state to the system. Although the docking switches 576 are shown relatively large and protruding, they may also be smaller and recessed.

Similarly, other methods of detection may be employed in place of the docking switches 576. Infrared, camera-based, light-based, magnetic, capacitive, proximity sensors and other systems used by the smartphone and/or remote controller 512 may be used in order to detect that the remote controller 512 has been docked with the goggles. For example, a capacitive sensor may be exposed in a recess within the main body 502 such that, when the remote controller 512 is docked, a small capacitive stylus touches the capacitive sensor thereby indicating that the remote controller 512 is docked. Similarly, infrared, camera-based, light-based, or proximity sensors may be employed to note when the remote views a particular light pattern, repeating light, light color, or similar indicator emitted by the smartphone and/or main body 502 (e.g. through a particular recess in the side of the main body 502 that corresponds to a counterpart sensor in a remote controller 512) in order to determine that the remote controller 512 is docked. Attachment to a magnet may close an exposed circuit on the main body 502 that indicates that the remote controller 512 is attached to the main body 502. Also, the controller 512 may include a mail USB jack that inserts into a female port provide in the side of the body 502, which signals that the controller is docked and also provide a convenient means for data or power transfer. These and various other docking detection methods may be employed.

Once docked, and once recognized by either or both of the remote controller 512 and the smartphone 572, the remote controllers may provide orientation, location, motion, and rotation data to the smartphone. The sensors or the integrated motion detection chip within the remote controllers 512 may be purpose-built for generating motion-related data. As a result of the increased use of motion-controllers (such as in the Wii and, now Wii U) and smartphones use of gyroscopes to determine screen orientation, direction and the like, there are now very powerful integrated chips that are capable of quickly providing and calculating device orientation, movement, and rotation. However, in order to save costs the most powerful integrated chips are seldom integrated into smartphones. Instead, only those sensors that provide some benefit, and only to the level that they provide that benefit, are typically incorporated into smartphones.

Because that very detailed data pertaining to orientation, location, movement, and rotation is desirable in a high-quality motion-detecting remote control, like remote controller 512, the integrated chips chosen for integration into the remote controller 512 can be of the best, most cost-effective quality. These chips can include (or have access to and algorithms related to) one or more gyroscopes, gravitometers, compasses, magnetometers, cameras (both infrared and video) and other, similar, sensors used for determining orientation, location, movement and rotation. Collectively, these are called "motion sensors" within this application. Further, because the remote control in the present application may be used in conjunction with a standard smartphone which is not designed to perform such detailed calculations in order to provide head-tracking data, the remote control provides an opportunity to offload some of that functionality at substantially reduced cost. The data generated by one or more of these remote controllers 512 may be extremely accurate, quickly generated, and transmitted to a smartphone for action thereon. The remote controller 512 is shown as a remote control device, but may instead be a fixed or detachable device including motion sensors and a processor that is only used in conjunction with the headset to augment the motion sensing capability of a smartphone. Herein, these types of devices are also called remote controllers.

Figure 13C:
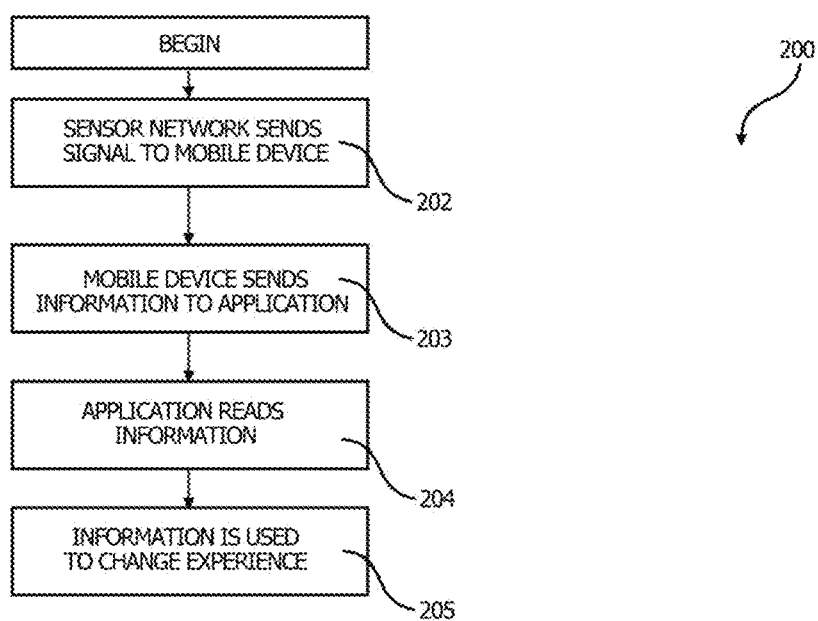
FIG. 13c is a flow diagram of an exemplary sensor interface process for the MHMD.

The process 200 shown in FIG. 13c exemplifies a typical interaction. The process, generally, begins after one of the motion sensors is activated based upon a change in orientation of a remote controller attached to the goggles. First, the sensors send the updated motion information in the form of a signal to the mobile device (such as a smartphone) at 202. Because raw motion information can be complex, sensor fusion—the process of combining motion information from multiple sources (or sampled over a particular time-frame)—may be performed on the data to derive motion instructions that may be used to instruction video drivers or application software. Next, the mobile device sends the motion instructions to an application, such as a virtual reality application displaying a virtual environment, at 203. Next, the application reads the updated motion instructions at 204 and that information is used to change the experience (such as updating the environment to reflect the updated motion information) at 205.

In some cases, the remote may also be used to perform sensor fusion in addition to providing raw sensor data or updated motion information to a smartphone 572. In such cases, the remote's integrated chips may obtain all location, motion, and rotation data and perform so-called "sensor fusion" to integrate that data into a current location, motion, and rotation. That data may be handed off directly to the smartphone for use in rendering the current (or future) frames of video. Based upon that raw data, the remote controller 512 may also perform predictive functions on the location, motion, and rotation data to thereby suggest future location, motion, and rotation of the goggle.

The remote controller 512 may perform motion sensor fusion in place of or in addition to motion sensors in the smartphone 572, wherein the controller takes over some of the work for the smartphone. By relieving the smartphone 572 of most tasks related to obtaining orientation, motion and rotation data, the smartphone apply its processing power to processor-intensive video rendering applications based upon the data provided by the remote.

Desirably, the remote controllers 512 may both equipped with a camera 704 to provide additional video stream to the device used in conjunction with computer vision algorithms. The additional cameras 704 can be used in conjunction with the camera on the smartphone 572 to provide a stereo image of the environment. Providing even one controller 512 on a side of the main body 502 supplies an additional video stream, thereby furthering enhancing the capabilities of the computer vision algorithms by enabling the cameras of the smartphone 572 and remote control 12 to work in conjunction to provide a stereo image of the external environment. Even more cameras, one on two, mounted remote controls 512 and the smartphone 572 camera, may provide still more accuracy. The cameras 704 on the controllers 512 may be RGB camera, depth cameras or simply BW or UV cameras.

The detachable controllers 512 are also used to establish relative location of the system's motion components. Specifically, knowledge of the location and orientation of the controllers 512 allows the system to calibrate the locations of the various motion components relative to each other. Furthermore the system can then use the default positions and orientations to provide positional and rotational offsets relative to the default, thus allowing the system to track the motion of the components relative to one another. This may, for example, act as a "reset" when motion tracking algorithms go awry. For example, the user may apply and remove a controller 512 from his or her head to reset the motion tracking algorithm from a known starting point. This is useful when the user removes the remote controller 512 from the headset with their hand, the system can then track the controller motion and apply that to a virtual rig of a human skeletal structure and compute the user's virtual hand position based on the real world hand position.

Another configuration for the main body of the image in the goggles of the present application is in a collapsible form. For example, the various walls of the main body 502 illustrated above with respect to FIGS. 17-21 may be hingedly connected so that the body may be unfolded and laid flat.

Figure 28A:
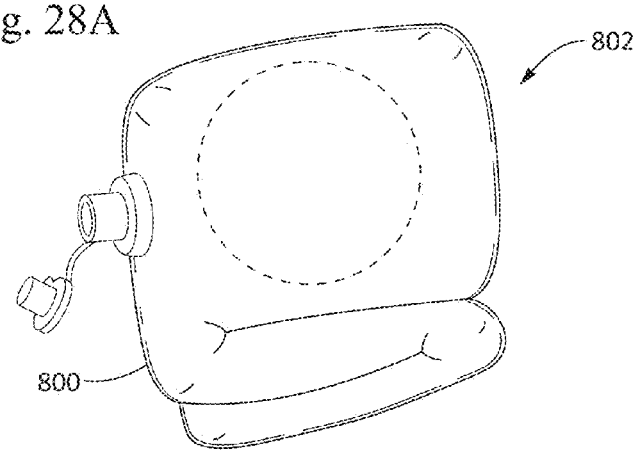
FIGS. 28A and 28B schematically illustrate a fully inflatable configuration of the MHMD goggles of the present application.
Figure 28B:
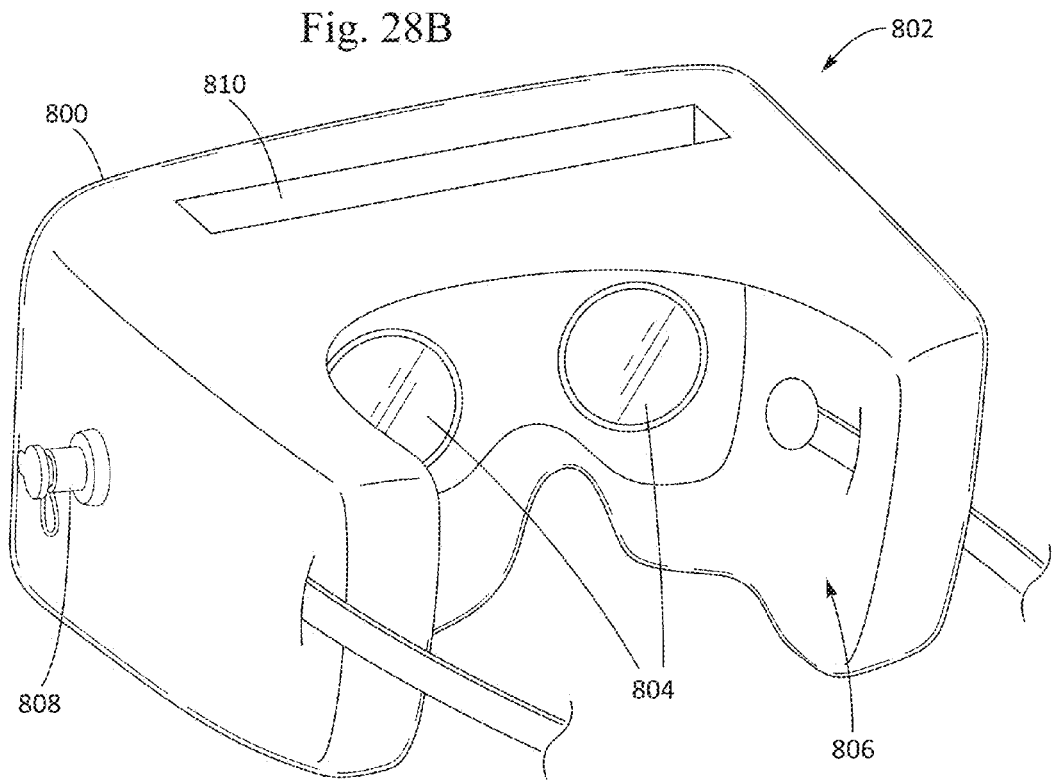

FIGS. 28A and 28B schematically illustrate a fully inflatable main body 800 of a pair of MHMD goggles 802 of the present application. Separate lens assemblies 804 are fastened within a cavity 806 defined within the inflated body 800, as seen in FIG. 28B. The lens assemblies 804 are the only rigid part, and as seen in FIG. 28A, the main body 800 when deflated can be collapsed around the lens assemblies. An inflation valve 808 is provided to convert the main body 800 from its deflated to its inflated configuration. A smartphone retention pocket 810 is defined by the inflated main body 800, much like what is described above. In this embodiment, the lens assemblies 804 may be laterally movable, or they may be fixed in place in a simplified version of the goggles.

Figure 29A:
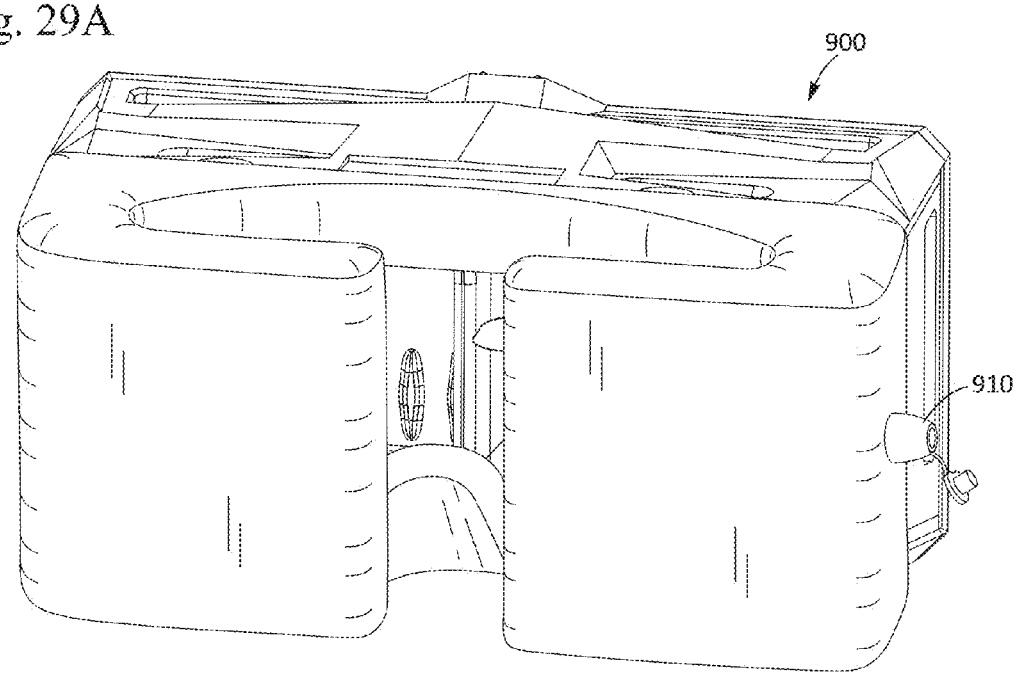
FIGS. 29A and 29B show a partially inflatable embodiment of the MHMD goggles.
Figure 29B:
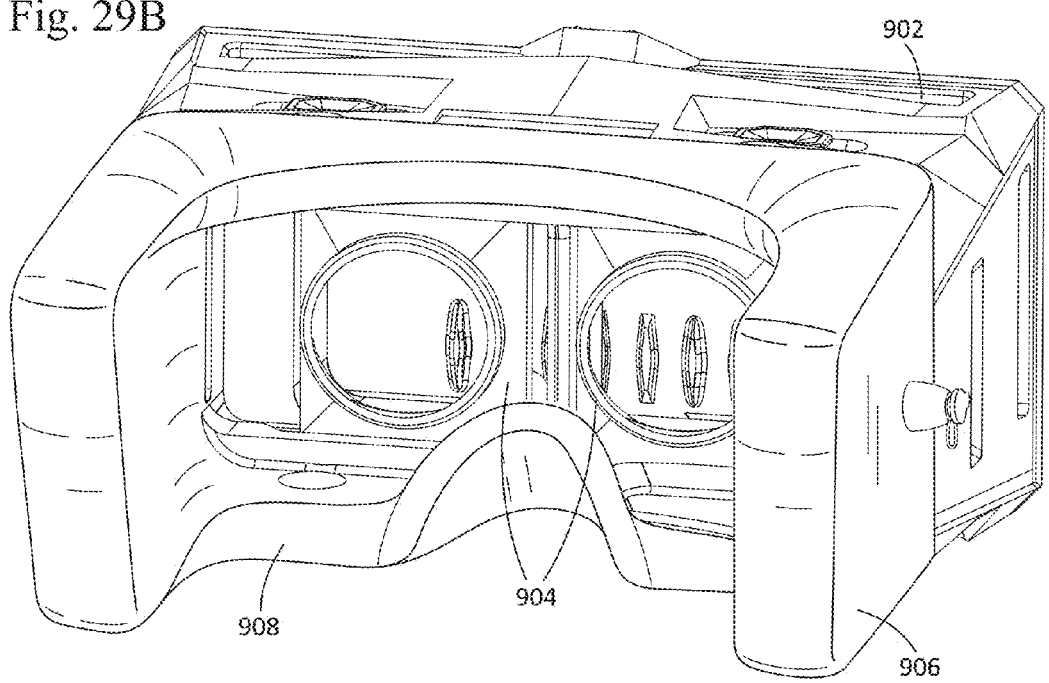

FIGS. 29A and 29B show a partially inflatable embodiment of MHMD goggles 900. A forward portion of the goggles 900 comprises a soft, compressible material, such as the closed-cell phone described above. For example, the walls defining a smartphone retention slot 902 as well as channels (not numbered) for receiving separate lens assemblies 904 may be made of the soft, compressible material, or a more rigid material also as described above. A rear portion of the goggles 900, such as sidewalls 906 and a face-contacting lip 908 may be inflatable, and incorporate a valve 910. This configuration, the goggles 900 can be deflated and compressed into a smaller brick shape for easy transport. With either a fully or partially inflatable HMD, benefits include portability, lower weight, price and ease of distribution at events.

Figure 30A:
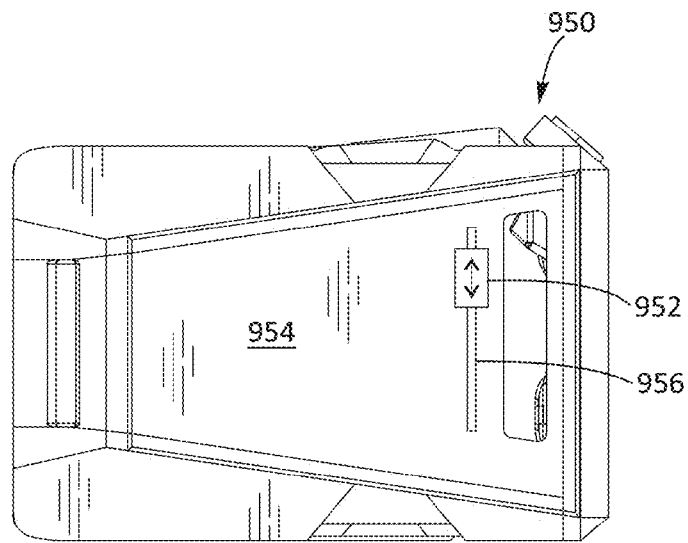
FIG. 30A is a side view of an alternative MHMD body having a capacitive touch slider on one side.
Figure 30B:
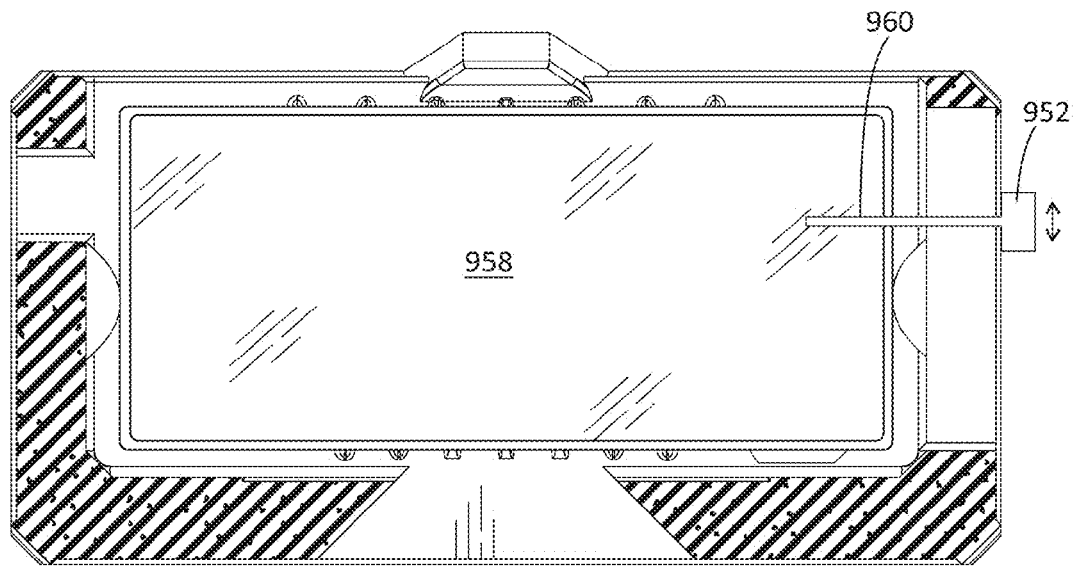
FIG. 30B is a sectional view much like FIG. 20H showing the position of the slider relative to a smartphone within the goggles.

FIG. 30A illustrates an alternative MHMD body 950 having a capacitive touch slider 952 incorporated into one side wall 954. The slider 952 may be mounted to slide vertically within a slit 956 formed in the body 950, or by a separate more rigid insert therein. FIG. 30B is a vertical sectional view showing the position of the slider 952 relative to a smartphone 958 retained within a retention pocket formed by the goggles. The slider includes a conductive stylus 960 that is positioned to contact the display screen of the smartphone 958 so that a user may contact the slider 952 and create a conductive path to the capacitive display screen. Such a display screen slider 952 may be used to communicate instructions to the smartphone 958, such as controlling volume, contrast, or other such features. Of course, more than one such slider 952 may be provided, and the slider can be used to supplement the input capacity of the two styluses mentioned above.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another claim element having a same name (but for use of the ordinal term) to distinguish the claim elements. As used herein, "and/or" means that the listed items are alternatives, but the alternatives also include any combination of the listed items.

It is claimed:

1. A head mounted display system comprising:
   a main body configured to be worn on a human head and defining a retention pocket configured to accept and secure therein a mobile computing device having a display and hardware for producing mobile computing device motion data used to perform head tracking of the human head when the main body is worn; and
   a remote controller, distinct from, but in communication with, the mobile computing device, which when detachably attached to the exterior of the main body begins providing motion data to the mobile computing device that is used by the mobile computing device in performing head tracking of the human head and causes the mobile computing device to cease using mobile computing device motion data to perform head tracking of the human head, the remote controller incorporating a remote controller processor, at least one motion sensor for providing the motion data, and a sensor for detecting attachment of the remote controller to the main body and, when detachably secured to the main body as determined by the sensor.

2. The head mounted display system of claim 1 wherein the sensor comprises a depressible button such that when the remote controller is detachably secured to the exterior of the main body, the depressible button is depressed by the exterior of the main body thereby indicating that the remote controller is attached to the exterior of the main body.

3. The head mounted display system of claim 2 wherein the sensor comprises a depressible button configured so as to be depressed and retained in a depressed state for the duration of the attachment.

4. The head mounted display system of claim 1 wherein the at least one motion sensor comprises a gyroscope and the at least one motion sensor provides motion data to the computing device so that images displayed on the display may be updated to reflect motion of the head mounted display system.

5. The head mounted display system of claim 1 wherein the at least one motion sensor comprises a gyroscope and the at least one motion sensor is used in conjunction with the remote controller processer to generate motion data calculations in place of any made by the computing device that are then passed on to the computing device so that images displayed on the display may be updated to reflect motion of the head mounted display system.

6. The head mounted display system of claim 1 wherein the remote controller includes a plurality of unique control buttons on a front face thereof none of which are alike, wherein the control buttons face away from the main body when the remote controller is secured to the exterior of the main body.

7. The head mounted display system of claim 1 wherein the remote controller is a first remote controller and further including a second remote controller detachably secured to the exterior of the main body on a side opposite the first remote controller, the second remote controller, distinct from the first remote controller and the mobile computing device, detachably secured to the exterior of the main body and being in communication with the computing device, the second remote controller incorporating a remote controller processor and at least one second motion sensor and, when detachably secured to the main body, the second remote controller providing motion data from the at least one second motion sensor to the computing device to combine with any motion data produced by the mobile computing device and the first remote controller to assist the computing device in performing head tracking of the head mounted display system.

8. The head mounted display system of claim 1, wherein the remote controller has a forward-facing camera lens when the remote controller is secured to the exterior of the main body, wherein images received by the camera lens are communicated to the mobile computing device to be displayed on the display of the computing device.

9. A method of performing head tracking for a head mounted display system comprising:
processing mobile computing device motion data, provided by a mobile computing device including a display to thereby derive motion instructions suitable for use in performing head tracking in order to update an image shown on the display;
automatically detecting detachable attachment of a remote controller, distinct from the mobile computing device, to the main body using a sensor on the remote controller;
disabling head tracking using the mobile computing device motion data in response to attachment of the remote controller detected by the sensor;
generating motion data using at least one motion sensor within the remote controller detachably attached to the head-mounted main body of the system for the duration of the sensor detection that the remote controller is attached to the head-mounted main body;
communicating the motion data from the remote controller to the mobile computing device;
processing the motion data from the remote controller to perform head tracking; and
updating an image shown on the display of the computing device according to the processed motion data.

10. The method of claim 9 wherein the automatically detecting attachment of the remote controller comprises detecting that a depressible button has been depressed by the exterior of the main body when the remote controller is attached to the exterior of the main body thereby indicating that the remote controller is attached to the exterior of the main body.

11. The method of claim 9 further comprising automatically detecting that the remote controller has been detached from the head-mounted main body.

12. The method of claim 11 further comprising ceasing head tracking using the motion data and resuming head tracking using mobile computing device motion data in response to detachment of the remote controller from the head mounted display.

13. The method of claim 12 further comprising using the remote controller to generate control data that is used for purposes other than to perform head tracking.

14. The method of claim 13 wherein the purposes are selected from the group comprising controlling an avatar visible on the display, inputting commands for interaction with the environment shown on the display, and making selections from a menu on the display.

15. A head mounted display system comprising:
a main body configured to be worn on a human head and defining a retention pocket configured to accept and secure therein a mobile computing device having a processor and a display, the mobile computing device capable of creating mobile computing device motion data that is used to perform head tracking in order to update an image shown on the display;
the main body further comprising an attachment structure on the exterior of the main body for attaching a remote controller to the exterior of the main body;
a set of two lenses disposed within the main body between the eyes of a wearer and the display of the mobile computing device, the lenses for focusing the vision of the wearer on respective portions of the display so at to generate a stereoscopic three-dimensional image to the wearer; and
a remote controller, distinct from, but in communication with, the mobile computing device, which when detachably attached to the exterior of the main body by mating with the attachment structure and, thereby, causing depression of an integrated switch indicating that the remote control is detachably attached to the main body, the remote controller begins providing motion data to the mobile computing device that is used by the mobile computing device in performing head tracking of the human head and causes the mobile computing device to cease using mobile computing device motion data to perform head tracking of the human head, the remote controller incorporating a remote controller processor and at least one motion sensor for providing the motion data.

16. The system of claim 15 wherein:
engagement of the docking feature with the switch causes the remote control processor to commence providing motion data to the mobile computing device and causes the mobile computing device to cease providing mobile computing device motion data for use in performing head tracking.

17. The head mounted display system of claim 15 wherein the remote controller includes a plurality of unique control buttons on a front face thereof none of which are alike, wherein the control buttons face away from the main body when the remote controller is secured to the exterior of the main body.

18. The head mounted display system of claim 15 wherein the remote controller is a first remote controller and further including a second remote controller detachably secured to a second attachment structure having a second docking feature on the exterior of the main body on a side opposite the first remote controller causing the second docking feature to depress a second integrated switch indicating that the second remote control is detachably connected to the main body, the second remote controller also being in communication with the mobile computing device, the second remote controller incorporating a remote controller processor and at least one second motion sensor and, when detachably secured to the main body, the second remote controller providing motion data used to perform head tracking of the head mounted display system in place of the mobile computing device motion data.

19. The head mounted display system of claim 15, wherein the remote controller has a forward-facing camera lens when the remote controller is secured to the exterior of the main body, wherein images received by the camera lens can be displayed on the display of the computing device.

20. The head mounted display system of claim 15 wherein disengagement of the docking feature with the switch causes the remote to cease generating motion data for use in performing head tracking and causes the mobile computing device to commence generating mobile computing device motion data for use in performing head tracking.

* * * * *